US008690670B2

(12) United States Patent
Kay et al.

(10) Patent No.: US 8,690,670 B2
(45) Date of Patent: Apr. 8, 2014

(54) SYSTEMS AND METHODS FOR SIMULATING A ROCK BAND EXPERIENCE

(75) Inventors: Robert Kay, San Francisco, CA (US); Ryan Lesser, Providence, RI (US); Gregory B. LoPiccolo, Brookline, MA (US); Daniel Schmidt, Somerville, MA (US); Kevin Morris McGinnis, Boson, MA (US); Nathan H. Wright, Newton, MA (US)

(73) Assignee: Harmonix Music Systems, Inc., Cambridge, MA (US)

( * ) Notice: Subject to any disclaimer, the term of this patent is extended or adjusted under 35 U.S.C. 154(b) by 1307 days.

(21) Appl. No.: 12/139,819

(22) Filed: Jun. 16, 2008

(65) Prior Publication Data
US 2009/0104956 A1  Apr. 23, 2009

Related U.S. Application Data

(60) Provisional application No. 60/944,054, filed on Jun. 14, 2007.

(51) Int. Cl.
*A63F 9/24* (2006.01)

(52) U.S. Cl.
USPC .................................. 463/31; 463/7; 463/36

(58) Field of Classification Search
USPC ................................................ 463/7, 31, 36
See application file for complete search history.

(56) References Cited

U.S. PATENT DOCUMENTS

| | | |
|---|---|---|
| D211,666 S | 7/1968 | MacGillavry |
| 3,430,530 A | 3/1969 | Grind et al. |
| 3,897,711 A | 8/1975 | Elledge |
| D245,038 S | 7/1977 | Ebata et al. |
| D247,795 S | 4/1978 | Darrell |
| 4,128,037 A | 12/1978 | Montemurro |
| D259,785 S | 7/1981 | Kushida et al. |
| 4,295,406 A | 10/1981 | Smith et al. |
| D262,017 S | 11/1981 | Frakes, Jr. |

(Continued)

FOREIGN PATENT DOCUMENTS

| | | |
|---|---|---|
| DE | 19716937 A1 | 3/1998 |
| EP | 0903169 A2 | 3/1999 |

(Continued)

OTHER PUBLICATIONS

Association of British Scrabble Players. "Rolling System" (No Date). ABSP url:<http://www.absp.org.uk/results/ratings_detail.shtml>.*

(Continued)

*Primary Examiner* — Steve Rowland
(74) *Attorney, Agent, or Firm* — Wilmer Cutler Pickering Hale and Dorr LLP

(57) ABSTRACT

Systems and methods for indicating the performance of a plurality of players playing a video game simulating a rock band experience may include: calculating a player score for each player playing a rhythm action game within a band, each player score representing the performance level of a particular player; calculating a composite score for the band playing a rhythm action game, the composite score based in part on a performance level associated with each player within the band; displaying the composite score on a performance meter as a performance level; and displaying each player score on the performance meter as a graphical indication positioned on the meter at a position corresponding to the calculated player score.

21 Claims, 42 Drawing Sheets

(56) References Cited

U.S. PATENT DOCUMENTS

| | | |
|---|---|---|
| D265,821 S | 8/1982 | Okada et al. |
| D266,664 S | 10/1982 | Hoshino et al. |
| D287,521 S | 12/1986 | Obara |
| 4,644,495 A | 2/1987 | Crane |
| 4,766,541 A | 8/1988 | Bleich et al. |
| 4,783,812 A | 11/1988 | Kaneoka |
| 4,794,838 A | 1/1989 | Corrigau, III |
| 4,843,568 A | 6/1989 | Krueger et al. |
| 4,890,833 A | 1/1990 | Lantz et al. |
| D310,668 S | 9/1990 | Takada |
| 5,074,182 A | 12/1991 | Capps et al. |
| 5,107,743 A | 4/1992 | Decker |
| 5,109,482 A | 4/1992 | Bohrman |
| 5,140,889 A | 8/1992 | Segan et al. |
| 5,194,683 A | 3/1993 | Tsumura et al. |
| 5,208,413 A | 5/1993 | Tsumura et al. |
| 5,250,745 A | 10/1993 | Tsumura |
| 5,262,765 A | 11/1993 | Tsumura et al. |
| 5,287,789 A | 2/1994 | Zimmerman |
| D345,554 S | 3/1994 | Dones |
| 5,362,049 A | 11/1994 | Hofer |
| 5,368,309 A | 11/1994 | Monroe et al. |
| 5,393,926 A | 2/1995 | Johnson |
| 5,395,123 A | 3/1995 | Kondo |
| 5,398,585 A | 3/1995 | Starr |
| 5,399,799 A | 3/1995 | Gabriel |
| 5,434,949 A | 7/1995 | Jeong |
| 5,453,570 A | 9/1995 | Umeda et al. |
| 5,464,946 A | 11/1995 | Lewis |
| 5,482,087 A | 1/1996 | Overbergh et al. |
| 5,488,196 A | 1/1996 | Zimmerman et al. |
| 5,491,297 A | 2/1996 | Johnson et al. |
| 5,510,573 A | 4/1996 | Cho et al. |
| 5,513,129 A | 4/1996 | Bolas et al. |
| 5,534,917 A | 7/1996 | MacDougall |
| 5,537,528 A | 7/1996 | Takahashi et al. |
| 5,553,864 A | 9/1996 | Sitrick |
| 5,557,056 A | 9/1996 | Hong et al. |
| 5,557,057 A | 9/1996 | Starr |
| 5,563,358 A | 10/1996 | Zimmerman |
| 5,565,639 A | 10/1996 | Bae |
| 5,567,162 A | 10/1996 | Park |
| 5,568,275 A | 10/1996 | Norton et al. |
| 5,574,238 A | 11/1996 | Mencher |
| 5,613,909 A | 3/1997 | Stelovsky |
| 5,616,078 A | 4/1997 | Oh |
| 5,627,335 A | 5/1997 | Rigopulos et al. |
| 5,631,433 A | 5/1997 | Iida et al. |
| 5,634,849 A | 6/1997 | Abecassis |
| 5,663,517 A | 9/1997 | Oppenheim |
| 5,670,729 A | 9/1997 | Miller et al. |
| 5,681,223 A | 10/1997 | Weinreich |
| 5,693,903 A | 12/1997 | Heidorn et al. |
| D389,216 S | 1/1998 | Isetani et al. |
| 5,704,836 A | 1/1998 | Norton et al. |
| 5,715,179 A | 2/1998 | Park |
| 5,719,344 A | 2/1998 | Pawate |
| 5,723,802 A | 3/1998 | Johnson et al. |
| 5,734,961 A | 3/1998 | Castille |
| 5,739,457 A | 4/1998 | Devecka |
| 5,763,804 A | 6/1998 | Rigopulos et al. |
| 5,768,396 A | 6/1998 | Sone |
| 5,777,251 A | 7/1998 | Hotta et al. |
| 5,782,692 A | 7/1998 | Stelovsky |
| D398,916 S | 9/1998 | Bernardi |
| 5,804,752 A | 9/1998 | Sone et al. |
| D399,887 S | 10/1998 | Schultz et al. |
| D400,196 S | 10/1998 | Cameron et al. |
| 5,824,933 A | 10/1998 | Gabriel |
| 5,825,427 A | 10/1998 | MacLeod |
| 5,830,065 A | 11/1998 | Sitrick |
| 5,833,469 A | 11/1998 | Ito et al. |
| D403,024 S | 12/1998 | Muraki et al. |
| 5,861,881 A | 1/1999 | Freeman et al. |
| 5,874,686 A | 2/1999 | Ghias et al. |
| 5,880,788 A | 3/1999 | Bregler |
| 5,886,275 A | 3/1999 | Kato et al. |
| 5,889,224 A | 3/1999 | Tanaka |
| 5,906,494 A | 5/1999 | Ogawa et al. |
| D411,258 S | 6/1999 | Isetani et al. |
| 5,913,727 A | 6/1999 | Ahdoot |
| 5,915,288 A | 6/1999 | Gabriel |
| 5,915,972 A | 6/1999 | Tada |
| 5,915,975 A | 6/1999 | McGrath |
| 5,925,843 A | 7/1999 | Miller et al. |
| 5,953,005 A | 9/1999 | Liu |
| 5,953,485 A | 9/1999 | Abecassis |
| 5,969,716 A | 10/1999 | Davis et al. |
| 5,983,280 A | 11/1999 | Hunt |
| 5,990,405 A | 11/1999 | Auten et al. |
| 5,999,173 A | 12/1999 | Ubillos |
| 6,001,013 A | 12/1999 | Ota |
| 6,009,457 A | 12/1999 | Moller |
| 6,011,212 A | 1/2000 | Rigopulos et al. |
| 6,016,380 A | 1/2000 | Norton |
| 6,018,121 A | 1/2000 | Devecka |
| 6,032,156 A | 2/2000 | Marcus |
| 6,065,042 A | 5/2000 | Reimer et al. |
| 6,066,792 A | 5/2000 | Sone |
| 6,067,126 A | 5/2000 | Alexander |
| 6,067,566 A | 5/2000 | Moline |
| 6,072,113 A | 6/2000 | Tohgi et al. |
| 6,072,480 A | 6/2000 | Gorbet et al. |
| 6,073,489 A | 6/2000 | French et al. |
| 6,074,215 A | 6/2000 | Tsurumi |
| 6,075,197 A | 6/2000 | Chan |
| 6,083,009 A | 7/2000 | Kim et al. |
| 6,091,408 A | 7/2000 | Treibitz et al. |
| 6,098,458 A | 8/2000 | French et al. |
| 6,118,444 A | 9/2000 | Garmon et al. |
| 6,121,531 A | 9/2000 | Kato |
| 6,142,870 A | 11/2000 | Wada et al. |
| 6,150,947 A | 11/2000 | Shima |
| 6,162,981 A | 12/2000 | Newcomer et al. |
| 6,166,314 A | 12/2000 | Weinstock et al. |
| 6,177,623 B1 | 1/2001 | Ooseki |
| 6,182,044 B1 | 1/2001 | Fong et al. |
| 6,184,899 B1 | 2/2001 | Akemann |
| 6,191,350 B1 | 2/2001 | Okulov et al. |
| 6,215,411 B1 | 4/2001 | Gothard |
| 6,224,486 B1 | 5/2001 | Walker et al. |
| 6,225,547 B1 * | 5/2001 | Toyama et al. ............... 84/611 |
| 6,227,968 B1 | 5/2001 | Suzuki et al. |
| 6,227,974 B1 | 5/2001 | Eilat et al. |
| 6,243,087 B1 | 6/2001 | Davis et al. |
| 6,243,092 B1 | 6/2001 | Okita et al. |
| 6,252,153 B1 | 6/2001 | Toyama |
| 6,262,724 B1 | 7/2001 | Crow et al. |
| 6,263,392 B1 | 7/2001 | McCauley |
| 6,268,557 B1 | 7/2001 | Devecka |
| 6,283,860 B1 | 9/2001 | Lyons et al. |
| 6,287,198 B1 | 9/2001 | McCauley |
| 6,288,727 B1 | 9/2001 | Akemann |
| 6,292,620 B1 | 9/2001 | Ohmori et al. |
| 6,307,576 B1 | 10/2001 | Rosenfeld |
| 6,308,565 B1 | 10/2001 | French et al. |
| 6,309,301 B1 | 10/2001 | Sano |
| 6,319,129 B1 | 11/2001 | Igarashi et al. |
| 6,319,130 B1 | 11/2001 | Ooseki et al. |
| 6,320,110 B1 | 11/2001 | Ishikawa et al. |
| 6,326,536 B1 | 12/2001 | Wang |
| 6,329,620 B1 | 12/2001 | Oishi et al. |
| 6,337,433 B1 | 1/2002 | Nishimoto |
| 6,342,665 B1 | 1/2002 | Okita et al. |
| 6,347,998 B1 * | 2/2002 | Yoshitomi et al. ............... 463/42 |
| 6,350,942 B1 | 2/2002 | Thomson |
| 6,352,432 B1 | 3/2002 | Tsai et al. |
| 6,353,174 B1 | 3/2002 | Schmidt et al. |
| D455,792 S | 4/2002 | Isetani et al. |
| 6,369,313 B2 | 4/2002 | Devecka |
| 6,379,244 B1 | 4/2002 | Sagawa et al. |
| 6,380,474 B2 | 4/2002 | Taruguchi et al. |
| 6,380,950 B1 | 4/2002 | Montgomery et al. |
| 6,384,736 B1 | 5/2002 | Gothard |

(56) References Cited

U.S. PATENT DOCUMENTS

| | | | |
|---|---|---|---|
| 6,390,923 B1 * | 5/2002 | Yoshitomi et al. ............ 463/43 |
| 6,392,133 B1 | 5/2002 | Georges |
| 6,407,324 B1 | 6/2002 | Hulcher |
| 6,410,835 B2 | 6/2002 | Suzuki et al. |
| 6,417,432 B1 | 7/2002 | Downing |
| 6,425,822 B1 | 7/2002 | Hayashida et al. |
| 6,425,825 B1 | 7/2002 | Sitrick |
| 6,425,827 B1 | 7/2002 | Nimura |
| 6,425,828 B2 | 7/2002 | Walker et al. |
| 6,429,863 B1 | 8/2002 | LoPiccolo et al. |
| 6,430,997 B1 | 8/2002 | French et al. |
| 6,437,227 B1 | 8/2002 | Theimer |
| 6,438,611 B1 | 8/2002 | Hara et al. |
| D462,698 S | 9/2002 | Sturm |
| 6,444,887 B1 | 9/2002 | Hiraoka et al. |
| 6,450,886 B1 | 9/2002 | Oishi et al. |
| 6,450,888 B1 | 9/2002 | Takase et al. |
| 6,461,239 B1 | 10/2002 | Sagawa et al. |
| 6,463,205 B1 | 10/2002 | Aschbrenner et al. |
| 6,464,585 B1 | 10/2002 | Miyamoto et al. |
| 6,468,161 B1 | 10/2002 | Shimomura |
| 6,471,584 B1 | 10/2002 | Wada et al. |
| 6,482,087 B1 * | 11/2002 | Egozy et al. .................. 463/7 |
| 6,483,018 B2 | 11/2002 | Mead |
| 6,504,089 B1 | 1/2003 | Negishi et al. |
| 6,504,990 B1 | 1/2003 | Abecassis |
| 6,506,969 B1 | 1/2003 | Baron |
| 6,514,083 B1 | 2/2003 | Kumar et al. |
| 6,527,639 B2 | 3/2003 | Suzuki |
| 6,530,834 B2 | 3/2003 | Kondo |
| 6,530,839 B2 | 3/2003 | Horio |
| 6,535,269 B2 | 3/2003 | Sherman et al. |
| 6,540,613 B2 | 4/2003 | Okubo et al. |
| 6,541,692 B2 | 4/2003 | Miller |
| 6,542,155 B1 | 4/2003 | Mifune et al. |
| 6,542,168 B2 | 4/2003 | Negishi et al. |
| 6,544,119 B2 | 4/2003 | Kubo et al. |
| 6,544,122 B2 | 4/2003 | Araki et al. |
| 6,544,125 B2 | 4/2003 | Horigami et al. |
| 6,554,706 B2 | 4/2003 | Kim et al. |
| 6,554,711 B1 | 4/2003 | Kawasaki et al. |
| 6,555,737 B2 | 4/2003 | Miyaki et al. |
| 6,570,078 B2 | 5/2003 | Ludwig |
| 6,577,330 B1 | 6/2003 | Tsuda et al. |
| 6,582,235 B1 | 6/2003 | Tsai et al. |
| 6,582,309 B2 | 6/2003 | Higurashi et al. |
| 6,589,120 B1 | 7/2003 | Takahashi |
| 6,598,074 B1 | 7/2003 | Moller et al. |
| 6,599,195 B1 | 7/2003 | Araki et al. |
| 6,607,446 B1 | 8/2003 | Shimomura et al. |
| 6,608,249 B2 | 8/2003 | Georges |
| 6,609,979 B1 | 8/2003 | Wada |
| 6,611,278 B2 | 8/2003 | Rosenfeld |
| 6,612,931 B2 | 9/2003 | Kojima et al. |
| 6,613,100 B2 | 9/2003 | Miller |
| 6,618,053 B1 | 9/2003 | Tanner |
| 6,621,503 B1 | 9/2003 | Ubillos |
| 6,623,358 B2 | 9/2003 | Harima |
| 6,629,892 B2 | 10/2003 | Oe et al. |
| 6,634,886 B2 | 10/2003 | Oyama et al. |
| 6,636,877 B1 | 10/2003 | Doleac et al. |
| 6,638,160 B2 | 10/2003 | Yoshitomi |
| 6,645,067 B1 * | 11/2003 | Okita et al. .................. 463/7 |
| 6,645,076 B1 | 11/2003 | Sugai |
| 6,645,784 B2 | 11/2003 | Tayebati et al. |
| 6,653,545 B2 | 11/2003 | Redmann et al. |
| 6,659,873 B1 | 12/2003 | Kitano et al. |
| 6,661,496 B2 | 12/2003 | Sherman et al. |
| 6,663,491 B2 | 12/2003 | Watabe et al. |
| 6,666,764 B1 | 12/2003 | Kudo |
| 6,669,563 B1 | 12/2003 | Kitami et al. |
| 6,676,523 B1 | 1/2004 | Kasai et al. |
| 6,682,424 B2 | 1/2004 | Yamauchi et al. |
| 6,684,480 B2 | 2/2004 | Conrad |
| 6,685,480 B2 | 2/2004 | Nishimoto et al. |
| 6,695,694 B2 | 2/2004 | Ishikawa et al. |
| 6,725,108 B1 | 4/2004 | Hall |
| 6,727,889 B2 | 4/2004 | Shaw |
| 6,733,382 B2 | 5/2004 | Oe et al. |
| 6,738,052 B1 | 5/2004 | Manke et al. |
| 6,740,802 B1 | 5/2004 | Browne, Jr. |
| 6,740,803 B2 | 5/2004 | Brinkman et al. |
| 6,743,099 B2 | 6/2004 | Yabe et al. |
| 6,749,432 B2 | 6/2004 | French et al. |
| 6,749,508 B2 | 6/2004 | Kohira et al. |
| 6,750,848 B1 | 6/2004 | Pryor |
| 6,758,753 B1 | 7/2004 | Nagata et al. |
| 6,758,756 B1 | 7/2004 | Horigami et al. |
| 6,764,399 B2 | 7/2004 | Nagata et al. |
| 6,765,590 B1 | 7/2004 | Watahiki et al. |
| 6,765,726 B2 | 7/2004 | French et al. |
| 6,767,282 B2 | 7/2004 | Matsuyama et al. |
| 6,769,689 B1 | 8/2004 | Shimomura et al. |
| 6,786,821 B2 | 9/2004 | Nobe et al. |
| 6,801,930 B1 | 10/2004 | Dionne et al. |
| 6,811,491 B1 | 11/2004 | Levenberg et al. |
| 6,821,203 B2 | 11/2004 | Suga et al. |
| 6,831,220 B2 | 12/2004 | Varme |
| 6,831,656 B2 | 12/2004 | Kitao |
| 6,835,136 B2 | 12/2004 | Kitao |
| 6,835,887 B2 | 12/2004 | Devecka |
| 6,838,608 B2 | 1/2005 | Koike |
| 6,843,726 B1 | 1/2005 | Nomi et al. |
| 6,850,252 B1 | 2/2005 | Hoffberg |
| 6,852,034 B2 | 2/2005 | Nagata et al. |
| 6,856,923 B2 | 2/2005 | Jung |
| 6,857,960 B2 | 2/2005 | Okubo et al. |
| D503,407 S | 3/2005 | Kaku |
| 6,876,496 B2 | 4/2005 | French et al. |
| 6,881,148 B2 | 4/2005 | Yotsugi et al. |
| 6,881,887 B2 | 4/2005 | Berens |
| 6,890,262 B2 | 5/2005 | Oishi et al. |
| 6,893,343 B2 | 5/2005 | Suda et al. |
| 6,894,693 B1 | 5/2005 | Nash |
| 6,898,637 B2 | 5/2005 | Curtin |
| 6,905,413 B1 * | 6/2005 | Terao et al. .................. 463/7 |
| 6,915,488 B2 | 7/2005 | Omori et al. |
| 6,921,332 B2 | 7/2005 | Fukunaga et al. |
| 6,924,425 B2 | 8/2005 | Naples et al. |
| 6,930,235 B2 | 8/2005 | Sandborn et al. |
| 6,930,236 B2 | 8/2005 | Jung |
| 6,936,758 B2 | 8/2005 | Itoh |
| 6,949,023 B1 | 9/2005 | Okubo et al. |
| 6,953,887 B2 | 10/2005 | Nagashima et al. |
| 6,964,610 B2 | 11/2005 | Yamauchi et al. |
| 6,967,275 B2 | 11/2005 | Ozick |
| 6,976,918 B2 | 12/2005 | Hosokawa |
| 6,991,542 B2 | 1/2006 | Asami et al. |
| 6,995,765 B2 | 2/2006 | Boudier |
| 6,995,869 B2 | 2/2006 | Onodera |
| 6,998,527 B2 | 2/2006 | Agnihotri |
| 7,000,200 B1 | 2/2006 | Martins |
| 7,001,272 B2 | 2/2006 | Yamashita et al. |
| 7,010,291 B2 | 3/2006 | Iwanaga |
| D519,569 S | 4/2006 | Kiyono et al. |
| 7,022,905 B1 | 4/2006 | Hinman et al. |
| 7,027,046 B2 | 4/2006 | Zhang |
| 7,027,124 B2 | 4/2006 | Foote et al. |
| 7,030,307 B2 | 4/2006 | Wedel |
| 7,030,311 B2 | 4/2006 | Brinkman et al. |
| 7,037,197 B2 | 5/2006 | Watanabe |
| 7,044,856 B2 | 5/2006 | Suzuki |
| 7,044,857 B1 | 5/2006 | Klitsner et al. |
| 7,064,672 B2 | 6/2006 | Gothard |
| 7,066,818 B2 | 6/2006 | Ikeda |
| 7,069,296 B2 | 6/2006 | Moller et al. |
| 7,070,500 B1 | 7/2006 | Nomi et al. |
| 7,071,914 B1 | 7/2006 | Marks |
| 7,074,999 B2 | 7/2006 | Sitrick et al. |
| 7,076,052 B2 | 7/2006 | Yoshimura |
| 7,079,026 B2 | 7/2006 | Smith |
| 7,079,114 B1 | 7/2006 | Smith et al. |
| 7,084,855 B2 | 8/2006 | Kaku et al. |
| 7,084,888 B2 | 8/2006 | Takahama et al. |

(56) References Cited

U.S. PATENT DOCUMENTS

| | | |
|---|---|---|
| 7,098,392 B2 | 8/2006 | Sitrick et al. |
| 7,098,921 B2 | 8/2006 | Nash et al. |
| 7,103,873 B2 | 9/2006 | Tanner et al. |
| 7,119,268 B2 | 10/2006 | Futamase et al. |
| 7,122,751 B1 | 10/2006 | Anderson et al. |
| 7,123,272 B2 | 10/2006 | Moriyama |
| 7,126,607 B2 | 10/2006 | Emerson |
| 7,128,649 B2 | 10/2006 | Nobe et al. |
| 7,129,408 B2 | 10/2006 | Uehara |
| 7,134,876 B2 | 11/2006 | Hou |
| 7,142,807 B2 | 11/2006 | Lee |
| 7,143,353 B2 | 11/2006 | McGee et al. |
| 7,145,070 B2 | 12/2006 | Barry |
| D535,659 S | 1/2007 | Hally et al. |
| 7,164,075 B2 | 1/2007 | Tada |
| 7,164,076 B2 | 1/2007 | McHale et al. |
| 7,169,998 B2 | 1/2007 | Kondo et al. |
| 7,170,510 B2 | 1/2007 | Kawahara et al. |
| 7,174,510 B2 | 2/2007 | Salter |
| 7,189,912 B2 | 3/2007 | Jung |
| 7,192,353 B2 | 3/2007 | Okubo |
| 7,194,676 B2 | 3/2007 | Fayan et al. |
| 7,199,298 B2 | 4/2007 | Funaki |
| 7,199,801 B2 | 4/2007 | Tsunashima et al. |
| 7,201,659 B2 | 4/2007 | Nakayama et al. |
| 7,221,852 B2 | 5/2007 | Iizuka et al. |
| 7,223,913 B2 | 5/2007 | Knapp et al. |
| 7,227,526 B2 | 6/2007 | Hildreth et al. |
| 7,259,357 B2 | 8/2007 | Walker |
| 7,259,971 B1 | 8/2007 | Allen et al. |
| 7,263,668 B1 | 8/2007 | Lentz |
| 7,271,329 B2 | 9/2007 | Franzblau |
| 7,272,780 B2 | 9/2007 | Abbott et al. |
| 7,274,803 B1 | 9/2007 | Sharma et al. |
| 7,304,232 B1 | 12/2007 | Nicholes |
| 7,317,812 B1 | 1/2008 | Krahnstoever et al. |
| 7,320,643 B1 | 1/2008 | Brosius et al. |
| 7,323,631 B2 | 1/2008 | Miyaki et al. |
| 7,324,165 B2 | 1/2008 | Shan et al. |
| 7,336,890 B2 | 2/2008 | Lu et al. |
| 7,346,472 B1 | 3/2008 | Moskowitz et al. |
| 7,352,359 B2 | 4/2008 | Zalewski et al. |
| 7,352,952 B2 | 4/2008 | Herberger et al. |
| 7,359,121 B2 | 4/2008 | French et al. |
| 7,359,617 B2 | 4/2008 | Ma |
| D568,659 S | 5/2008 | Ophardt et al. |
| D568,892 S | 5/2008 | Stabb et al. |
| D569,382 S | 5/2008 | Yow et al. |
| 7,383,508 B2 | 6/2008 | Toyama et al. |
| 7,391,409 B2 | 6/2008 | Zalewski et al. |
| 7,391,874 B1 | 6/2008 | Semmes, Jr. et al. |
| D572,265 S | 7/2008 | Guimaraes et al. |
| 7,398,002 B2 | 7/2008 | Hsiao et al. |
| 7,408,106 B2 | 8/2008 | Weiner et al. |
| 7,423,213 B2 | 9/2008 | Sitrick |
| 7,430,360 B2 | 9/2008 | Abecassis |
| 7,432,810 B2 | 10/2008 | Menache et al. |
| 7,435,178 B1 | 10/2008 | Tam et al. |
| 7,453,035 B1 | 11/2008 | Evans et al. |
| 7,458,025 B2 | 11/2008 | Crow et al. |
| 7,459,324 B1 | 12/2008 | Ptasinski et al. |
| 7,459,624 B2 | 12/2008 | Schmidt et al. |
| 7,462,772 B2 | 12/2008 | Salter |
| 7,480,446 B2 | 1/2009 | Bhadkamkar et al. |
| 7,480,873 B2 | 1/2009 | Kawahara |
| 7,488,886 B2 | 2/2009 | Kemp |
| D590,407 S | 4/2009 | Watanabe et al. |
| 7,521,619 B2 | 4/2009 | Salter |
| 7,528,315 B2 | 5/2009 | Goodwin |
| 7,536,654 B2 | 5/2009 | Anthony et al. |
| 7,546,130 B2 | 6/2009 | Vance |
| 7,559,834 B1 | 7/2009 | York |
| 7,559,841 B2 | 7/2009 | Hashimoto |
| 7,579,543 B2 | 8/2009 | Haruyama et al. |
| D599,812 S | 9/2009 | Hirsch |
| D599,819 S | 9/2009 | Lew |
| 7,582,015 B2 | 9/2009 | Onoda et al. |
| 7,589,727 B2 | 9/2009 | Haeker |
| 7,593,618 B2 | 9/2009 | Xu et al. |
| 7,599,554 B2 | 10/2009 | Agnihotri et al. |
| 7,605,322 B2 | 10/2009 | Nakamura |
| 7,612,278 B2 | 11/2009 | Sitrick et al. |
| 7,625,284 B2 | 12/2009 | Kay et al. |
| 7,628,699 B2 | 12/2009 | Onoda et al. |
| 7,640,069 B1 | 12/2009 | Johnston |
| D607,892 S | 1/2010 | Murchie et al. |
| 7,649,134 B2 | 1/2010 | Kashioka |
| D609,715 S | 2/2010 | Chaudhri |
| 7,660,510 B2 | 2/2010 | Kawahara et al. |
| 7,660,700 B2 | 2/2010 | Moskowitz et al. |
| 7,690,017 B2 | 3/2010 | Stecyk et al. |
| 7,692,630 B2 | 4/2010 | Natsume et al. |
| 7,714,849 B2 | 5/2010 | Pryor |
| 7,716,572 B2 | 5/2010 | Beauregard et al. |
| 7,722,450 B2 | 5/2010 | Onoda et al. |
| 7,747,348 B2 | 6/2010 | Shim et al. |
| D619,598 S | 7/2010 | Maitlen et al. |
| D619,609 S | 7/2010 | Meziere |
| 7,754,961 B1 | 7/2010 | Yang et al. |
| 7,758,427 B2 | 7/2010 | Egozy |
| 7,760,908 B2 | 7/2010 | Curtner et al. |
| 7,772,480 B2 | 8/2010 | Brennan |
| 7,774,706 B2 | 8/2010 | Sakai |
| 7,789,741 B1 | 9/2010 | Fields et al. |
| 7,791,808 B2 | 9/2010 | French et al. |
| 7,797,641 B2 | 9/2010 | Karukka et al. |
| D624,932 S | 10/2010 | Chaudhri |
| 7,806,759 B2 | 10/2010 | McHale et al. |
| 7,814,436 B2 | 10/2010 | Schrag et al. |
| 7,823,070 B2 | 10/2010 | Nelson et al. |
| 7,829,777 B2 | 11/2010 | Kyuma et al. |
| 7,838,755 B2 | 11/2010 | Taub et al. |
| 7,840,288 B2 | 11/2010 | Graepel |
| 7,840,907 B2 | 11/2010 | Kikuchi et al. |
| D628,582 S | 12/2010 | Kurozumi et al. |
| 7,853,896 B2 | 12/2010 | Ok et al. |
| 7,853,897 B2 | 12/2010 | Ogawa et al. |
| 7,865,834 B1 | 1/2011 | van Os et al. |
| 7,877,690 B2 | 1/2011 | Margulis |
| 7,881,702 B2 | 2/2011 | Heyworth et al. |
| 7,890,867 B1 | 2/2011 | Margulis |
| 7,893,337 B2 | 2/2011 | Lenz |
| 7,895,617 B2 | 2/2011 | Pedlow, Jr. |
| 7,899,389 B2 | 3/2011 | Mangum |
| 7,904,814 B2 | 3/2011 | Errico et al. |
| 7,917,644 B2 | 3/2011 | Vedantham et al. |
| 7,920,931 B2 | 4/2011 | Van de Sluis et al. |
| 7,923,620 B2 | 4/2011 | Foster |
| 7,928,307 B2 | 4/2011 | Hetherington et al. |
| 7,935,880 B2 | 5/2011 | Stoddard et al. |
| 7,949,494 B2 | 5/2011 | Moskowitz et al. |
| 7,973,230 B2 | 7/2011 | Mahowald |
| 7,982,114 B2 | 7/2011 | Applewhite et al. |
| 8,003,872 B2 | 8/2011 | Lopiccolo et al. |
| 8,010,088 B2 | 8/2011 | Cheng |
| 8,026,435 B2 | 9/2011 | Stoddard et al. |
| D650,802 S | 12/2011 | Jang et al. |
| 8,076,564 B2 | 12/2011 | Applewhite |
| 8,076,574 B2 | 12/2011 | Irmer |
| 8,079,901 B2 | 12/2011 | Brosius et al. |
| 8,079,907 B2 | 12/2011 | Egozy |
| 8,080,722 B2 | 12/2011 | Applewhite et al. |
| D651,608 S | 1/2012 | Allen et al. |
| D651,609 S | 1/2012 | Pearson et al. |
| 8,176,439 B2 | 5/2012 | Kamen et al. |
| 8,198,526 B2 | 6/2012 | Izen |
| 8,205,172 B2 | 6/2012 | Wong et al. |
| 8,209,606 B2 | 6/2012 | Ording |
| 8,214,175 B2 | 7/2012 | Moskowitz et al. |
| 8,225,227 B2 | 7/2012 | Headrick et al. |
| 8,230,360 B2 | 7/2012 | Ma et al. |
| D664,975 S | 8/2012 | Arnold |
| 2001/0004861 A1 | 6/2001 | Suzuki et al. |
| 2001/0007824 A1 | 7/2001 | Fukuda |

(56) References Cited

U.S. PATENT DOCUMENTS

| | | |
|---|---|---|
| 2001/0007829 A1 | 7/2001 | Suzuki |
| 2001/0008844 A1 | 7/2001 | Yamauchi et al. |
| 2001/0008846 A1 | 7/2001 | Yamauchi et al. |
| 2001/0012795 A1 | 8/2001 | Asami et al. |
| 2001/0014440 A1 | 8/2001 | Oyama et al. |
| 2001/0014620 A1 | 8/2001 | Nobe et al. |
| 2001/0014621 A1 | 8/2001 | Okubo et al. |
| 2001/0016510 A1 | 8/2001 | Ishikawa et al. |
| 2001/0023202 A1 | 9/2001 | Okubo |
| 2001/0024972 A1 | 9/2001 | Kitao |
| 2001/0030652 A1 | 10/2001 | Kitao |
| 2001/0031653 A1 | 10/2001 | Oe et al. |
| 2001/0033287 A1 | 10/2001 | Naegle et al. |
| 2001/0035868 A1 | 11/2001 | Uehara et al. |
| 2001/0036861 A1 | 11/2001 | Uehara et al. |
| 2001/0037181 A1 | 11/2001 | Matsuura et al. |
| 2001/0039207 A1 | 11/2001 | Horigami et al. |
| 2001/0041615 A1 | 11/2001 | Kondo |
| 2002/0002411 A1 | 1/2002 | Higurashi et al. |
| 2002/0002900 A1 | 1/2002 | Cho |
| 2002/0004420 A1 | 1/2002 | Suga et al. |
| 2002/0005109 A1 | 1/2002 | Miller |
| 2002/0006819 A1 | 1/2002 | Kubo et al. |
| 2002/0006823 A1 | 1/2002 | Horio |
| 2002/0013166 A1 | 1/2002 | Yoshitomi |
| 2002/0016203 A1 | 2/2002 | Nagata et al. |
| 2002/0019258 A1 | 2/2002 | Kim et al. |
| 2002/0022520 A1 | 2/2002 | Oe et al. |
| 2002/0022522 A1 | 2/2002 | Yamada |
| 2002/0025841 A1 | 2/2002 | Nobe et al. |
| 2002/0025842 A1* | 2/2002 | Nobe et al. ........................ 463/7 |
| 2002/0025853 A1 | 2/2002 | Kojima et al. |
| 2002/0027899 A1 | 3/2002 | Ikeda |
| 2002/0032054 A1 | 3/2002 | Hosoya |
| 2002/0041385 A1 | 4/2002 | Onodera |
| 2002/0052236 A1 | 5/2002 | Kohira et al. |
| 2002/0054127 A1 | 5/2002 | Omori et al. |
| 2002/0055383 A1 | 5/2002 | Onda et al. |
| 2002/0055386 A1 | 5/2002 | Yotsugi et al. |
| 2002/0061776 A1 | 5/2002 | Wada et al. |
| 2002/0065121 A1 | 5/2002 | Fukunaga et al. |
| 2002/0085833 A1 | 7/2002 | Miyauchi |
| 2002/0091455 A1 | 7/2002 | Williams |
| 2002/0091847 A1 | 7/2002 | Curtin |
| 2002/0094865 A1 | 7/2002 | Araki et al. |
| 2002/0094866 A1 | 7/2002 | Takeda et al. |
| 2002/0105229 A1 | 8/2002 | Tanaka |
| 2002/0119811 A1 | 8/2002 | Yabe et al. |
| 2002/0128736 A1 | 9/2002 | Yoshida et al. |
| 2002/0142818 A1 | 10/2002 | Nakatsuka et al. |
| 2002/0142824 A1 | 10/2002 | Kazaoka et al. |
| 2002/0142827 A1 | 10/2002 | Aida et al. |
| 2002/0142834 A1 | 10/2002 | Sobue |
| 2002/0151337 A1 | 10/2002 | Yamashita et al. |
| 2002/0160824 A1 | 10/2002 | Goto et al. |
| 2002/0169014 A1 | 11/2002 | Egozy et al. |
| 2002/0187835 A1 | 12/2002 | Nakayama et al. |
| 2002/0198045 A1 | 12/2002 | Okubo |
| 2003/0000364 A1 | 1/2003 | Deverich |
| 2003/0003431 A1 | 1/2003 | Maeda |
| 2003/0003991 A1 | 1/2003 | Kuraishi |
| 2003/0003992 A1 | 1/2003 | Furuya |
| 2003/0011620 A1 | 1/2003 | Moriyama |
| 2003/0014262 A1 | 1/2003 | Kim |
| 2003/0017872 A1 | 1/2003 | Oishi et al. |
| 2003/0028598 A1 | 2/2003 | Moller et al. |
| 2003/0032478 A1 | 2/2003 | Takahama et al. |
| 2003/0045334 A1 | 3/2003 | Hosokawa |
| 2003/0069071 A1 | 4/2003 | Britt et al. |
| 2003/0070159 A1 | 4/2003 | Webb |
| 2003/0078086 A1 | 4/2003 | Matsuyama et al. |
| 2003/0078102 A1 | 4/2003 | Okita et al. |
| 2003/0099461 A1 | 5/2003 | Johnson |
| 2003/0104868 A1 | 6/2003 | Okita et al. |
| 2003/0109298 A1 | 6/2003 | Oishi et al. |
| 2003/0151628 A1 | 8/2003 | Salter |
| 2003/0164084 A1 | 9/2003 | Redmann et al. |
| 2003/0195041 A1 | 10/2003 | McCauley |
| 2003/0199317 A1 | 10/2003 | McCauley |
| 2003/0214498 A1 | 11/2003 | Gothard |
| 2003/0218626 A1 | 11/2003 | Greene |
| 2003/0232644 A1 | 12/2003 | Takahashi et al. |
| 2003/0232645 A1 | 12/2003 | Suda et al. |
| 2004/0012540 A1 | 1/2004 | Treibitz et al. |
| 2004/0021684 A1 | 2/2004 | Millner |
| 2004/0054725 A1 | 3/2004 | Moller et al. |
| 2004/0063479 A1 | 4/2004 | Kimura |
| 2004/0063480 A1 | 4/2004 | Wang |
| 2004/0072620 A1 | 4/2004 | Nagata et al. |
| 2004/0077405 A1 | 4/2004 | Watanabe |
| 2004/0082380 A1 | 4/2004 | George et al. |
| 2004/0082386 A1 | 4/2004 | George et al. |
| 2004/0089139 A1 | 5/2004 | Georges et al. |
| 2004/0092303 A1 | 5/2004 | George et al. |
| 2004/0092304 A1 | 5/2004 | George et al. |
| 2004/0092305 A1 | 5/2004 | George et al. |
| 2004/0092306 A1 | 5/2004 | George et al. |
| 2004/0092307 A1 | 5/2004 | George et al. |
| 2004/0092313 A1 | 5/2004 | Saito et al. |
| 2004/0092314 A1 | 5/2004 | George et al. |
| 2004/0093354 A1 | 5/2004 | Xu et al. |
| 2004/0098582 A1 | 5/2004 | Mori |
| 2004/0109000 A1 | 6/2004 | Chosokabe |
| 2004/0113360 A1 | 6/2004 | George et al. |
| 2004/0116069 A1 | 6/2004 | Fadavi-Ardekani et al. |
| 2004/0116184 A1 | 6/2004 | George et al. |
| 2004/0116185 A1 | 6/2004 | George et al. |
| 2004/0123726 A1 | 7/2004 | Kato et al. |
| 2004/0127282 A1 | 7/2004 | Naobayashi |
| 2004/0127291 A1 | 7/2004 | George et al. |
| 2004/0132518 A1 | 7/2004 | Uehara et al. |
| 2004/0132531 A1 | 7/2004 | George et al. |
| 2004/0137984 A1 | 7/2004 | Salter |
| 2004/0152514 A1 | 8/2004 | Kasai et al. |
| 2004/0154460 A1 | 8/2004 | Virolainen et al. |
| 2004/0181592 A1 | 9/2004 | Samra et al. |
| 2004/0186720 A1 | 9/2004 | Kemmochi |
| 2004/0204211 A1 | 10/2004 | Suzuki |
| 2004/0204238 A1 | 10/2004 | Aoki |
| 2004/0205204 A1 | 10/2004 | Chafe |
| 2004/0207774 A1 | 10/2004 | Gothard |
| 2004/0209673 A1 | 10/2004 | Shiraishi |
| 2004/0229685 A1* | 11/2004 | Smith et al. ..................... 463/29 |
| 2004/0236543 A1 | 11/2004 | Stephens |
| 2004/0239678 A1 | 12/2004 | Tsunashima et al. |
| 2004/0243482 A1 | 12/2004 | Laut |
| 2004/0254016 A1 | 12/2004 | Shimazaki |
| 2004/0259631 A1 | 12/2004 | Katz et al. |
| 2004/0259632 A1 | 12/2004 | Crittenden et al. |
| 2004/0259644 A1 | 12/2004 | McCauley |
| 2005/0027381 A1 | 2/2005 | George et al. |
| 2005/0027383 A1 | 2/2005 | Nagata et al. |
| 2005/0045025 A1 | 3/2005 | Wells et al. |
| 2005/0049047 A1 | 3/2005 | Kitao |
| 2005/0059480 A1 | 3/2005 | Soukup et al. |
| 2005/0060231 A1 | 3/2005 | Soukup et al. |
| 2005/0070349 A1 | 3/2005 | Kimura |
| 2005/0070359 A1 | 3/2005 | Rodriquez et al. |
| 2005/0073427 A1 | 4/2005 | Gothard |
| 2005/0075165 A1 | 4/2005 | George et al. |
| 2005/0082559 A1 | 4/2005 | Hasan Zaidi et al. |
| 2005/0101364 A1 | 5/2005 | Onoda et al. |
| 2005/0106546 A1 | 5/2005 | Strom |
| 2005/0115383 A1 | 6/2005 | Chang |
| 2005/0120865 A1 | 6/2005 | Tada |
| 2005/0120868 A1 | 6/2005 | Hinman et al. |
| 2005/0143174 A1 | 6/2005 | Goldman et al. |
| 2005/0164779 A1 | 7/2005 | Okuniewicz |
| 2005/0181864 A1 | 8/2005 | Britt et al. |
| 2005/0215319 A1 | 9/2005 | Rigopulos et al. |
| 2005/0221892 A1 | 10/2005 | Takase |
| 2005/0227767 A1 | 10/2005 | Shimomura et al. |
| 2005/0229769 A1 | 10/2005 | Resnikoff |
| 2005/0235809 A1 | 10/2005 | Kageyama |

(56) References Cited

U.S. PATENT DOCUMENTS

| | | |
|---|---|---|
| 2005/0250565 A1 | 11/2005 | Nojiri et al. |
| 2005/0252362 A1 | 11/2005 | McHale et al. |
| 2005/0255914 A1* | 11/2005 | McHale et al. ............ 463/31 |
| 2005/0255923 A1 | 11/2005 | Aoki |
| 2005/0273319 A1 | 12/2005 | Dittmar et al. |
| 2006/0003839 A1 | 1/2006 | Lawrence et al. |
| 2006/0009282 A1 | 1/2006 | George et al. |
| 2006/0009979 A1 | 1/2006 | McHale et al. |
| 2006/0026304 A1 | 2/2006 | Price |
| 2006/0030382 A1 | 2/2006 | Okamura et al. |
| 2006/0052161 A1 | 3/2006 | Soukup et al. |
| 2006/0052162 A1 | 3/2006 | Soukup et al. |
| 2006/0052163 A1 | 3/2006 | Aida |
| 2006/0052167 A1 | 3/2006 | Boddicker et al. |
| 2006/0052169 A1 | 3/2006 | Britt et al. |
| 2006/0058099 A1 | 3/2006 | Soukup et al. |
| 2006/0058101 A1 | 3/2006 | Rigopulos |
| 2006/0063573 A1 | 3/2006 | Ishikawa et al. |
| 2006/0068911 A1 | 3/2006 | Pirich et al. |
| 2006/0107819 A1 | 5/2006 | Salter |
| 2006/0107822 A1 | 5/2006 | Bowen |
| 2006/0135253 A1 | 6/2006 | George et al. |
| 2006/0152622 A1 | 7/2006 | Tan et al. |
| 2006/0154710 A1 | 7/2006 | Serafat |
| 2006/0166744 A1 | 7/2006 | Igarashi et al. |
| 2006/0175758 A1 | 8/2006 | Riolo |
| 2006/0189879 A1 | 8/2006 | Miyajima et al. |
| 2006/0191401 A1 | 8/2006 | Ueshima et al. |
| 2006/0204214 A1 | 9/2006 | Shah et al. |
| 2006/0218239 A1 | 9/2006 | Umezawa et al. |
| 2006/0218288 A1 | 9/2006 | Umezawa et al. |
| 2006/0247046 A1 | 11/2006 | Choi et al. |
| 2006/0252503 A1 | 11/2006 | Salter |
| 2006/0258450 A1 | 11/2006 | Ishihata et al. |
| 2006/0266200 A1 | 11/2006 | Goodwin |
| 2006/0287106 A1 | 12/2006 | Jensen |
| 2006/0288842 A1 | 12/2006 | Sitrick et al. |
| 2006/0290810 A1 | 12/2006 | Mallinson |
| 2007/0015571 A1 | 1/2007 | Walker et al. |
| 2007/0026943 A1 | 2/2007 | Yoshimura |
| 2007/0059670 A1 | 3/2007 | Yates |
| 2007/0060312 A1 | 3/2007 | Dempsey et al. |
| 2007/0081562 A1 | 4/2007 | Ma |
| 2007/0088812 A1 | 4/2007 | Clark |
| 2007/0111802 A1 | 5/2007 | Ishihara et al. |
| 2007/0119292 A1 | 5/2007 | Nakamura |
| 2007/0140510 A1 | 6/2007 | Redmann |
| 2007/0155494 A1 | 7/2007 | Wells et al. |
| 2007/0162497 A1 | 7/2007 | Pauws |
| 2007/0163427 A1 | 7/2007 | Rigopulos et al. |
| 2007/0163428 A1 | 7/2007 | Salter |
| 2007/0168415 A1 | 7/2007 | Matahira et al. |
| 2007/0175317 A1 | 8/2007 | Salter |
| 2007/0178973 A1 | 8/2007 | Camhi |
| 2007/0201815 A1 | 8/2007 | Griffin |
| 2007/0218444 A1 | 9/2007 | Konetski et al. |
| 2007/0226293 A1 | 9/2007 | Sakurada et al. |
| 2007/0232374 A1 | 10/2007 | Lopiccolo et al. |
| 2007/0234284 A1 | 10/2007 | Tanner et al. |
| 2007/0234881 A1 | 10/2007 | Takehisa |
| 2007/0234885 A1 | 10/2007 | Schmidt et al. |
| 2007/0243915 A1 | 10/2007 | Egozy et al. |
| 2007/0245881 A1 | 10/2007 | Egozy et al. |
| 2007/0256540 A1 | 11/2007 | Salter |
| 2007/0256541 A1 | 11/2007 | McCauley |
| 2007/0260984 A1 | 11/2007 | Marks et al. |
| 2007/0265095 A1 | 11/2007 | Jonishi |
| 2007/0270223 A1 | 11/2007 | Nonaka et al. |
| 2007/0273700 A1 | 11/2007 | Nash et al. |
| 2007/0297755 A1 | 12/2007 | Holt et al. |
| 2008/0009346 A1 | 1/2008 | Jessop et al. |
| 2008/0026355 A1 | 1/2008 | Petef |
| 2008/0053295 A1 | 3/2008 | Goto et al. |
| 2008/0076497 A1 | 3/2008 | Kiskis et al. |
| 2008/0096654 A1 | 4/2008 | Mondesir et al. |
| 2008/0101762 A1 | 5/2008 | Kellock et al. |
| 2008/0102958 A1 | 5/2008 | Kitamura |
| 2008/0113698 A1 | 5/2008 | Egozy |
| 2008/0113797 A1 | 5/2008 | Egozy |
| 2008/0115657 A1 | 5/2008 | Wakiyama |
| 2008/0125229 A1 | 5/2008 | Jonishi |
| 2008/0146342 A1 | 6/2008 | Harvey et al. |
| 2008/0155421 A1 | 6/2008 | Ubillos et al. |
| 2008/0184870 A1 | 8/2008 | Toivola |
| 2008/0200224 A1 | 8/2008 | Parks |
| 2008/0202321 A1 | 8/2008 | Goto et al. |
| 2008/0220864 A1 | 9/2008 | Brosius et al. |
| 2008/0222685 A1 | 9/2008 | McCarthy et al. |
| 2008/0268943 A1 | 10/2008 | Jacob |
| 2008/0273755 A1 | 11/2008 | Hildreth |
| 2008/0276175 A1 | 11/2008 | Kim et al. |
| 2008/0280680 A1 | 11/2008 | Dutilly et al. |
| 2008/0288866 A1 | 11/2008 | Spencer et al. |
| 2008/0289477 A1 | 11/2008 | Salter |
| 2008/0311969 A1 | 12/2008 | Kay et al. |
| 2008/0311970 A1 | 12/2008 | Kay et al. |
| 2009/0010335 A1 | 1/2009 | Harrison et al. |
| 2009/0013253 A1 | 1/2009 | Laefer et al. |
| 2009/0015653 A1 | 1/2009 | Baek |
| 2009/0038467 A1 | 2/2009 | Brennan |
| 2009/0073117 A1 | 3/2009 | Tsurumi et al. |
| 2009/0075711 A1 | 3/2009 | Brosius et al. |
| 2009/0082078 A1 | 3/2009 | Schmidt et al. |
| 2009/0083281 A1 | 3/2009 | Sarig et al. |
| 2009/0088249 A1 | 4/2009 | Kay |
| 2009/0098918 A1 | 4/2009 | Teasdale et al. |
| 2009/0100992 A1 | 4/2009 | Elion |
| 2009/0104956 A1 | 4/2009 | Kay et al. |
| 2009/0122146 A1 | 5/2009 | Zalewski et al. |
| 2009/0135135 A1 | 5/2009 | Tsurumi |
| 2009/0158220 A1 | 6/2009 | Zalewski et al. |
| 2009/0165632 A1 | 7/2009 | Rigopulos et al. |
| 2009/0177742 A1 | 7/2009 | Rhoads et al. |
| 2009/0186698 A1 | 7/2009 | Ludden |
| 2009/0188371 A1 | 7/2009 | Chiu et al. |
| 2009/0189775 A1 | 7/2009 | Lashina et al. |
| 2009/0191932 A1 | 7/2009 | Chiu et al. |
| 2009/0215533 A1 | 8/2009 | Zalewski et al. |
| 2009/0222392 A1 | 9/2009 | Martin et al. |
| 2009/0228544 A1 | 9/2009 | Demers et al. |
| 2009/0231425 A1 | 9/2009 | Zalewski |
| 2009/0241758 A1 | 10/2009 | Neubacker |
| 2009/0258686 A1 | 10/2009 | McCauley et al. |
| 2009/0258700 A1 | 10/2009 | Bright et al. |
| 2009/0258703 A1 | 10/2009 | Brunstetter |
| 2009/0260508 A1 | 10/2009 | Elion |
| 2009/0265668 A1 | 10/2009 | Esser et al. |
| 2009/0282335 A1 | 11/2009 | Alexandersson |
| 2009/0300676 A1 | 12/2009 | Harter, Jr. |
| 2009/0310027 A1 | 12/2009 | Fleming |
| 2009/0317783 A1 | 12/2009 | Noguchi |
| 2009/0318228 A1 | 12/2009 | Hughes |
| 2010/0009749 A1 | 1/2010 | Chrzanowski, Jr. et al. |
| 2010/0009750 A1 | 1/2010 | Egozy et al. |
| 2010/0029386 A1 | 2/2010 | Pitsch et al. |
| 2010/0035688 A1 | 2/2010 | Picunko et al. |
| 2010/0041477 A1 | 2/2010 | Kay et al. |
| 2010/0064238 A1 | 3/2010 | Ludwig |
| 2010/0080528 A1 | 4/2010 | Yen et al. |
| 2010/0087240 A1 | 4/2010 | Egozy et al. |
| 2010/0100848 A1 | 4/2010 | Ananian et al. |
| 2010/0113117 A1 | 5/2010 | Ku et al. |
| 2010/0120470 A1 | 5/2010 | Kim et al. |
| 2010/0137049 A1 | 6/2010 | Epstein |
| 2010/0144436 A1 | 6/2010 | Marks et al. |
| 2010/0160038 A1 | 6/2010 | Youm et al. |
| 2010/0161432 A1 | 6/2010 | Kumanov et al. |
| 2010/0186579 A1 | 7/2010 | Schnitman |
| 2010/0192106 A1 | 7/2010 | Watanabe et al. |
| 2010/0209003 A1 | 8/2010 | Toebes et al. |
| 2010/0228740 A1 | 9/2010 | Cannistraro et al. |
| 2010/0245241 A1 | 9/2010 | Kim et al. |
| 2010/0247081 A1 | 9/2010 | Victoria Pons et al. |
| 2010/0255827 A1 | 10/2010 | Jordan et al. |

(56) References Cited

U.S. PATENT DOCUMENTS

| | | |
|---|---|---|
| 2010/0265398 A1 | 10/2010 | Johnson et al. |
| 2010/0283723 A1 | 11/2010 | Konishi |
| 2010/0299405 A1 | 11/2010 | Socher et al. |
| 2010/0300264 A1 | 12/2010 | Foster |
| 2010/0300265 A1 | 12/2010 | Foster et al. |
| 2010/0300266 A1 | 12/2010 | Stoddard et al. |
| 2010/0300267 A1 | 12/2010 | Stoddard et al. |
| 2010/0300268 A1 | 12/2010 | Applewhite et al. |
| 2010/0300269 A1 | 12/2010 | Applewhite |
| 2010/0300270 A1 | 12/2010 | Applewhite et al. |
| 2010/0304810 A1 | 12/2010 | Stoddard |
| 2010/0304811 A1 | 12/2010 | Schmidt et al. |
| 2010/0304812 A1 | 12/2010 | Stoddard et al. |
| 2010/0304863 A1 | 12/2010 | Applewhite et al. |
| 2010/0304865 A1 | 12/2010 | Picunko et al. |
| 2010/0306655 A1 | 12/2010 | Mattingly et al. |
| 2011/0010667 A1 | 1/2011 | Sakai et al. |
| 2011/0028214 A1 | 2/2011 | Bright et al. |
| 2011/0047471 A1 | 2/2011 | Lord et al. |
| 2011/0066940 A1 | 3/2011 | Asghari Kamrani et al. |
| 2011/0098106 A1 | 4/2011 | He et al. |
| 2011/0098109 A1 | 4/2011 | Leake et al. |
| 2011/0185309 A1 | 7/2011 | Challinor et al. |
| 2011/0195779 A1 | 8/2011 | Lau |
| 2011/0197740 A1 | 8/2011 | Chang et al. |
| 2011/0237324 A1 | 9/2011 | Clavin et al. |
| 2011/0238676 A1 | 9/2011 | Liu et al. |
| 2011/0251840 A1 | 10/2011 | Cook et al. |
| 2011/0256929 A1 | 10/2011 | Dubrofsky et al. |
| 2011/0257771 A1 | 10/2011 | Bennett |
| 2011/0283236 A1 | 11/2011 | Beaumier et al. |
| 2011/0306396 A1 | 12/2011 | Flury et al. |
| 2011/0306397 A1 | 12/2011 | Fleming et al. |
| 2011/0306398 A1 | 12/2011 | Boch et al. |
| 2011/0312397 A1 | 12/2011 | Applewhite et al. |
| 2011/0312415 A1 | 12/2011 | Booth et al. |
| 2012/0021833 A1 | 1/2012 | Boch et al. |
| 2012/0063617 A1 | 3/2012 | Ramos et al. |
| 2012/0094730 A1 | 4/2012 | Egozy et al. |

FOREIGN PATENT DOCUMENTS

| | | |
|---|---|---|
| EP | 919267 A2 | 6/1999 |
| EP | 972550 A2 | 1/2000 |
| EP | 974382 A1 | 1/2000 |
| EP | 974954 A1 | 1/2000 |
| EP | 978301 A1 | 2/2000 |
| EP | 982055 A1 | 3/2000 |
| EP | 992928 A2 | 4/2000 |
| EP | 992929 A2 | 4/2000 |
| EP | 993847 A1 | 4/2000 |
| EP | 0997870 A1 | 5/2000 |
| EP | 1003130 A2 | 5/2000 |
| EP | 1022672 A1 | 7/2000 |
| EP | 1029565 A2 | 8/2000 |
| EP | 1029566 A2 | 8/2000 |
| EP | 1029570 A2 | 8/2000 |
| EP | 1029571 A2 | 8/2000 |
| EP | 1031363 A2 | 8/2000 |
| EP | 1031904 A2 | 8/2000 |
| EP | 1033157 A2 | 9/2000 |
| EP | 1033158 A2 | 9/2000 |
| EP | 1043745 A1 | 10/2000 |
| EP | 1043746 A1 | 10/2000 |
| EP | 1048330 A2 | 11/2000 |
| EP | 1061501 A1 | 12/2000 |
| EP | 1064974 A2 | 1/2001 |
| EP | 1064975 A2 | 1/2001 |
| EP | 1066866 A2 | 1/2001 |
| EP | 1079368 A1 | 2/2001 |
| EP | 1 081 680 A1 | 3/2001 |
| EP | 1081679 A1 | 3/2001 |
| EP | 1082981 A2 | 3/2001 |
| EP | 1082982 A2 | 3/2001 |
| EP | 1082983 A2 | 3/2001 |
| EP | 1088573 A2 | 4/2001 |
| EP | 1 096 468 | 5/2001 |
| EP | 1 096 468 A2 | 5/2001 |
| EP | 1114659 A2 | 7/2001 |
| EP | 1122703 A2 | 8/2001 |
| EP | 1125607 A2 | 8/2001 |
| EP | 1125613 A2 | 8/2001 |
| EP | 1127599 A2 | 8/2001 |
| EP | 1130569 A2 | 9/2001 |
| EP | 1132889 A2 | 9/2001 |
| EP | 1134723 A2 | 9/2001 |
| EP | 1136107 A2 | 9/2001 |
| EP | 1138357 A1 | 10/2001 |
| EP | 1139293 A2 | 10/2001 |
| EP | 1145744 A2 | 10/2001 |
| EP | 1145745 A2 | 10/2001 |
| EP | 1145748 A2 | 10/2001 |
| EP | 1145749 A2 | 10/2001 |
| EP | 1150276 A2 | 10/2001 |
| EP | 1151770 A2 | 11/2001 |
| EP | 1151773 A2 | 11/2001 |
| EP | 1157723 A2 | 11/2001 |
| EP | 1159992 A2 | 12/2001 |
| EP | 1160762 A2 | 12/2001 |
| EP | 1161974 A2 | 12/2001 |
| EP | 1 174 856 A2 | 1/2002 |
| EP | 1170041 A2 | 1/2002 |
| EP | 1178427 A1 | 2/2002 |
| EP | 1184061 A1 | 3/2002 |
| EP | 1187427 A2 | 3/2002 |
| EP | 1192976 A2 | 4/2002 |
| EP | 1195721 A2 | 4/2002 |
| EP | 1197947 A2 | 4/2002 |
| EP | 1199702 A2 | 4/2002 |
| EP | 1199703 A2 | 4/2002 |
| EP | 1 201 277 A2 | 5/2002 |
| EP | 1206950 A2 | 5/2002 |
| EP | 1208885 A1 | 5/2002 |
| EP | 1214959 A2 | 6/2002 |
| EP | 1220539 A2 | 7/2002 |
| EP | 1228794 A2 | 8/2002 |
| EP | 1245255 A2 | 10/2002 |
| EP | 1249260 A2 | 10/2002 |
| EP | 1258274 A2 | 11/2002 |
| EP | 1264622 A2 | 12/2002 |
| EP | 1270049 A2 | 1/2003 |
| EP | 1270050 A2 | 1/2003 |
| EP | 1271294 A2 | 1/2003 |
| EP | 1279425 A2 | 1/2003 |
| EP | 1287864 A2 | 3/2003 |
| EP | 1306112 A1 | 5/2003 |
| EP | 1413340 A1 | 4/2004 |
| EP | 1503365 A1 | 2/2005 |
| EP | 1533010 A1 | 5/2005 |
| EP | 1542132 A1 | 6/2005 |
| EP | 1552864 A1 | 7/2005 |
| EP | 1552865 A1 | 7/2005 |
| EP | 1569171 A1 | 8/2005 |
| EP | 1604711 A1 | 12/2005 |
| EP | 1609513 A1 | 12/2005 |
| EP | 1630746 A1 | 3/2006 |
| EP | 1666109 A1 | 6/2006 |
| EP | 1696385 A2 | 8/2006 |
| EP | 1699017 A2 | 9/2006 |
| EP | 1731204 A1 | 12/2006 |
| EP | 1743680 A1 | 1/2007 |
| EP | 1 758 387 A1 | 2/2007 |
| EP | 1 825 896 A1 | 8/2007 |
| EP | 00859418-0008 | 2/2008 |
| EP | 000890447-0040 | 4/2008 |
| EP | 000890447-0046 | 4/2008 |
| EP | 2001569 A2 | 12/2008 |
| EP | 2027577 A1 | 2/2009 |
| EP | 2206539 A1 | 7/2010 |
| EP | 2206540 A1 | 7/2010 |
| EP | 2301253 A1 | 3/2011 |
| EP | 2494432 A2 | 9/2012 |
| JP | 7185131 | 7/1995 |

(56) References Cited

FOREIGN PATENT DOCUMENTS

| | | |
|---|---|---|
| JP | 3014386 | 8/1995 |
| JP | 2552427 | 11/1996 |
| JP | 11053563 A | 2/1999 |
| JP | 11128534 A | 5/1999 |
| JP | 11128535 A | 5/1999 |
| JP | 11151380 A | 6/1999 |
| JP | 11156054 A | 6/1999 |
| JP | 2922509 | 7/1999 |
| JP | 11219443 A | 8/1999 |
| JP | 2951948 | 9/1999 |
| JP | 2982147 | 11/1999 |
| JP | 11313979 A | 11/1999 |
| JP | 3003851 | 1/2000 |
| JP | 2000014931 | 1/2000 |
| JP | 2000037490 | 2/2000 |
| JP | 3017986 | 3/2000 |
| JP | 3031676 | 4/2000 |
| JP | 2000107447 A | 4/2000 |
| JP | 2000107458 | 4/2000 |
| JP | 2000112485 A | 4/2000 |
| JP | 2000116938 A | 4/2000 |
| JP | 3053090 | 6/2000 |
| JP | 2000157723 | 6/2000 |
| JP | 3066528 | 7/2000 |
| JP | 2000218046 | 8/2000 |
| JP | 3088409 | 9/2000 |
| JP | 2000237454 A | 9/2000 |
| JP | 2000237455 A | 9/2000 |
| JP | 2000245957 | 9/2000 |
| JP | 2000245964 A | 9/2000 |
| JP | 2000245967 | 9/2000 |
| JP | 2000250534 | 9/2000 |
| JP | 2000/288254 | 10/2000 |
| JP | 2000293292 A | 10/2000 |
| JP | 2000293294 A | 10/2000 |
| JP | 2000300838 A | 10/2000 |
| JP | 2000300851 A | 10/2000 |
| JP | 2000308759 A | 11/2000 |
| JP | 2000317144 A | 11/2000 |
| JP | 2000325665 A | 11/2000 |
| JP | 2000350861 A | 12/2000 |
| JP | 2001000610 A | 1/2001 |
| JP | 2001009149 A | 1/2001 |
| JP | 2001009152 A | 1/2001 |
| JP | 2001009157 A | 1/2001 |
| JP | 2001046739 A | 2/2001 |
| JP | 2001062144 A | 3/2001 |
| JP | 2001070637 A | 3/2001 |
| JP | 2001070640 A | 3/2001 |
| JP | 2001070652 A | 3/2001 |
| JP | 2001075579 A | 3/2001 |
| JP | 2001096059 A | 4/2001 |
| JP | 2001096061 A | 4/2001 |
| JP | 2001129244 A | 5/2001 |
| JP | 2001145777 A | 5/2001 |
| JP | 2001145778 A | 5/2001 |
| JP | 3179769 | 6/2001 |
| JP | 2001162049 A | 6/2001 |
| JP | 2001170352 A | 6/2001 |
| JP | 2001175254 A | 6/2001 |
| JP | 3187758 | 7/2001 |
| JP | 2001190834 A | 7/2001 |
| JP | 2001190835 A | 7/2001 |
| JP | 2001190844 A | 7/2001 |
| JP | 2001198351 A | 7/2001 |
| JP | 2001198352 A | 7/2001 |
| JP | 2001198354 A | 7/2001 |
| JP | 3202733 | 8/2001 |
| JP | 2001212369 A | 8/2001 |
| JP | 2001218980 A | 8/2001 |
| JP | 2001222280 A | 8/2001 |
| JP | 2001224850 A | 8/2001 |
| JP | 2001231904 A | 8/2001 |
| JP | 2001232059 A | 8/2001 |
| JP | 2001232062 A | 8/2001 |
| JP | 2001-252470 | 9/2001 |
| JP | 3204652 | 9/2001 |
| JP | 2001252467 A | 9/2001 |
| JP | 2001259224 A | 9/2001 |
| JP | 2001269482 A | 10/2001 |
| JP | 2001273517 A | 10/2001 |
| JP | 2001293246 | 10/2001 |
| JP | 2001293254 A | 10/2001 |
| JP | 2001293256 A | 10/2001 |
| JP | 2001299975 A | 10/2001 |
| JP | 2001312260 A | 11/2001 |
| JP | 2001312740 A | 11/2001 |
| JP | 2001314645 A | 11/2001 |
| JP | 2001321565 A | 11/2001 |
| JP | 2001344049 A | 12/2001 |
| JP | 2001353374 | 12/2001 |
| JP | 3245139 | 1/2002 |
| JP | 2002000936 | 1/2002 |
| JP | 2002018123 | 1/2002 |
| JP | 2002018134 | 1/2002 |
| JP | 2002028368 | 1/2002 |
| JP | 3258647 | 2/2002 |
| JP | 3261110 | 2/2002 |
| JP | 2002045567 | 2/2002 |
| JP | 2002056340 | 2/2002 |
| JP | 2002066127 | 3/2002 |
| JP | 2002066128 | 3/2002 |
| JP | 2002084292 | 3/2002 |
| JP | 3270928 | 4/2002 |
| JP | 2002116752 | 4/2002 |
| JP | 2002140727 | 5/2002 |
| JP | 2002143567 | 5/2002 |
| JP | 2002153673 | 5/2002 |
| JP | 3306021 | 7/2002 |
| JP | 2002204426 | 7/2002 |
| JP | 3310257 | 8/2002 |
| JP | 3317686 | 8/2002 |
| JP | 3317956 | 8/2002 |
| JP | 2002224435 | 8/2002 |
| JP | 2002239223 | 8/2002 |
| JP | 2002239233 | 8/2002 |
| JP | 3320700 | 9/2002 |
| JP | 3321111 | 9/2002 |
| JP | 2002263229 A | 9/2002 |
| JP | 3333773 | 10/2002 |
| JP | 3338005 | 10/2002 |
| JP | 2002282417 | 10/2002 |
| JP | 2002282418 | 10/2002 |
| JP | 2002292123 | 10/2002 |
| JP | 2002292139 | 10/2002 |
| JP | 2002301263 A | 10/2002 |
| JP | 3345591 | 11/2002 |
| JP | 3345719 | 11/2002 |
| JP | 2002325975 | 11/2002 |
| JP | 3351780 | 12/2002 |
| JP | 2002360937 | 12/2002 |
| JP | 3361084 | 1/2003 |
| JP | 3370313 | 1/2003 |
| JP | 3371132 | 1/2003 |
| JP | 2003000951 | 1/2003 |
| JP | 2003010541 | 1/2003 |
| JP | 2003010542 | 1/2003 |
| JP | 2003019346 | 1/2003 |
| JP | 2003030686 | 1/2003 |
| JP | 2003058317 | 2/2003 |
| JP | 3392833 | 3/2003 |
| JP | 2003117233 | 4/2003 |
| JP | 2003126548 | 5/2003 |
| JP | 3417555 | 6/2003 |
| JP | 3417918 | 6/2003 |
| JP | 3420221 | 6/2003 |
| JP | 2003175279 | 6/2003 |
| JP | 3425548 | 7/2003 |
| JP | 3425552 | 7/2003 |
| JP | 3433918 | 8/2003 |
| JP | 3439187 | 8/2003 |
| JP | 2003236244 | 8/2003 |
| JP | 3442730 | 9/2003 |
| JP | 3448043 | 9/2003 |

(56) References Cited

FOREIGN PATENT DOCUMENTS

| | | |
|---|---|---|
| JP | 2003256552 A | 9/2003 |
| JP | 3458090 | 10/2003 |
| JP | 3470119 | 11/2003 |
| JP | 2003334387 A | 11/2003 |
| JP | 3491759 | 1/2004 |
| JP | 2004016315 | 1/2004 |
| JP | 2004016388 | 1/2004 |
| JP | 3496874 | 2/2004 |
| JP | 3500379 | 2/2004 |
| JP | 3500383 | 2/2004 |
| JP | 2004033266 | 2/2004 |
| JP | 2004097610 | 4/2004 |
| JP | 2004105309 | 4/2004 |
| JP | 2004121397 | 4/2004 |
| JP | 3526302 | 5/2004 |
| JP | 2004141261 | 5/2004 |
| JP | 3534345 | 6/2004 |
| JP | 2004164519 | 6/2004 |
| JP | 2004166994 | 6/2004 |
| JP | 3545755 | 7/2004 |
| JP | 3545983 | 7/2004 |
| JP | 3546206 | 7/2004 |
| JP | 3547374 | 7/2004 |
| JP | 2004192069 | 7/2004 |
| JP | 2004201937 | 7/2004 |
| JP | 3561456 | 9/2004 |
| JP | 3566195 | 9/2004 |
| JP | 3573288 | 10/2004 |
| JP | 3576994 | 10/2004 |
| JP | 3582716 | 10/2004 |
| JP | 2004283249 | 10/2004 |
| JP | 2004298469 | 10/2004 |
| JP | 2004321245 | 11/2004 |
| JP | 3597465 | 12/2004 |
| JP | 2004337256 | 12/2004 |
| JP | 3611807 | 1/2005 |
| JP | 2005046445 A | 2/2005 |
| JP | 2005049913 | 2/2005 |
| JP | 3626711 | 3/2005 |
| JP | 3634273 | 3/2005 |
| JP | 2005095440 | 4/2005 |
| JP | 3656118 | 6/2005 |
| JP | 3686906 | 8/2005 |
| JP | 3699660 | 9/2005 |
| JP | 2005261586 | 9/2005 |
| JP | 3702269 | 10/2005 |
| JP | 2005287830 | 10/2005 |
| JP | 2005301578 | 10/2005 |
| JP | 3715513 | 11/2005 |
| JP | 2005319025 | 11/2005 |
| JP | 3727275 | 12/2005 |
| JP | 2006020758 | 1/2006 |
| JP | 3753425 | 3/2006 |
| JP | 2006075264 | 3/2006 |
| JP | 2006116046 A | 5/2006 |
| JP | 2006116047 A | 5/2006 |
| JP | 2006192157 | 7/2006 |
| JP | 3804939 | 8/2006 |
| JP | 3816931 | 8/2006 |
| JP | 3822887 | 9/2006 |
| JP | 3831695 | 10/2006 |
| JP | 3869175 | 1/2007 |
| JP | 2007029589 | 2/2007 |
| JP | 3890445 | 3/2007 |
| JP | 2007504901 | 3/2007 |
| JP | 2008018287 A | 1/2008 |
| JP | 2008168143 A | 7/2008 |
| JP | 2009531153 A | 9/2009 |
| JP | 2010509000 A | 3/2010 |
| KP | 200100287533 A | 4/2001 |
| KP | 20050047024 A | 5/2005 |
| WO | WO-9717598 A1 | 5/1997 |
| WO | WO-9938588 | 8/1999 |
| WO | WO-01/63592 A2 | 8/2001 |
| WO | WO-0230535 | 4/2002 |
| WO | WO-2004002590 | 1/2004 |
| WO | WO-2004002594 | 1/2004 |
| WO | WO-2004024256 | 3/2004 |
| WO | WO-2004024263 | 3/2004 |
| WO | WO-2004027631 | 4/2004 |
| WO | WO-2004030779 | 4/2004 |
| WO | WO-2004052483 A1 | 6/2004 |
| WO | WO-2004053800 | 6/2004 |
| WO | WO-2004082786 | 9/2004 |
| WO | WO-2004087272 | 10/2004 |
| WO | WO-2004101093 | 11/2004 |
| WO | WO-2004107270 | 12/2004 |
| WO | WO-2005027062 | 3/2005 |
| WO | WO-2005027063 | 3/2005 |
| WO | WO-2005030354 | 4/2005 |
| WO | WO-2005099842 | 10/2005 |
| WO | WO-2005107902 | 11/2005 |
| WO | WO-2005/113096 A1 | 12/2005 |
| WO | WO-2005114648 | 12/2005 |
| WO | WO-2006006274 | 1/2006 |
| WO | WO-2006075494 | 7/2006 |
| WO | WO-2007/055522 A1 | 5/2007 |
| WO | WO-2007070738 A2 | 6/2007 |
| WO | WO-2007078639 A1 | 7/2007 |
| WO | WO-2007/115299 A2 | 10/2007 |
| WO | WO-2007130582 A2 | 11/2007 |
| WO | WO-2008001088 A2 | 1/2008 |
| WO | WO-2008145952 A1 | 12/2008 |
| WO | WO-2009021124 A2 | 2/2009 |
| WO | WO-2010036989 A1 | 4/2010 |
| WO | WO-2011155958 A1 | 12/2011 |

OTHER PUBLICATIONS

RedOctane. "Guitar Hero 2 Manual" [game manual] (2006). Activision Publishing, Inc.*
Virginia Tech Multimedia Music Dictionary: "P: Phrase" (No Date). Virginia Tech University url:<http://www.music.vt.edu/musicdictionary/textp/Phrase.html>.*
"Guitar Hero," In Wikipedia Online Encyclopedia. Wikipedia, 2007, Retrieved from the Internet: <URL: http://en.wikinedia.org/w/index.php?title=Guitar_Hero&oldid=137778068>, 4 pages (retrieved on Jul. 3, 2009).
"Rock Band," In Wikipedia Online Encyclopedia. Wikipedia, 2007, Retrieved from the Internet: <URL: http://en.wikipedia.org/w/index.php?title=Rock_Band_(video_game)&oldid=137406581>, 2 pages (retrieved on Jul. 3, 2009).
Beatnik Patent Sale Offering, Nov. 2008 (81 pp).
International Search Report issued for PCT/US2010/054300, dated May 31, 2011 (5 pages).
(Video) Alvin and the Chipmunks Chipwrecked—Majesco Sales: release—Nov. 2011 (http://www.youtube.com/watch?v=xKeW3CUt14A&feature=related).
(Video) Kidz Bop Dance Party! The Video Game (Released Sep. 14, 2010 on Wii) <http://www.youtube.com/watch?v=I8VD9EvFdeM>.
(Video) N.Y. Comic Con '10—Billie Jean Gameplay Demo: <http://www.gametrailers.com/video/nycc-10-michael-jackson/706056>; (Oct. 13, 2010).
Thalmann, "L'animation par ordinateur" http://web.archive.org/web/20060421045510/http://vrlab.epfl.ch/{thalmann/CG/infogr.4.pdf>, Apr. 21, 2006 (52 pages).
(Video) Tokyo Game Show '10—'Every Step' Trailer: http://www.gametrailers.com/video/tgs-10-michael-jackson/704548 (Sep. 15, 2010).
(Video) Victorious: Time to Shine—D3 publishers: Dec. 22, 2011 (http://www.youtube.com/watch?v=ud69OK02KGg&feature=fvst).
Microsoft PowerPoint Handbook, p. 616 (1992).
Kuwayama, Y. Trademarks & Symbols, vol. 2: Symbolical Designs, Van Nostrand Reinhold Company, (Nov. 4, 1980) (4 pages).
Boombox Icons, http://findicons.com/search/boombox, viewed on Jul. 31, 2012 copyright 2010 (1 page).
[Video] Microsoft Office Online Clip Art, http://office.microsoft.com/en-us/clipart/results.aspx?Scope=MC,MM,MP,MS

(56) References Cited

OTHER PUBLICATIONS

&PoleAssetID=MCJ04316180000&Querty=Icons&CTT=6 &Origin=EC01017435m (Feb. 21, 2007). 1 page.
U.S. Appl. No. 29/393,964, filed Jun. 10, 2011. 2 pages.
U.S. Appl. No. 29/393,967, filed Jun. 10, 2011. 2 pages.
U.S. Appl. No. 29/393,968, filed Jun. 10, 2011. 2 pages.
U.S. Appl. No. 29/393,970, filed Jun. 10, 2011. 2 pages.
U.S. Appl. No. 29/393,973, filed Jun. 10, 2011. 2 pages.
U.S. Appl. No. 29/393,975, filed Jun. 10, 2011. 2 pages.
Taiko Drum Master Game Manual, Namco Ltd. for PlayStation 2 (Oct. 25, 2004, 18 pages).
NCSX.com; Game Synpopsys of Guitar Freaks and DrumMania Masterpiece Gold, with a date of Mar. 8, 2007, and with an Archive.org Wayback Machine Verified date of May 17, 2007, downloaded from http://web.archiv.org/web/20070517210234/http://www.ncsx.com/2007/030507/guitarfreaks_gold.htm (4 pages).
Ramsey, A. Guitar Freaks and Drum Mania Masterpiece Gold FAQ v. 1.04, with a revision date of Apr. 2, 2007, and with a Archive.org Wayback Machine verified date of Apr. 22, 2007, dowloaded from http://web.archiv.org/web/20070422184212/http://www.gamefaqs.com/console/ps2/file/937670/47326 (4 pages).
Amplitude for Playstation. Retrieved from the Internet: www.target.com/gp/detail.hbnl/601-0682676-9911341?asin=B0000859TM&AFID. Retrieved on Feb. 22, 2005. 1 page.
Amplitude Review by Ryan Davis. Retrieved from the Internet: www.gamespot.com/ps2/puzzle/ampli~de /printable_6023980.html. Retrieved on Jun. 11, 2012. 10 pages.
Amplitude. Retrieved from the Internet: www.gamesquestdirect.com/71171972582.htrnl. Retrieved on Jun. 8, 2012. 2 pages.
Amplitude: Sony's Rocking Rhythm Game Outdoes Itself on All Fronts by Douglass C. Perry. Retrieved from the Internet: http://ps2.ign.com/articles/390/390620pl.thml. Retrieved on Jun. 8, 2012. 6 pages.
Beatmania IIDX 9 Style. Retrieved from the Internet: www.play-asia.com/paOS-13-71-8-iu.html. Retrieved on Feb. 22, 2005. 2 pages.
Beat Planet Music (Import) Review by Christian Nutt. Retrieved from the Internet: www.gamespot.com/ps/ action/beatplanetmusiclprintable _ 2546762.html. Retrieved on Jun. 11, 2012. 3 pages.
Beatmania PlayStation Review from www.GamePro.com/sony/psx/games/reviews/89.shtml. Retrieved on Feb. 22, 2005. 1 page.
Beatmania Review. Retrieved from the Internet: www.gamesarefun.com/gamesdb/review. h?reviewid=294. Retrieved on Jun. 11, 2012. 1 page.
Beatmanla IIDX 7 Style. Retrieved from the Internet: www.lik-sang.com/Info.php?category=27&products id=4061. Retrieved on Feb. 22, 2005. 1 page.
Bishop, Sam; Frequency: If you decide to pick up this game, you better give up ont he idea of getting a full night of sleep. via www.ign.com [online], Nov. 26, 2001 [retrieved on Mar. 1, 2006]. Retrieved from the Internet <URL: http://ps2.ign.com/articles/166/166450p1.html>. Retrieved on Jun. 8, 2012. 8 pages.
Bust a Groove Review by Jeff Gerstmann. Retrieved from the Internet: www.gamespolcom/ps/puzzlelbusta groove/printable_2546923.html. Retrieved on Jun. 11, 2012. 9 pages.
Bust a Groove. Retrieved from the Internet: www.buyritegames.com/product_information.asp?rc=frgl&number=PS-BUSTA2. Retrieved on Feb. 22, 2005. 1 page.
Bust a Groove. Retrieved from the Internet: www.estarland.com/index.asp?page=Piaystation&cat=F&oroduct=6257&q. Retrieved on Jun. 11, 2012. 2 pages.
Bust a Groove: 989 Studios Best Game of the Year is a Funky Dance Sim thars Got the Fever by Doug Peny. Retrieved from the Internet http://psx.com/articles/152/152308p1.html. Retrieved on Jun. 8, 2012. 5 pages.
BVH File Specification, Character Studio, http:/lweb.archive.org/web/20060321075406/http:/lcharacterstudio. neUbvh file specification.htm, Mar. 21, 2006 (16 pages).

Dance Dance Revolution Review by Andy Chien. Retrieved from the Internet www.gamingage.com/reviews /archive/old reviews/psx/ddr. Retrieved on Feb. 22, 2005. 3 pages.
Dance Dance Revolution Review by Ryan Davis. Retrieved from the Internet www.gamespolcom/ps/puzzJe/dancedancerevolutionfprintable_2699724.html. Retrieved on Jun. 11, 2012. 9 pages.
Dance Dance Revolution, Konami via wvvw.ign.com [online], Apr. 4, 2001 [retrieved on Mar. 1, 2006]. Retrieved from the Internet <URL: http://psx.ign.com/articles/161/161525p1.html>. Retrieved on Jun. 14, 2012. 7 pages.
Dance Dance Revolution. Retrieved from the Internet: www.ebgames.com/ebxlproduct/224 789.asp. Retrieved on Feb. 22, 2005. 2 pages.
Dancing with the Stars Game Manual (1 page).
Dave H, et al. StepMania Tutorial. Nov. 3, 2004. <http://web.archive.org/web/20041103 1145/www.stepmania.conVstepmania/wiki.php?pagename=Tutorial>. Retrieved on Jun. 19, 2012. 7 pages.
Def Jam Vendetta Review by Alex Navarro. Retrieved from the Internet www.gamespot.com/ps2/actionf actionfdefjamvendetta/prlntable_ 6024297 .html. Retrieved on Jun. 11, 2012. 10 pages.
Def Jam Vendetta. Retrieved from the Internet www.ebgames.com/ebxlproduct/232378.asp. Retrieved on Feb. 22, 2005. 2 pages.
Def Jam Vendetta: Rapper's Delight or Fight-Night Fright? Smash Sumthin' and Find Out by Jon Robinson. Mar. 31, 2003. Retrieved from the Internet http://ps2.ign.com/articles/391/391713pl.html. Retrieved on Jun. 8, 2012. 6 pages.
Digital Play: Reloaded. Opening Reception. Museum of the Moving Image. Mar. 19, 2005. <http://web.archive.Org/web/20050319060247/http://www.movingimage.us/site/screenings/contenV2005/digital_play_reloaded.html>. 1 page.
Donkey Konga Review by Ryan Davis. Retrieved from the Internet: www.gamespot.com/gamecubelpuzzle/donkeykonga/printable_6108977.html. Retrieved on Jun. 11, 2012. 11 pages.
Donkey Konga. Retrieved from the Internet: www.ebgames.com/ebxlproducV244024.asp. Retrieved on Jun. 11, 2012. 2 pages.
Donkey Konga: Could a Game Featuring Donkey Kong and Mini-Bongos ever Fail? Our Ful Review by Juan Castro. Retrieved from the Internet: cube.ign.com/articles/550/550723pl.html. Retrieved on Jun. 8, 2012. 6 pages.
DrumMana w/ Drum Set. Retrieved from the Internet www.estarland.com/index.asp?page=Playstation2&cat=RD&product=181268 &q. Retrieved on Jun. 11, 2012. 2 pages.
DrumMania (Import) Review by Jeff Garstmann. Retrieved from the Internet: www.gamespot.com/ps2/actionf drummania/prinlable_2546356.html. Retrieved on Jun. 11, 2012. 9 pages.
DrumMania OST. Retrieved from the Internet www.lik-sang.corn/info/php?category=264&products id=4793. Retrieved on Feb. 22, 2005. 2 pages.
DrumMania Review by Wynfwad. Retrieved from the Internet www.gamefaqs.com/console/ps2/review/ R56573.html. Retrieved on Jun. 11, 2012. 2 pages.
ESRB Game Ratings: Game Rating & Descriptor Guide via www.esrb.org[online], Retrived from the Internet: <URL: http:/Arvww.esrb.org/esrbratings_guide.asp#symbols>. Retrieved on Jun. 14, 2012. 3 pages.
Eye Toy Groove with Camera (Playstation 2). Retrieved from the Internet www.jr.com/JRProductPage.process?Product Code=PS2+97400&JRSource=google. Retrieved on Feb. 22, 2005. 1 page.
Eye Toy Groove with Eye Toy Camera PS2. Retrieved from the Internet: www.walmart.com/catalog/product.gsp?dest=9999999997 &product id-2607013&s. Retrieved on Feb. 22, 2005. 1 page.
Eye Toy: Groove—The Little Camera That Could comes Back with a Few New Tricks by Ed Lewis. Retrieved from the Internet: htiy/ps2.ign.corn/artjcles/507/507854pl.html. Retrieved on Jun. 8, 2012. 8 pages.
Eye Toy: Groove Review by Ryan Davis. Retrieved from the Internet: wvm.gamespot.com/ps2/puzzle/ eyetoygroove/printable_6094754.html. Retrieved on Jun. 11, 2012. 10 pages.
Frequency—Pre-Played. Retrieved from the Internet www.ebgames.com/ebx/product/203370.asp. Retrieved on Feb. 22, 2005. 2 pages.

(56) References Cited

OTHER PUBLICATIONS

Frequency PS2 Review from GamePro.com, written by Dan Electro on Nov. 26, 2001. Retrieved from the Internet: www.gamepro.com/sony/ps2/games/reviews/18464.shtml. Retrieved on Jun. 11, 2012. 2 pages.
Frequency PS2. Retrieved from the Internet: www.walmart.com/catalog/producL.gsp7dests9999999997&product id=1635738&s. Retrieved on Feb. 22, 2005. 2 pages.
Frequency Review by Ryan Davis. Retrieved from the Internet:www.gamespot.com/ps2/puzzle/frequency/ printable 2827476.html. Retrieved on Jun. 19, 2012. 9 pages.
Get on Da Mic Overview by Matt Gonzales. Retrieved from the Internet www.gamechronides.com/reviews/ ps2/getondamic/body.htm. Retrieved on Jun. 11, 2012. 3 pages.
Get on Da Mic Review by Jeff Gerstmann. Retrieved from the Internet wvw.gamespot.cx)rri/ps2/puzzle/getondamic/printable 6110242.html. Retrieved on Jun. 11, 2012. 10 pages.
Get on Da Mic. Retrieved from the Internet: www.ebgames.com/ebx/product/245102.asp. Retrieved on Jun. 11, 2012. 2 pages.
Gitaroo Man. Retrieved from the Internet www.estartand.com/index.asp?page=Piaystation2&cat=PZ&product=676&Q .. Retrieved on Jun. 14, 2012. 2 pages.
Gitaroo-Man Review by David Smith. Retrieved from the Internet htt£-ys2.ign.conVara'c!es/354/ 354413pjLhtml. Retrieved on Jun. 11, 2012. 4 pages.
Gitaroo-Man Review by Ryan Davis. Retrieved from the Internet: www.gamesrx)t.coiTi/ps2/puzzle/gitaroomart/printable 2847915.html. Retrieved on Jun. 19, 2012. 9 pages.
Gitaroo-Man. Retrieved from the Internet vvvrw.buyritegames.com/productjnformation.asp?re=frgl&number=PS2-GITARO. Retrieved on Feb. 22, 2005. 1 page.
Guitar Freaks (Import) Review by Sam Kennedy. Retrieved from the Internet: www.gamespot.com/pslaction/guitarfreaks/printable_2545966.html. Retrieved on Jun. 11, 2012. 10 pages.
Guitar Freaks Review by Wade Monnig. Retrieved from the Internet: www.gamesarefun.com/gamesdb/review. php? .reviewid=301. Retrieved on Jun. 11, 2012. 3 pages.
Guitar Freaks Sony. Retrieved from the Internet www.gameexpress.com/product_detail.cfm.?UPC=SCPS45422. Retrieved on Feb. 22, 2005. 1 page.
Guitar Freaks with Guitar. Retrieved from the Internet: www.buyritegames.com/product_information.asp?rc=frgl &number=PSJ-GUilWG. Retrieved on Feb. 22, 2005. 1 page.
Guitar Hero (video game)—Wikipedia, the free encyclopedia—(Publisher—RedOctane) Release Date Nov. 2005. 25 pages.
Guitar Hero—Wikipedia, the free encyclopedia—Nov. 2005. http://en.wikipedia.org/w/index.php?title=guitaryhero &oldid=137778068. Retrieved on May 22, 2012. 5 pages.
GuitarFreaks—Wikipedia, the free encyclopedia—(Publisher—Konami, Konami Digital Entertainment) Release Date 1998. Accessed on Mar. 19, 2009. 5 pages.
International Search Report, PCT/US2006/062287, Mailed on May 10, 2007. 2 pages.
Ipodgames.com Tips. Dec. 4, 2004. <http://web.archive.org/web/20041204032612Awww.ipodgames.com/tips.html > 1 page.
Karaoke Revolution Review by Jeff Gerstmann. Retrieved from the Internet www.gamespot.com/ps2/puzzle/ karaokerevolution/printable ... 6081709.html. Retrieved on Jun. 14, 2012. 10 pages.
Karaoke Revolution. Retrieved from the Internet: www.ebgames.com/ebxlproduct/24806.asp. Retrieved on Feb. 22, 2005. 2 pages.
Karaoke Revolution: The Revolution will be Televised by Ed Lewis. Retrieved from the Internet: http://ps2.ign.com/articles/458/458064p1.html. Retrieved on Jun. 11, 2012. 7 pages.
Lohman, "Rockstar vs. Guitar Hero," (The Rebel Yell). Nov. 13, 2008, accessed on Mar. 19, 2009. 5 pages.
Mad Maestro!—Pre-Played. Retrieved from the Internet: www.ebgames.com/ebx/product/217604.asp. Retrieved on Feb. 22, 2005. 2 pages.

Mad Maestro! by Ryan Davis. Retrieved from the Internet: www.gamespot.com/ps2/puzzle.madmaestro/ printable_2856821.html. Retrieved on Jun. 19, 2012. 9 pages.
Mad Maestro: The First Orchestra-conducting Sim on US Soil—Is It All It Could Have Been? by David Smith. Retrieved from the Internet http://ps2.ign.com/articles/3551355561 p1.html. Retrieved on Jun. 11, 2012. 6 pages.
Mojib Ribbon Playtest by Anoop Gantayat. Retrieved from the Internet: htto://os2.ion.com/articles/442/442204p1.html. Retrieved on Jun. 11, 2012. 4 pages.
Mojib Ribbon—Review. Retrieved from the Internet: www.ntsc-uk.com/review.php?platform=ps2&game=MoiibRibbon. Retrieved on Jun. 14, 2012. 2 pages.
Mojib Ribbon. Retrieved from the Internet: www.lik-sang.comlInfo.php?category=27&productsid=3805&PHPSESSID=b9eQca. Retrieved on Feb. 22, 2005. 1 page.
Mojib Ribbon. Retrieved from the Internet: www.ncsxshop.com/cgi-bin/shop/SCPS.11033.html. Retrieved on Jun. 14, 2012. 2 pages.
Non-Final Office Action as issued by the United States Patent and Trademark Office for U.S. Appl. No. 12/474,899, dated Jan. 19, 2011, 7 pages.
PaRappa the Rapper 2. Retrieved from the Internet:wvAV.amazon.eom/exedobidos/tg/deteil/-/B00005UNWD/ 104-4695527-8827110. Retrieved on Feb. 22, 2005. 2 pages.
PaRappa the Rapper Review by Jer Horwitz. Retrieved from the Internet: www.gamespot.com/pslpuzzlel parappatherapper/printable_2548866.html. Retrieved on Jun. 14, 2012. 9 pages.
Parappa the Rapper. Retrieved from the Internet: wvvw.estarland.com/index.asp?page=Playstation&cat=F&product=6871&q. Retrieved on Jun. 11, 2012. 2 pages.
Parappa the Rapper: PaRapper the Rapper is finally here, but does it live up to the hype? by Adam Douglas. Retrieved from the Internet http://psx.ign.com/articles1150/150490p1.html. Retrieved on Jun. 11, 2012. 2 pages.
PopCap Games Site Review via www.download-free-games.com, retrieved on Mar. 2, 2006]. Retrieved from the Internet <URL:http7Avww.download-free-games.com/reviews/popcap_games.htm>. 2 pages.
Rez PlayStation. Retrieved from the internet: http://global.yesasia.com/en/PrdDept.aspx/ pjd-1002847668. Retrieved on Jun. 14, 2012. 1 page.
Rez Review by Jeff Gerstmann. Retrieved from the Internet:www.qamespot.com/ps2/action/rez/printable 2838815.html. Retrieved on Jun. 11, 2012. 9 pages.
Rez. Retrieved from the Internet: vvww.estartand.a)rn/index.asp?page=Pfaystation2c\cat=RD&product=5426&q. Retrieved on Jun. 14, 2012. 2 pages.
Rez: You May Not Understand This Review. We May Not Either. But you should certainly play this game by.David Smith. Retrieved from the Internet: http/ps2.ign.corru'artides/166/166546p1.html. Retrieved on Jun. 11, 2012. 3 pages.
SingStar Party (SingStar2) Bundle. Retrieved from the Internet: www.gameswarehouse.com.Au/longpage.asp?gameid=10329. Retrieved on Feb. 22, 2005. 2 pages.
SingStar Party. Retrieved from the Internet: www.argos.co.uk/Webapp/wcs/stores/servlet/ProductDisplay?storeId=10001 &langId. Retrieved on Feb. 22, 2005. 1 page.
SingStar Review (PS2) by James Hamer-Mortonl. Retrieved from the Internet http://ps2.twomtown.net/en uk/articles/ art.print.php?id=5279. Retrieved on Jun. 11, 2012. 5 pages.
SingStar Review by Luke Van Leuveren. Retrieved from the Internet http://palgn.com.aii/article.php7id-1282. Retrieved on Jun. 11, 2012. 5 pages.
Space Channel 5 Special Edition Review by Brad Shoemaker. Retrieved from the Internet: www.gamespot.corn/ps2/puzzle/spacecriannel5pait2/printeble_6085137.h Retrieved on Jun. 11, 2012. 10 pages.
Space Channel 5. Retrieved from the Internet: www.lik-sang.com/info.php?products_is=2050&likref=fro_gle4. Retrieved on Feb. 22, 2005. 1 page.
Space Channel 5: Description. Retrieved from the Internet: www.buyritegames.com/product_information.asp?rc=frgl &number=DC-SPACEC5. Retrieved on Feb. 22, 2005. 1 page.

(56) References Cited

OTHER PUBLICATIONS

Space Channel 5: Special Edition by Jason Thompson. Retrieved from the Internet www.popmattere.corn/ mulumerJia/reviews/s/space-channel-5.shtml. Retrieved on Jun. 8, 2012. 2 pages.
Taiko Drum Master Review by Justin Calvert. Retrieved from the Internet: www.gamespot.com/ps2 puzzie/taikodrummaster/printable_6111767.html. Retrieved on Jun. 14, 2012. 10 pages.
Taiko Drum Master w/ Drum. Retrieved from the Internet: www.ebgames.com/ebx/product/244015.asp. Retrieved on Jun. 14, 2012. 2 pages.
Taiko no Tatsujin. Retrieved from the Internet htlpy/games.channel.aol.com/review.adp?qameID-7569. Retrieved on Feb. 22, 2005. 3 pages.
Vib Ribbon (PSX): Homepage, Screenshots by James Anthony. http://www.vib-ribbon.com/vibhtml/english/index.html. Retrieved on Jun. 14, 2012. 1 page.
Vib-Ribbon (Import) Review by Jeff Gerstmann. Retrieved from the Internet: www.gamespot.com/ps /puzzle/vibribbon/printabte 2550100.html. Retrieved on Jun. 14, 2012. 9 pages.
Vib-Ribbon. Retrieved from the Internet: www.ncsxshop.com/cgi-bin/shop/SCPS-45469.html. Retrieved on Feb. 22, 2005. 1 page.
Video MJ the Experience Kinect: release Apr. 2011, http//www.youtube.com/watch?v=N7oyxH I P48A.
Video 'Ghosts' Gameplay Trailer: <http://www.gametrailers.com/video/ghosts-gameplay-michaeljackson/ 706825> (Oct. 27, 2010).
Video <http://www.bing.com/videos/search?q=dance+instruction+game&mid=E69356CFA 1B6719FF 5C8E69356CFA1B6719FF5C8&view=detaii&FORM=VIRE5> (uploaded Jul. 27, 2010).
Video Britney's Dance Beat (Released May 8, 2002 for PS2); <http://www. youtube.com/watch?v=-KR 1 dR GNX w>.
Video Dance Dance Revolution: Hottest Party 3 (Released Sep. 27, 2009 for Wii) <http://www.youtube.com/watch?v=zk20hEzGmUY>.
Video Dance on Broadway—Ubisoft, Longtail Studios; <http://www.youtube.comiwatch?v='eYaPdT4z-M>: (June 6, 201Q}.
Video Dance on Broadway: Jun. 2010 (<http://youtu.be/Wi9Y5HHcvtY>).
Video Dance Summit 2001: Bust a Groove (Released Nov. 2, 2000 for PS2); <http://www.youtube.com/watch?v=E8NjTGHYQcM>.
Video Dancing With the Stars—Activision, Zoe Mode; <http://www.youtube.com/watch?v=C7zBVfEJO~:gp (Oct. 2007).
Video Dancing with the Stars: Oct. 2007 (http://www.youtube.com/watch?v=8UChG2v5DI).
Video Dancing with the Stars: We Dance—Activision, Zoe Mode; <http://www.youtube.com/watch?v=31GOb-CT8vs> (Oct. 2008).
Video DDR Hottest Party; <http://www.youtube.com/watch?v=zk20hEzGmUY> (Sep. 2007).
Video Don't Stop Gameplay Trailer: <http://www.gametrailers.com/video/dont-stop-michaeljackson/ 707336> (Nov. 10, 2010).
Video Dream Dance & Cheer (Released Sep. 13, 2009 for Wii) <http://www.voutube.com/watch?v=oi9vQiT1x5Q>.
Video E3 2010 Live Demo <http://www.gametrailers.com/video/e3-201 0-michael-jackson/101449>; (Jun. 14, 2010).
Video Eyetoy Groove for PS2; <http://www.youtube.com/watch?v=c80aaOU fuE> (A(2ri12004).
Video Gamescom '1 0—Billie Jean Demo <http:/iwww.aarnetraiiHrs.corn/video/gc-•1 Q..Michael-Jackson/703294>: 1:58-1 :13) (Aug. 20, 201 D).
Video Gamescom '10—Working Day and Night Demo <http://www.gametrailers.com/video/gc-1 0-michael-jackson/703295> (Aug. 20, 2010).
Video Grease Dance—505 Games: release—Oct. 2011 li_http://www.youtube.com/watch?v=PaGBHSB2urg).
Video Hannah Montana: Spotlight World Tour (Released Nov. 6, 2007 for Wii); <http://www.voutube.com/watch?v=WtyuU2NaL3Q>.

\* cited by examiner

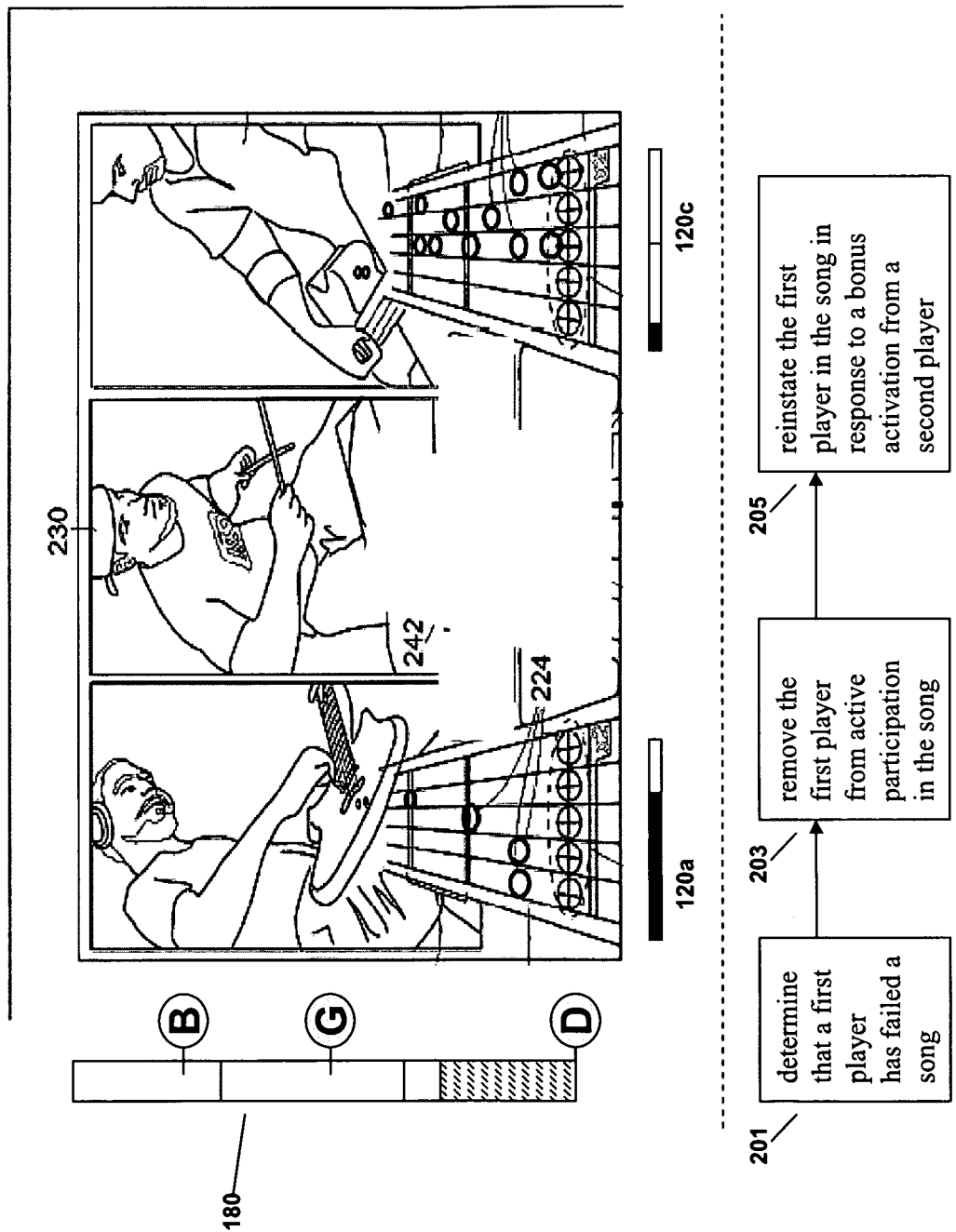

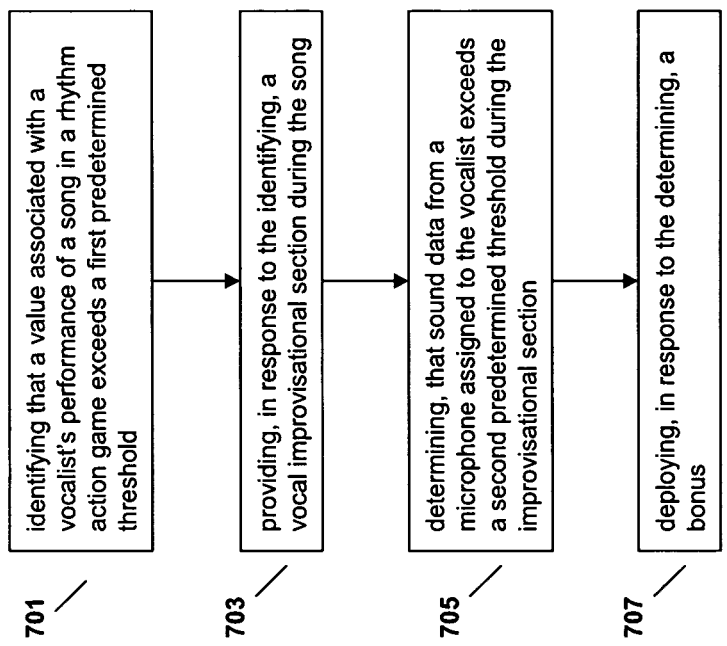

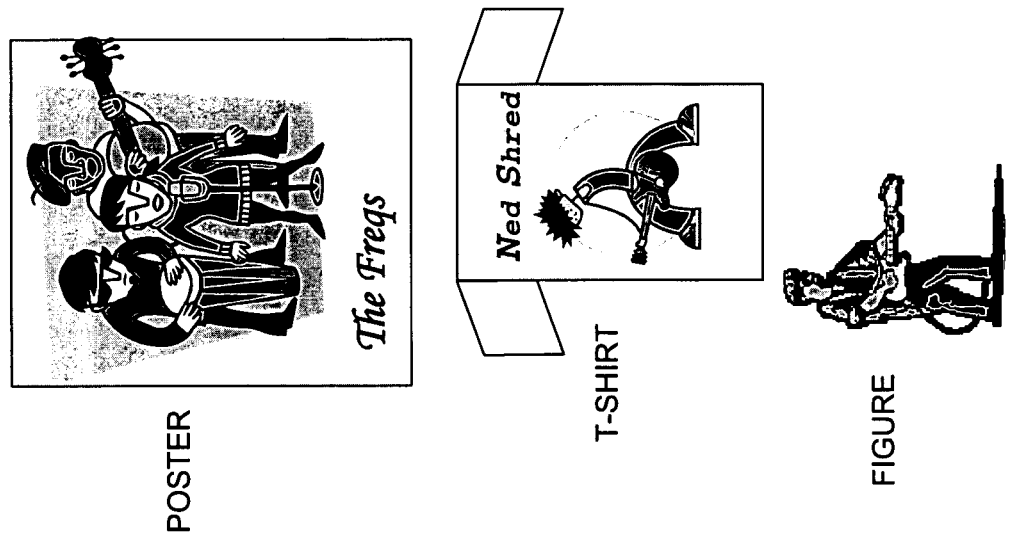
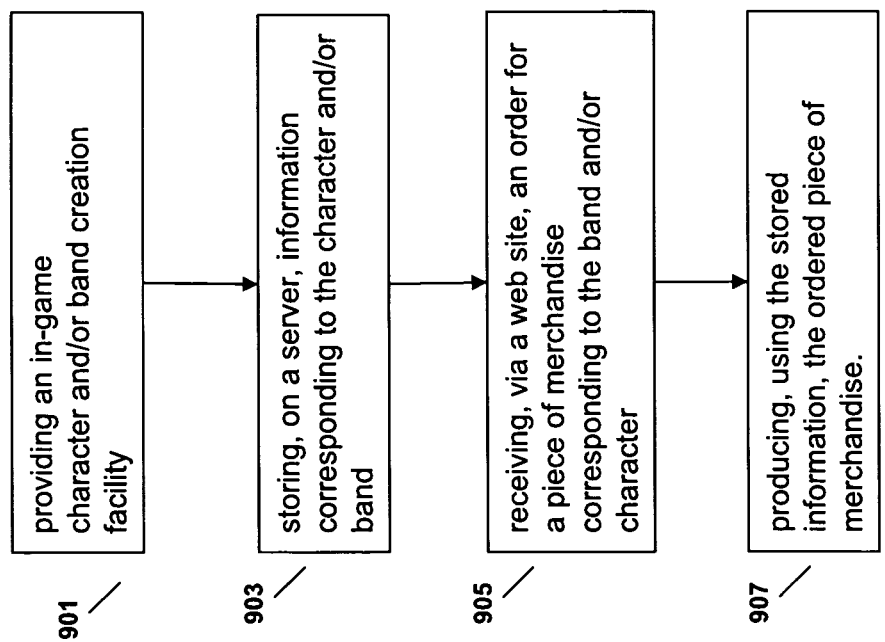
Fig. 9

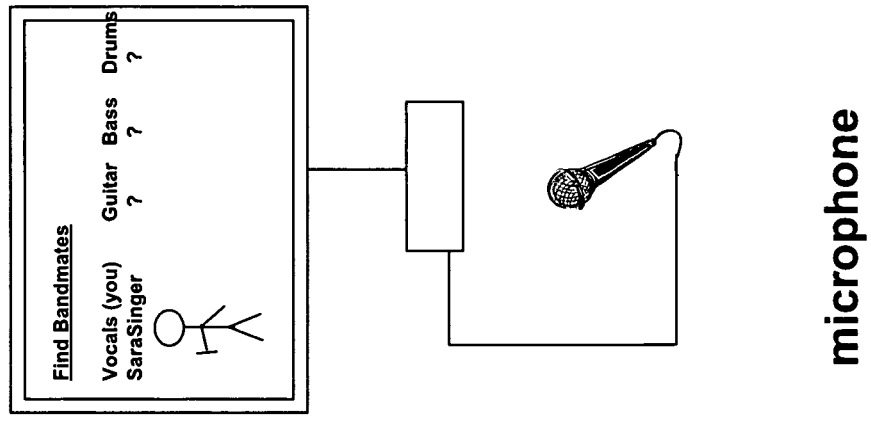
microphone
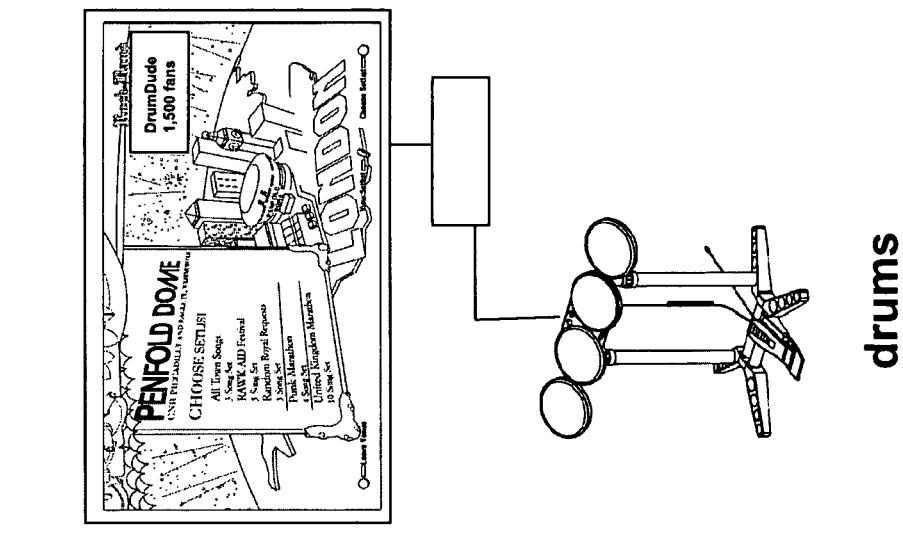
drums
Fig. 10
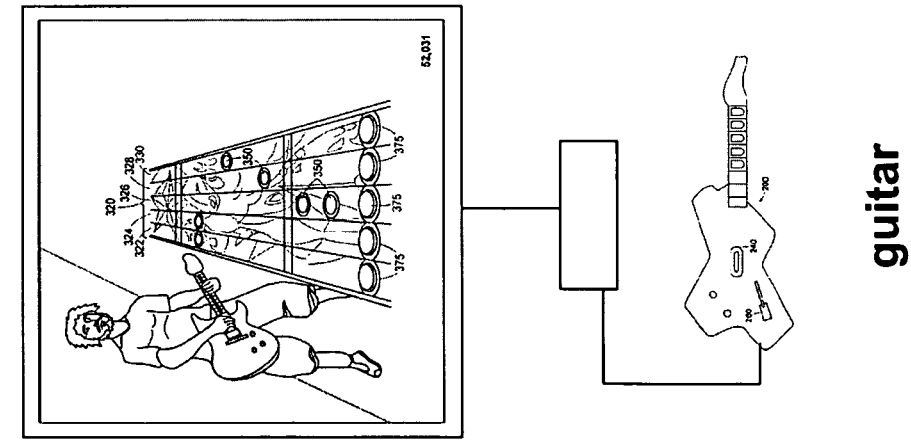
guitar

SYSTEMS AND METHODS FOR SIMULATING A ROCK BAND EXPERIENCE

RELATED APPLICATIONS

The present application claims priority to U.S. Provisional Application Ser. No. 60/944,054, filed Jun. 14, 2007 and titled "Systems and Methods for Simulating a Rock Band Experience," and which is hereby explicitly incorporated by reference herein.

FIELD OF THE INVENTION

The present invention relates to rhythm action games, and, more specifically, video games which simulate the experience of playing in a band.

BACKGROUND OF THE INVENTION

Music making is often a collaborative effort among many musicians who interact with each other. One form of musical interaction may be provided by a video game genre known as "rhythm-action," which involves a player performing phrases from a pre-recorded musical composition using a video game's input device to simulate a musical performance. If the player performs a sufficient percentage of the notes or cues displayed, he may score well and win the game. If the player fails to perform a sufficient percentage, he may score poorly and lose the game. Two or more players may compete against each other, such as by each one attempting to play back different, parallel musical phrases from the same song simultaneously, by playing alternating musical phrases from a song, or by playing similar phrases simultaneously. The player who plays the highest percentage of notes correctly may achieve the highest score and win. Two or more players may also play with each other cooperatively. In this mode, players may work together to play a song, such as by playing different parts of a song, either on similar or dissimilar instruments. One example of a rhythm-action game is the GUITAR HERO series of games published by Red Octane and Activision. Another example of a rhythm-action game is the KARAOKE REVOLUTION series of games published by Konami.

Past rhythm action games that have been released for home consoles have utilized a variety of controller types. For example, GUITAR HERO II, published by Red Octane, could be played with a simulated guitar controller or with a standard game console controller.

A rhythm action-game may require a number of inputs to be manipulated by a player simultaneously and in succession. Past rhythm action games have utilized lanes divided into sub-lanes to indicate actions. In these games, a lane is divided into a number of distinct sub-lanes, with each sub-lane corresponding to a different input element. For example, a lane for a player might be divided into five sub-lanes, with each sub-lane containing cues corresponding to a different one of five fret buttons on a simulated guitar. As cues appear in each of the sub-lanes, a player must press the appropriate corresponding fret button.

In some cases, the sub-lanes are laid out to correspond to a linear set of input elements. For example, a lane may be divided into five sub-lanes, each sub-lane containing red cues, green cues, yellow cues, blue cues and orange cues, respectively, to correspond to a guitar having a linear arrangement of a red button, green button, yellow button, blue button and orange button. Displaying cues may be more challenging in instances where input elements are not linearly arranged. For example, in the DRUMMANIA series of games published by Konami, players provided input via a number of drum pads and a foot pedal. Foot pedal actions were signified by a sub-lane containing cues shaped like feet.

In some single-player rhythm action games, such as the GUITAR HERO series, it is possible for a player to "fail" midway through a song. That is, if the player's performance falls below a given threshold, the player may be prevented from completing the song. Such a failure may be accompanied by sounds of the music stopping, the crowd booing, and images of the band stopping the performance. This possibility of failure may enhance a game by providing more serious consequences for poor performance than simply a lower score: if a player wants to complete a song to the end, the player must satisfy a minimum standard of performance. Adapting this failure mechanic to a multiplayer game presents a challenge, as the enhanced incentives for good performance may be desired, but it may be undesirable for one player to remain inactive for long periods of time while others are playing a song.

In many cases players may wish to play rhythm action games online, either cooperatively or competitively, with remote players. Thus there exists a need for efficient ways of matching remote players of rhythm action games.

SUMMARY OF THE INVENTION

The present disclosure broadly relates to video games which may be used to simulate a rock band experience.

In one aspect the present invention relates to systems and methods for indicating the performance of a plurality of players playing a video game simulating a rock band experience. In one embodiment, a method may include: calculating a player score for each player playing a rhythm action game within a band, each player score representing the performance level of a particular player; calculating a composite score for the band playing a rhythm action game, the composite score based in part on a performance level associated with each player within the band; displaying the composite score on a performance meter as a performance level; and displaying each player score on the performance meter as a graphical indication positioned on the meter at a position corresponding to the calculated player score.

In a second aspect, the present invention relates to systems and methods for allowing players in a band to reinstate a member of the band who has failed a given song during a game. Broadly, band members may use their own performance during a song to reinstate a band member who has failed during the course of the song. Once a band member has failed, options are given to other members of the band who have achieved a predetermined bonus or performance level to save the fallen band member. Once saved, the failed member returns to normal play of the song. In this manner, failure still has the consequence of removing a player from a song at least temporarily, and perhaps permanently if bandmates are unable or unwilling to save the fallen member. However, by providing the option of reinstatement, band members can prevent their friends from long stretches of inactivity following a failure. This may have the added benefit of encouraging band members to perform strongly in order to be able to save their friends.

In one embodiment; a method for reinstating a player within a rhythm action game includes: changing the status of a first player of a rhythm-action game from an active play status to an inactive play status during a performance of a song; determining a value, associated with a second player of the rhythm-action game, exceeds a predetermined threshold;

detecting an action of the second player; the action generated via manipulation of an input device by the second player; and reinstating the first player, in response to the determined value and the detected action, to an active play status during the performance of the song. In some embodiments, a bonus may be subtracted from the second player as a cost of the reinstatement.

In some embodiments, a total performance level for the band may be drained during the time a player is inactive, providing additional incentive for a band mate to reinstate the failed player.

In a third aspect, the present invention relates to systems and methods for allowing players of a rhythm action game to play improvisational sections during gameplay. In one embodiment, a method for providing improvisational vocal sections of a song during a rhythm action game comprises: identifying that a value associated with a vocalist's performance of a song in a rhythm action game exceeds a first predetermined threshold; providing, in response to the identifying, a vocal improvisational section during the song; determining, that sound data from a microphone assigned to the vocalist exceeds a second predetermined threshold during the improvisational section; and deploying, in response to the determining, a bonus. In some embodiments, the improvisational sections may be provided during portions of a song with no vocals.

In a fourth aspect, the present invention relates to systems and methods for creating and using simulated guitar controllers. In one embodiment a five-way switch may be included on a simulated guitar controller. In other embodiments, pressure sensitive fret buttons may be incorporated into a simulated guitar controller.

In a fifth aspect, the present invention relates to systems and methods for creating and using simulated drum sets in rhythm action games. In one embodiment, a simulated drum set may comprise a foot pedal using a contactless switch. In still another embodiment, a video game may allow a user to navigate menu items using a simulated drum set. In still another embodiment, a video game may reassign different percussion sounds to drum pads during the course of a single song.

In another embodiment, a video game may indicate a foot pedal is to be used through the use of one or more special gem indicators. Broadly speaking, for rhythm action games, a display in which musical cues are confined to distinct sub-lanes may not be optimal for all types of input devices. For example, if a simulated drum set contains a number of drum pads and foot pedal, the foot pedal may be neither "to the left" nor "to the right" of the drum pads. Thus, there may not be a logical way to map the foot-pedal input cues to a linear series of sub lanes. For example, it may be natural to display cues for four linearly arranged drum pads contained in four corresponding sub-lanes. However, if a foot-pedal cue is displayed in a sub lane to the right of the sub-lane corresponding to the furthest-right drum pad, it may have the undesirable effect of confusing a player into attempting to strike a drum pad that does not exist. While, as mentioned above in the context of DRUMMANIA, cues for foot-pedal actions can be specially colored or shaped to somewhat mitigate this confusion potential, a player is still faced with a linear display of a number of sub-lanes that does not logically map to the input devices the player is given.

The present disclosure addresses this problem by introducing cues that span a plurality or all of the sub-lanes contained within a lane. These larger cues are more difficult to mistake for cues indicating one of a number of linear input elements, and may thus be less likely to cause players to mistakenly attempt to use an incorrect or non-existent input. In one embodiment, a method for displaying a foot-pedal cue in a rhythm-action game includes: displaying, to a player of a rhythm-action game, a lane divided into at least two sub-lanes, each sub-lane containing cues indicating a drum input element; and displaying, to the player, an additional cue spanning a plurality of the sub-lanes, the additional cue indicating a foot pedal action. In some embodiments, the additional cue may span all the sub-lanes. In some embodiments, the additional cue may be a different color than other cues. In some embodiments, each sub-lane may contain cues indicating a drum input element of a set of linearly arranged drum input elements.

In another embodiment, a method for displaying cues in a rhythm-action game to indicate a specific input element includes: displaying, to a player of a rhythm-action game, a lane divided into X sub-lanes, each sub-lane containing cues indicating a unique one of a set of X input actions; and displaying, to the player, an additional cue spanning a plurality of the sub-lanes, the additional cue indicating a first input action not in the set of X input actions. In some embodiments, each of the set of X input actions corresponds to an input element in a linear arrangement, and the first input action corresponds to an input element not in the linear arrangement. In some embodiments, each of the set of X input actions identifies a fret button be depressed in combination with a strum, and the first input action corresponds to an open strum.

In a sixth aspect, the present invention relates to systems and methods for accepting vocal input in a video game. In one embodiment, phoneme detection may be used to determine if a player is singing approximately correct lyrics. In other embodiments, a vocalist may serve as a secondary percussionist during a song by providing input simulating a percussion instrument such as a tambourine or cowbell. In one embodiment, a method for combining vocal cues and percussion cues for a player of a rhythm action game during a song comprises: displaying, in a rhythm action game, a lane comprising cues corresponding to a vocal track of a song; displaying, on the lane during the song, at least one cue corresponding to a percussion element of the song; evaluating, with a first gameplay mechanic, a player's performance with respect to the cues corresponding to a vocal elements; and evaluating, with a second gameplay mechanic, the player's performance with respect to the cues corresponding to the percussion element. Such a method may be used to keep a vocalist engaged during portions of a song with no vocals.

In a seventh aspect, the present invention relates to systems and methods for matching remote players of a video game into bands for purposes of playing songs. Broadly speaking, bands may require certain instrumentation, and one object of the invention is to efficiently match remote players or groups of players to quickly form bands with the desired instrumentation for a song and/or session of a game. For example, players may play as bands featuring a guitarist, a bassist, a drummer, and a vocalist, and matchmaking methods may be used to allow players to play with others remotely according to the needed instrumentation.

In one embodiment; a method for matching suitable remote players to one or more local players of a rhythm-action game includes: identifying one or more local players to participate in a networked session of a rhythm action game corresponding to a predetermined band template, each local player associated with a type of simulated musical instrument. A first type of simulated musical instrument represented in the predetermined band template and not associated with any of the one or more local players may then be identified, along with a remote player associated with the first type of simulated musical instrument. A game session may then be provided including the one or more local players and the identified remote player.

In an eighth aspect, the present invention relates to systems and methods for providing a simulated world tour available to bands and solo players playing a video game simulating a rock band experience.

In a ninth aspect, the present invention relates to systems and methods for allowing players of a game to create merchandise corresponding to an in-game character, group of characters, or band.

In a tenth aspect, the present invention relates to a video game simulating a rock band experience which provides different gameplay content and experiences depending upon a simulated instrument controller type detected by the game. For example, the user experience if a simulated drum set is connected to the game console may be very different than if a simulated guitar is connected to the game console. For example, a game may provide a certain song list if the player has plugged in a simulated drum set, but provide a different song list if a player has connected a simulated guitar to the platform. In this way, a single game can be sold that allows users to select among a plurality of unique instrumental experiences. Or, for example, a player who wants to experience the game as a vocalist may plug in a microphone and be presented with a gameplay scenario in which the player must successfully sing the pitches and/or words to a song. The same player may then decide to experience the game as a drummer, connect a simulated drum set in place of the microphone, and be presented with a gameplay mechanic in which the player must successfully strike the pads of the drum set in time with the music. The game may be sold in a package with each of a plurality of instrument types, or the instruments may be sold separately from the game.

In one embodiment, a method for altering game content responsive to detecting a type of controller used by a player of a rhythm action game comprises: detecting, by a game executing on a game console, that a first simulated musical instrument type of a plurality of simulated musical instrument types is connected to the game console; selecting, by the game in response to the detection, a first song progression from a plurality of song progressions, each song progression corresponding to a different simulated musical instrument type, and wherein at least two of the song progressions comprise different sequences of songs; and providing, by the game, a session of a rhythm-action game with the selected first song progression.

In another embodiment, a method for altering game content responsive to detecting a type of controller used by a player of a rhythm action game comprises: detecting, by a game executing on a game console, that a first simulated musical instrument type of a plurality of simulated musical instrument types is connected to the game console; selecting, by the game from a plurality of collections of level data, each collection corresponding to a different simulated musical instrument type, a first collection of level data corresponding to the first simulated musical instrument type; and providing, by the game, a session of a rhythm-action game with the selected collection of level data.

In still another embodiment, a method for altering game content responsive to detecting a type of controller used by a player of a rhythm action game comprises: detecting, by a game executing on a game console, that a first simulated musical instrument type of a plurality of simulated musical instrument types is connected to the game console; selecting, by the game from a plurality of collections of level data, each collection corresponding to a different simulated musical instrument type, a first collection of level data corresponding to the first simulated musical instrument type; and providing, by the game, a session of a rhythm-action game with the selected collection of level data.

Computer readable media having executable code for implementing any of the above methods, functions, and features may also be provided.

BRIEF DESCRIPTION OF THE DRAWINGS

The foregoing and other objects, aspects, features, and advantages of the invention will become more apparent and better understood by referring to the following description taken in conjunction with the accompanying drawings, in which:

FIG. 2 depicts one embodiment of a method for allowing members of a band to resuscitating a band mate who has failed a song;

FIG. 7 is a flow diagram of a method for providing improvisational vocal sections of a song during a rhythm action game;

FIG. 9 illustrates one embodiment of a method for allowing players to purchase real-world merchandise based on in-game characters and bands;

FIG. 10 illustrates how a game may produce a different gaming experience in response to different hardware;

DETAILED DESCRIPTION

Figure 1A:
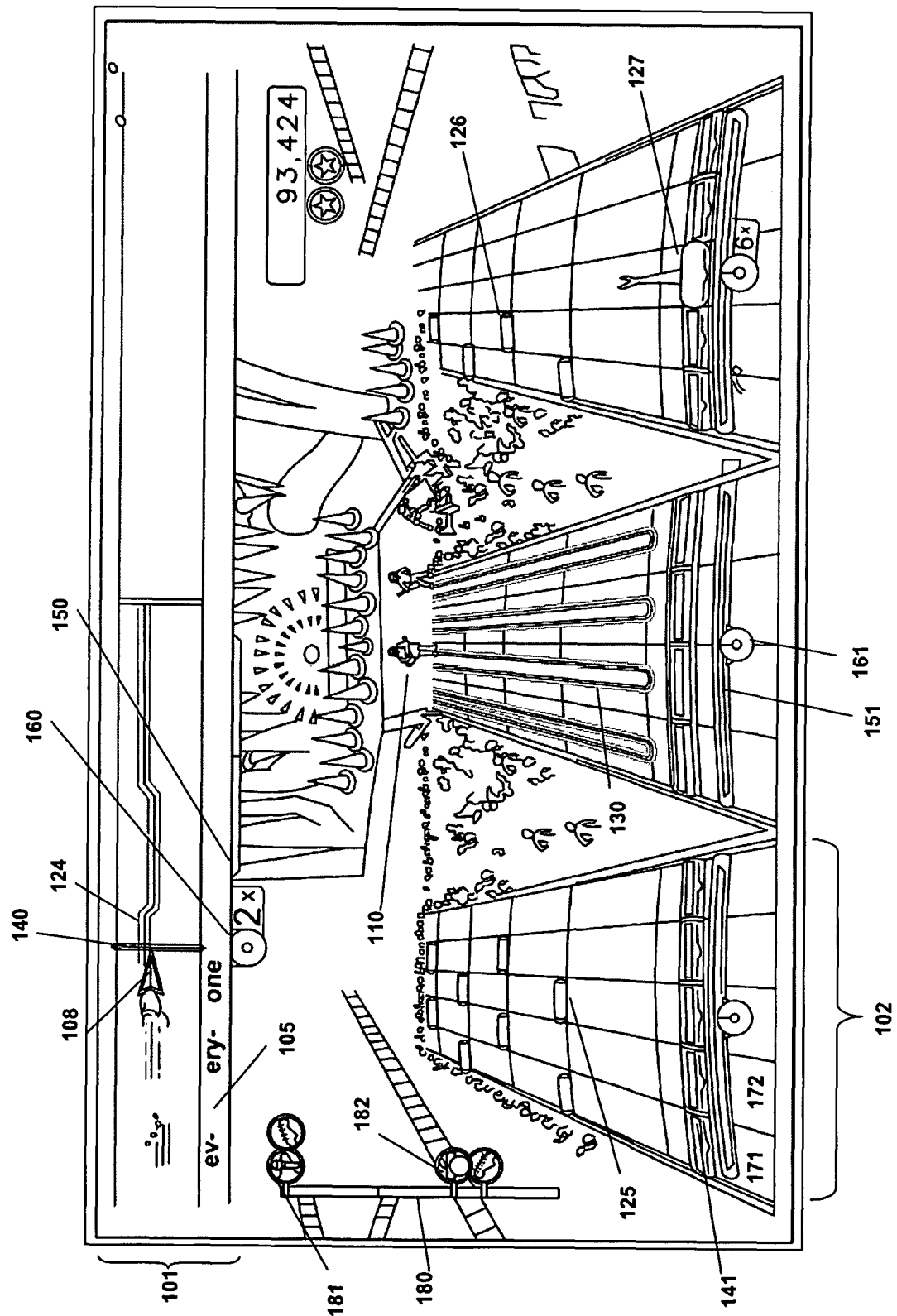
FIG. 1A is an example of one embodiment of a screen display of players emulating a musical performance.

Referring now to FIG. 1A, an embodiment of a screen display for a video game in which four players emulate a musical performance is shown. One or more of the players may be represented on screen by an avatar 110. Although FIG. 1A depicts an embodiment in which four players participate, any number of players may participate simultaneously. For example, a fifth player may join the game as a keyboard player. In this case, the screen may be further subdivided to make room to display a fifth avatar and/or music interface. In some embodiments, an avatar 110 may be a computer-generated image. In other embodiments, an avatar may be a digital image, such as a video capture of a person. An avatar may be modeled on a famous figure or, in some embodiments, the avatar may be modeled on the game player associated with the avatar.

Still referring to FIG. 1A, a lane 101 102 has one or more game "cues" 124, 125, 126, 127, 130 corresponding to musical events distributed along the lane. During gameplay, the cues, also referred to as "musical targets," "gems," or "game elements," appear to flow toward a target marker 140, 141. In some embodiments, the cues may appear to be flowing towards a player. The cues are distributed on the lane in a manner having some relationship to musical content associated with the game level. For example, the cues may represent note information (gems spaced more closely together for shorter notes and further apart for longer notes), pitch (gems placed on the left side of the lane for notes having lower pitch and the right side of the lane for higher pitch), volume (gems may glow more brightly for louder tones), duration (gems may be "stretched" to represent that a note or tone is sustained, such as the gem 127), articulation, timbre or any other time-varying aspects of the musical content. The cues may be any geometric shape and may have other visual characteristics, such as transparency, color, or variable brightness.

As the gems move along a respective lane, musical data represented by the gems may be substantially simultaneously played as audible music. In some embodiments, audible music represented by a gem is only played (or only played at full or original fidelity) if a player successfully "performs the musical content" by capturing or properly executing the gem. In some embodiments, a musical tone is played to indicate successful execution of a musical event by a player. In other embodiments, a stream of audio is played to indicate successful execution of a musical event by a player. In certain embodiments, successfully performing the musical content triggers or controls the animations of avatars.

In other embodiments, the audible music, tone, or stream of audio represented by a cue is modified, distorted, or otherwise manipulated in response to the player's proficiency in executing cues associated with a lane. For example, various digital filters can operate on the audible music, tone, or stream of audio prior to being played by the game player. Various parameters of the filters can be dynamically and automatically modified in response to the player capturing cues associated with a lane, allowing the audible music to be degraded if the player performs poorly or enhancing the audible music, tone, or stream of audio if the player performs well. For example, if a player fails to execute a game event, the audible music, tone, or stream of audio represented by the failed event may be muted, played at less than full volume, or filtered to alter its sound.

In certain embodiments, a "wrong note" sound may be substituted for the music represented by the failed event. Conversely, if a player successfully executes a game event, the audible music, tone, or stream of audio may be played normally. In some embodiments, if the player successfully executes several, successive game events, the audible music, tone, or stream of audio associated with those events may be enhanced, for example, by adding an echo or "reverb" to the audible music. The filters can be implemented as analog or digital filters in hardware, software, or any combination thereof. Further, application of the filter to the audible music output, which in many embodiments corresponds to musical events represented by cues, can be done dynamically, that is, during play. Alternatively, the musical content may be processed before game play begins. In these embodiments, one or more files representing modified audible output may be created and musical events to output may be selected from an appropriate file responsive to the player's performance.

In addition to modification of the audio aspects of game events based on the player's performance, the visual appearance of those events may also be modified based on the player's proficiency with the game. For example, failure to execute a game event properly may cause game interface elements to appear more dimly. Alternatively, successfully executing game events may cause game interface elements to glow more brightly. Similarly, the player's failure to execute game events may cause their associated avatar to appear embarrassed or dejected, while successful performance of game events may cause their associated avatar to appear happy and confident. In other embodiments, successfully executing cues associated with a lane causes the avatar associated with that lane to appear to play an instrument. For example, the drummer avatar will appear to strike the correct drum for producing the audible music. Successful execution of a number of successive cues may cause the corresponding avatar to execute a "flourish," such as kicking their leg, pumping their fist, performing a guitar "windmill," spinning around, winking at the "crowd," or throwing drum sticks.

Player interaction with a cue may be required in a number of different ways. In general, the player is required to provide input when a cue passes under or over a respective one of a set of target markers 140, 141 disposed on the lane. For example, the player associated with lane 102 (lead guitar) may use a specialized controller to interact with the game that simulates a guitar, such as a Guitar Hero SG Controller, manufactured by RedOctane of Sunnyvale, Calif. In this embodiment, the player executes the cue by activating the "strum bar" while pressing the correct fret button of the controller when the cue 125 passes under the target marker 141. In other embodiments, the player may execute a cue by performing a "hammer on" or "pull off," which requires quick depression or release of a fret button without activation of the strum bar. In other embodiments, the player may be required to perform a cue using a "whammy bar" provided by the guitar controller. For example, the player may be required to bend the pitch of a note represented by a cue using the whammy bar. In some embodiments, the guitar controller may also use one or more "effects pedals," such as reverb or fuzz, to alter the sound reproduced by the gaming platform.

In other embodiments, player interaction with a cue may comprise singing a pitch and or a lyric associated with a cue. For example, the player associated with lane 101 may be required to sing into a microphone to match the pitches indicated by the gem 124 as the gem 124 passes over the target marker 140. As shown in FIG. 1A, the notes of a vocal track are represented by "note tubes" 124. In the embodiment shown in FIG. 1A, the note tubes 124 appear at the top of the screen and flow horizontally, from right to left, as the musical content progresses. In this embodiment, vertical position of a note tube 124 represents the pitch to be sung by the player; the length of the note tube indicates the duration for which the player must hold that pitch. In other embodiments, the note tubes may appear at the bottom or middle of the screen. The arrow 108 provides the player with visual feedback regarding the pitch of the note that is currently being sung. If the arrow is above the note tube 124, the player needs to lower the pitch of the note being sung. Similarly, if the arrow 108 is below the note tube 124, the player needs to raise the pitch of the note being sung. In these embodiments, the vocalist may provide vocal input using a USB microphone of the sort manufactured by Logitech International of Switzerland. In other embodiments, the vocalist may provide vocal input using another sort of simulated microphone. In still further embodiments, the vocalist may provide vocal input using a traditional microphone commonly used with amplifiers. As used herein, a "simulated microphone" is any microphone apparatus that does not have a traditional XLR connector. As shown in FIG. 1A, lyrics 105 may be provided to the player to assist their performance.

In still other embodiments, a player interaction with a cue may comprise any manipulation of any simulated instrument and/or game controller.

As shown in FIG. 1A, each lane may be subdivided into a plurality of segments. Each segment may correspond to some unit of musical time, such as a beat, a plurality of beats, a measure, or a plurality of measures. Although the embodiment shown in FIG. 1A show equally sized segments, each segment may have a different length depending on the particular musical data to be displayed. In addition to musical data, each segment may be textured or colored to enhance the interactivity of the display. For embodiments in which a lane comprises a tunnel or other shape (as described above), a cursor is provided to indicate which surface is "active," that is, with which lane surface a player is currently interacting. In these embodiments, the viewer can use an input device to move the cursor from one surface to another. As shown in FIG. 1A, each lane may also be divided into a number of sub-lanes, with each sub-lane containing musical targets indicating different input elements. For example, the lane 102 is divided into five sublanes, including sub-lanes 171 and 172. Each sub-lane may correspond to a different fret button on the neck of a simulated guitar.

Figure 1B:
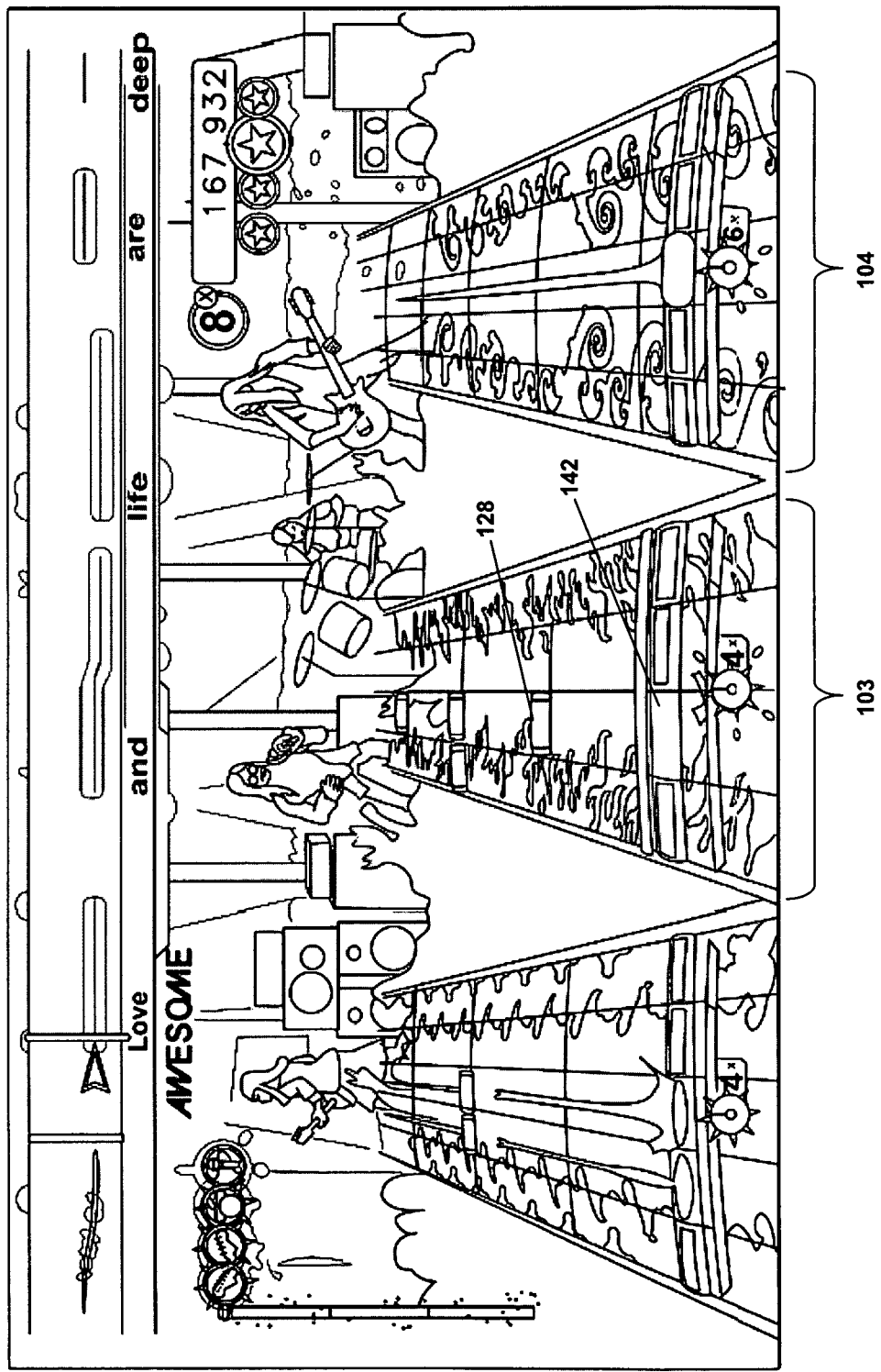
FIG. 1B is a block diagram of a system facilitating network play of a rhythm action game.

Referring now to FIG. 1B, a second embodiment of a screen display for a video game in which four players emulate a musical performance is shown. In the embodiment shown, the lanes 103. 104 have graphical designs corresponding to gameplay events. For example, lane 103 comprises a flame pattern, which may correspond to a bonus activation by the player. For example, lane 104 comprises a curlicue pattern, which may correspond to the player achieving the 6× multiplier shown.

In other embodiments, a game display may alternate the display of one or more avatars and/or the display of the band as a whole. For example, during the performance of a song, a display may switch between a number of camera angle providing, for example, close-ups of the guitarist, bassist, drummer, or vocalist, shots of the band as a whole, shots of the crowd, and/or any combination of the avatars, stage, crowd, and instruments. In some embodiments, the sequence and timing of camera angles may be selected to resemble a music video. In some embodiments, the camera angles may be selected to display an avatar of a player who is performing a distinctive portion of a song. In other embodiments the camera angles may be selected to display an avatar of a player who is performing particularly well or poorly. In some embodiments, an avatar's gestures or actions may correspond to the current camera angle. For example, an avatar may have certain moves, such as a jump, head bang, devil horns, special dance, or other move, which are performed when a close-up of the avatar is shown. In some embodiments, the avatars motions may be choreographed to mimic the actual playing of the song. For example, if a song contains a section where the drummer hits a cymbal crash, the drummer avatar may be shown to hit a cymbal crash at the correct point in the song.

In some embodiments, avatars may interact with the crowd at a venue, and camera angles may correspond to the interaction. For example, in one camera angle, an avatar may be shown pointing at various sections of the crowd. In the next camera angle the various sections of the crowd may be shown screaming, waving, or otherwise interacting with the avatar. In other embodiments, avatars may interact with each other. For example, two avatars may lean back-to back while performing a portion of a song. Or for example, the entire band may jump up and land simultaneously, and stage pyrotechnics may also be synchronized to the band's move.

In some embodiments, the "lanes" containing the musical cues to be performed by the players may be on screen continuously. In other embodiments one or more lanes may be removed in response to game conditions, for example if a player has failed a portion of a song, or if a song contains an extended time without requiring input from a given player.

Although depicted in FIGS. 1A and 1B, in some embodiments (not shown), instead of a lane extending from a player's avatar, a three-dimensional "tunnel" comprising a number of lanes extends from a player's avatar. The tunnel may have any number of lanes and, therefore, may be triangular, square, pentagonal, sextagonal, septagonal, octagonal, nonanogal, or any other closed shape. In still other embodiments, the lanes do not form a closed shape. The sides may form a road, trough, or some other complex shape that does not have its ends connected. For ease of reference throughout this document, the display element comprising the musical cues for a player is referred to as a "lane."

In some embodiments, a lane does not extend perpendicularly from the image plane of the display, but instead extends obliquely from the image plane of the display. In further embodiments, the lane may be curved or may be some combination of curved portions and straight portions. In still further embodiments, the lane may form a closed loop through which the viewer may travel, such as a circular or ellipsoid loop.

It should be understood that the display of three-dimensional "virtual" space is an illusion achieved by mathematically "rendering" two-dimensional images from objects in a three-dimensional "virtual space" using a "virtual camera," just as a physical camera optically renders a two-dimensional view of real three-dimensional objects. Animation may be achieved by displaying a series of two-dimensional views in rapid succession, similar to motion picture films that display multiple still photographs per second.

To generate the three-dimensional space, each object in the three-dimensional space is typically modeled as one or more polygons, each of which has associated visual features such as texture, transparency, lighting, shading, anti-aliasing, z-buffering, and many other graphical attributes. The combination of all the polygons with their associated visual features can be used to model a three-dimensional scene. A virtual camera may be positioned and oriented anywhere within the scene. In many cases, the camera is under the control of the viewer, allowing the viewer to scan objects. Movement of the camera through the three-dimensional space results in the creation of animations that give the appearance of navigation by the user through the three-dimensional environment.

A software graphics engine may be provided which supports three-dimensional scene creation and manipulation. A graphics engine generally includes one or more software modules that perform the mathematical operations necessary to "render" the three-dimensional environment, which means that the graphics engine applies texture, transparency, and other attributes to the polygons that make up a scene. Graphic engines that may be used in connection with the present invention include Gamebryo, manufactured by Emergent Game Technologies of Calabasas, Calif., the Unreal Engine, manufactured by Epic Games, and Renderware, manufactured by Criterion Software of Austin, Tex. In other embodiments, a proprietary graphic engine may be used. In many embodiments, a graphics hardware accelerator may be utilized to improve performance. Generally, a graphics accelerator includes video memory that is used to store image and environment data while it is being manipulated by the accelerator.

In other embodiments, a three-dimensional engine may not be used. Instead, a two-dimensional interface may be used. In such an embodiment, video footage of a band can be used in the background of the video game. In others of these embodiments, traditional two-dimensional computer-generated representations of a band may be used in the game. In still further embodiments, the background may be only slightly related, or unrelated, to the band. For example, the background may be a still photograph or an abstract pattern of colors. In these embodiments, the lane may be represented as a linear element of the display, such as a horizontal, vertical or diagonal element.

Still referring to FIG. 1B The player associated with the middle lane 103 (drummer) may also use a specialized controller to interact with the game that simulates a drum kit, such as the DrumMania drum controller, manufactured by Topway Electrical Appliance Co., Ltd. of Shenzhen, China. In some embodiments, the drum controller provides four drum pads and a kick drum pedal. In other embodiments, the drum controller surrounds the player, as a "real" drum kit would do. In still other embodiments, the drum controller is designed to look and feel like an analog drum kit. In these embodiments, a cue may be associated with a particular drum. The player strikes the indicated drum when the cue 128 passes under the target marker 142, to successfully execute cue 128. In other embodiments, a player may use a standard game controller to play, such as a DualShock game controller, manufactured by Sony Corporation.

Referring back to FIG. 1A, in some embodiments, improvisational or "fill" sections may be indicated to a drummer or any other instrumentalist. In FIG. 1A, a drum fill is indicated by long tubes 130 filling each of the sub-lanes of the center lane which corresponds to the drummer.

In some embodiments, a player is associated with a "turntable" or "scratch" track. In these embodiments, the player may provide input using a simulated turntable such as the turntable controller sold by Konami Corporation.

Local play may be competitive or it may be cooperative. Cooperative play is when two or more players work together in an attempt to earn a combined score. Competitive play may be when a player competes against another player in an attempt to earn a higher score. In other embodiments, competitive play involves a team of cooperating players competing against another team of competing players in attempt to achieve a higher team score than the other team. Competitive local play may be head-to-head competition using the same instrument, head-to head competition using separate instruments, simultaneous competition using the same instrument, or simultaneous competition using separate instruments. In some embodiments, rather than competing for a high score, players or teams may compete for the best crowd rating, longest consecutive correct note streak, highest accuracy, or any other performance metric. In some embodiments, competitive play may feature a "tug-of-war" on a crowd meter, in which each side tries to "pull" a crowd meter in their direction by successfully playing a song. In one embodiment, a limit may be placed on how far ahead one side can get in a competitive event. In this manner, even a side which has been significantly outplayed in the first section of a song may have a chance late in a song to win the crowd back and win the event.

In one embodiment; competition in local play may involve two or more players using the same type of instrument controller to play the game, for example, guitar controllers. In some embodiments, each player associates themselves with a band in order to begin play. In other embodiments, each player can simply play "solo," without association with a band. In these embodiments, the other instruments required for performance of a musical composition are reproduced by the gaming platform. Each of the players has an associated lane and each player is alternately required to perform a predetermined portion of the musical composition. Each player scores depending on how faithfully he or she reproduces their portions of the musical composition. In some embodiments, scores may be normalized to produce similar scores and promote competition across different difficulty levels. For example, a guitarist on a "medium" difficulty level may be required to perform half of the notes as a guitarist on a "hard" difficulty level and, as such, should get 100 points per note instead of 50. An additional per-difficulty scalar may be required to make this feel "fair."

This embodiment of head-to-head play may be extended to allow the players to use different types of game controllers and, therefore, to perform different portions of the musical composition. For example, one player may elect to play using a guitar-type controller while a second player may play using a drum-type controller. Alternatively, each player may use a guitar-type controller, but one player elects to play "lead guitar" while the other player elects to play "rhythm guitar" or, in some embodiments, "bass guitar." In these examples, the gaming platform reproduces the instruments other than the guitar when it is the first player's turn to play, and the lane associated with the first player is populated with gems representing the guitar portion of the composition. When it is time for the second player to compete, the gaming platform reproduces the instruments other than, for example, the drum part, and the second player's lane is populated with gems representing the drum portion of the musical composition. In some of these embodiments, a scalar factor may be applied to the score of one of the player's to compensate for the differences in the parts of the musical composition.

In still other embodiments, the players may compete simultaneously, that is, each player may provide a musical performance at the same time as the other player. In some embodiments, both players may use the same type of controller. In these embodiments, each player's lane provides the same pattern of cues and each player attempts to reproduce the musical performance identified by those elements more faithfully than the other player. In other embodiments, the players use different types of controllers. In these embodiments, one player attempts to reproduce one portion of a musical composition while the other player tries to represent a different portion of the same composition.

In any of these forms of competition, the relative performance of a player may affect their associated avatar. For example, the avatar of a player that is doing better than the competition may, for example, smile, look confident, glow, swagger, "pogo stick," etc. Conversely, the losing player's avatar may look depressed, embarrassed, etc.

Instead of competing, the players may cooperate in an attempt to achieve a combined score. In these embodiments, the score of each player contributes to the score of the team, that is, a single score is assigned to the team based on the performance of all players. As described above, a scalar factor may be applied to the score of one of the player's to compensate for the differences in the parts of the musical composition.

Still referring to FIG. 1A, an indicator of the performance of a number of players on a single performance meter 180 is shown. In brief overview, each of the players in a band may be represented by an icon 181, 182. In the figure shown the icons 181 182 are circles with graphics indicating the instrument the icon corresponds to. For example, the icon 181 contains a microphone representing the vocalist, while icon 182 contains a drum set representing the drummer. The position of a player's icon on the meter 180 indicates a current level of performance for the player. A colored bar on the meter may indicate the performance of the band as a whole. Although the meter shown displays the performance of four players and a band as a whole, in other embodiments, any number of players or bands may be displayed on a meter, including two, three, four, five, six, seven, eight, nine, or ten players, and any number of bands.

Figure 23:
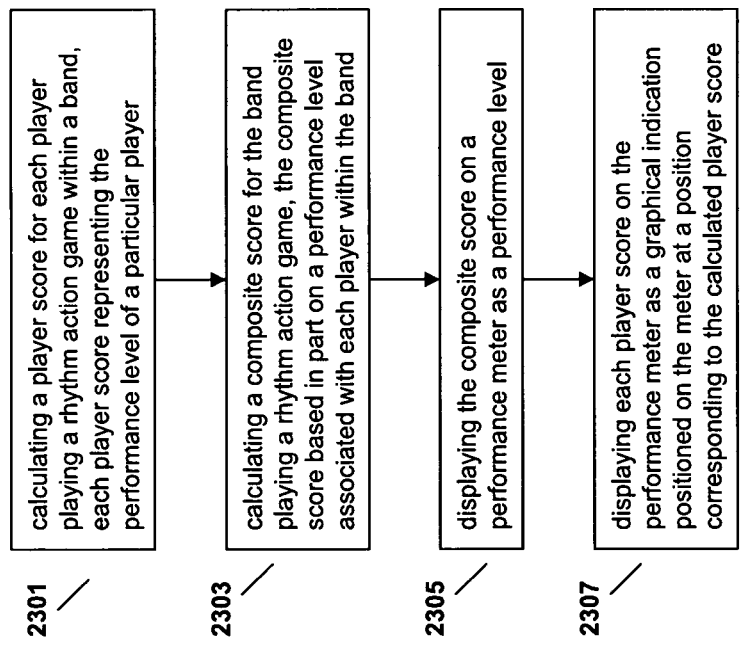
FIG. 23 is a flow diagram of a method for displaying a performance meter indicative of one or more performance levels associated with players and groups of players of a rhythm action game.

Referring ahead to FIG. 23, a flow diagram of a method for displaying a performance meter indicative of one or more performance levels, such as the performance meter 180 is shown. In brief overview, the method includes: calculating a player score for each player playing a rhythm action game within a band, each player score representing the performance level of a particular player (step 2301); calculating a composite score for the band playing a rhythm action game, the composite score based in part on a performance level associated with each player within the band (step 2303); displaying the composite score on a performance meter as a performance level (step 2305); and displaying each player score on the performance meter as a graphical indication positioned on the meter at a position corresponding to the calculated player score (step 2307).

Calculating a player score representing the performance of each player may be done according to any metric (step 2301). In some embodiments, a weighted rolling average of a player's performance may be used. For example, a player's position on the meter may reflect a percentage of notes successfully hit, where more recent notes are weighted more heavily than less recent notes. In another embodiment, a player's position on the meter may be calculated by computing a weighted average of the player's performance on a number of phrases. In some embodiments, a player's position on the meter may be updated on a note-by-note basis. In other embodiments, a player's position on the meter may be updated on a phrase-by-phrase basis. The meter may also indicate any measure of a band's performance. In some embodiments, the meter may display the band's performance as an average of each of the players' performances. In other embodiments, the indicated band's performance may comprise a weighted average in which some players' performances are more heavily weighted.

In some embodiments, a single meter 180 may be used to display the performance level of multiple players as well as a band as a whole. A band composite performance level may be computed in any manner (step 2303). In some embodiments, a band performance level may comprise an average of the performance of each player in the band. In other embodiments, a band performance level may comprise a weighted average of the performance of each player in the band, with weights being assigned based on difficulty of parts, amount of notes played recently, and/or any bonuses triggered.

A band performance level may be shown on a meter 180 in any manner (step 2305). In some embodiments, the meter 180 may comprise subdivisions which indicate relative levels of performance. For example, in the embodiment shown, the meter 180 is divided roughly into thirds, which may correspond to Good, Average, and Poor performance. In some embodiments, a band performance level may be represented as a line or bar on a meter 180. In other embodiments, a band performance level may be represented as an icon or text on a meter 180. In the embodiment shown in FIG. 1D, a filled bar indicates the band's performance as a whole. In some embodiments, individual performances may not be indicated on a meter, and only the performance of the band as a whole may be displayed.

In some embodiments, a player or players in a band may "fail" a song if their performance falls to the bottom of the meter. In some embodiments, consequences of failing a song may include being removed from the rest of the song. In these embodiments, a player who has failed may have their lane removed from the display, and the audio corresponding to that player's part may be removed. In some embodiments, if a single member of a band fails a song, the band may consequently fail the song. In other embodiments, if a member of a band fails a song, one or more other members of the band may continue playing. In still other embodiments, one or more other members of a band may reinstate the failed player.

Individual player performance levels may be indicated on the meter in any manner (step 2307) In the embodiment shown in FIG. 1A, the icons 181, 182 displayed to indicate each player may comprise any graphical or textual element. In some embodiments, the icons may comprise text with the name of one or more of the players. In another embodiment the icon may comprise text with the name of the instrument of the player. In other embodiments, the icons may comprise a graphical icon corresponding to the instrument of the player. For example, an icon containing a drawing of a drum 182 may be used to indicate the performance of a drummer. Although described above in the context of a single player providing a single type of input, a single player may provide one or more types of input simultaneously. For example, a single player providing instrument-based input (such as for a lead guitar track, bass guitar track, rhythm guitar track, keyboard track, drum track, or other percussion track) and vocal input simultaneously.

Still referring to FIG. 1A, meters 150, 151 may be displayed for each player indicating an amount of stored bonus. The meters may be displayed graphically in any manner, including a bar, pie, graph, or number. In some embodiments, each player may be able to view the meters of remote players. In other embodiments, only bonus meters of local players may be shown. Bonuses may be accumulated in any manner including, without limitation, by playing specially designated musical phrases, hitting a certain number of consecutive notes, or by maintaining a given percentage of correct notes.

In some embodiments, if a given amount of bonuses are accumulated, a player may activate the bonus to trigger an in-game effect. An in-game effect may comprise a graphical display change including, without limitation, an increase or change in crowd animation, avatar animation, performance of a special trick by the avatar, lighting change, setting change, or change to the display of the lane of the player. An in-game effect may also comprise an aural effect, such as a guitar modulation, including feedback, distortion, screech, flange, wah-wah, echo, or reverb, a crowd cheer, an increase in volume, and/or an explosion or other aural signifier that the bonus has been activated. An in-game effect may also comprise a score effect, such as a score multiplier or bonus score addition. In some embodiments, the in-game effect may last a predetermined amount of time for a given bonus activation.

In some embodiments, bonuses may be accumulated and/or deployed in a continuous manner. In other embodiments, bonuses may be accumulated and/or deployed in a discrete manner. For example, instead of the continuous bar shown in FIG. 1A, a bonus meter may comprise a number of "lights" each of which corresponds to a single bonus earned. A player may then deploy the bonuses one at a time.

In some embodiments, bonus accumulation and deployment may be different for each simulated instrument. For example, in one embodiment only the bass player may accumulate bonuses, while only the lead guitarist can deploy the bonuses.

FIG. 1A also depicts score multiplier indicators 160, 161. A score multiplier indicator 160, 161 may comprise any graphical indication of a score multiplier currently in effect for a player. In some embodiments, a score multiplier may be raised by hitting a number of consecutive notes. In other embodiments, a score multiplier may be calculated by averaging score multipliers achieved by individual members of a band. For example, a score multiplier indicator 160, 161 may comprise a disk that is filled with progressively more pie slices as a player hits a number of notes in a row. Once the player has filled the disk, the player's multiplier may be increased, and the disk may be cleared. In some embodiments, a player's multiplier may be capped at certain amounts. For example, a drummer may be limited to a score multiplier of no higher than 4×. Or for example, a bass player may be limited to a score multiplier of no higher than 6×.

In some embodiments, a separate performance meter (not shown) may be displayed under the lane of each player. This separate performance meter may comprise a simplified indication of how well the player is doing. In one embodiment, the separate performance meter may comprise an icon which indicates whether a player is doing great, well, or poorly. For example, the icon for "great" may comprise a hand showing devil horns, "good" may be a thumbs up, and "poor" may be a thumbs down. In other embodiments, a player's lane may flash or change color to indicate good or poor performance.

Each player may use a gaming platform in order to participate in the game. In one embodiment, the gaming platform is a dedicated game console, such as: PLAYSTATION2, PLAYSTATION3, or PLAYSTATION PERSONAL, manufactured by Sony Corporation; DREAMCAST, manufactured by Sega Corp.; GAMECUBE, GAMEBOY, GAMEBOY ADVANCE, or WII, manufactured by Nintendo Corp.; or XBOX or XBOX360, manufactured by Microsoft Corp. In other embodiments, the gaming platform comprises a personal computer, personal digital assistant, or cellular telephone. In some embodiments, the players associated with avatars may be physically proximate to one another. For example, each of the players associated with the avatars may connect their respective game controllers into the same gaming platform ("local play").

Figure 1C:
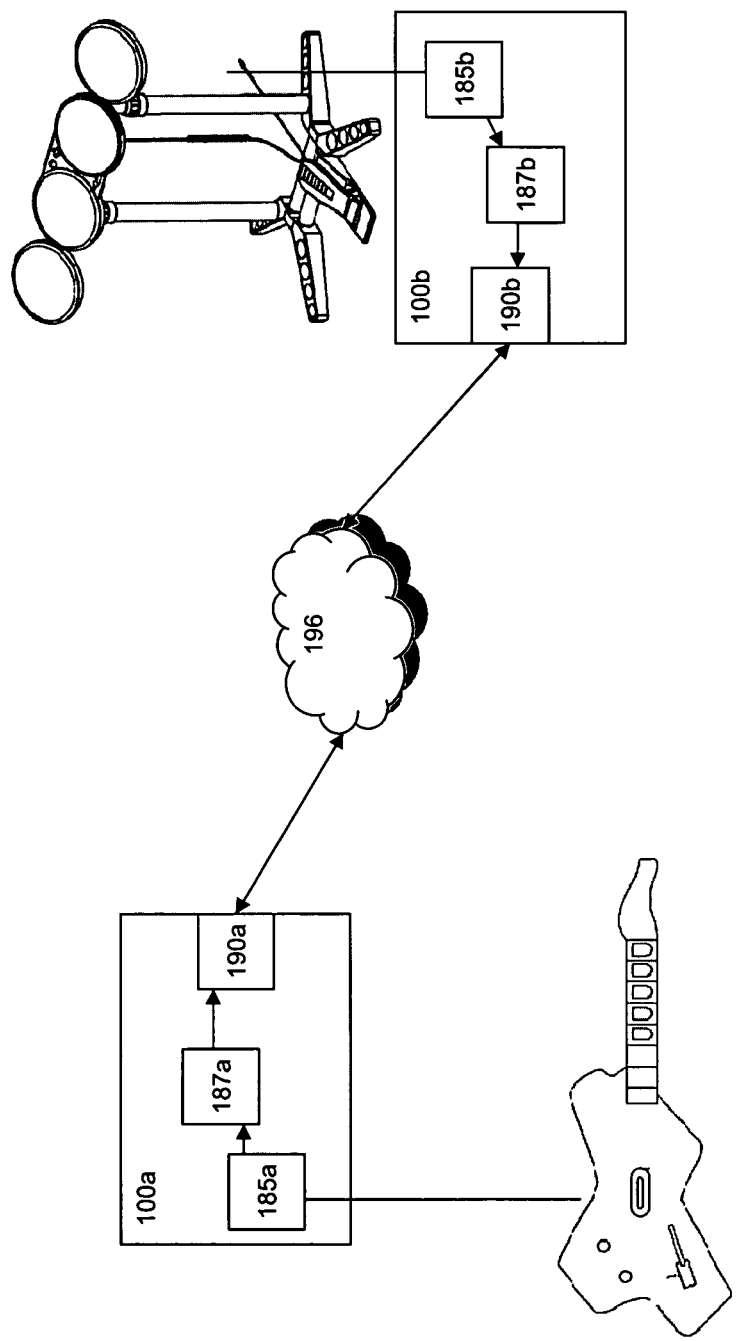
FIG. 1C is a example of one embodiment of a screen display for remote multiplayer play.

In some embodiments, one or more of the players may participate remotely. FIG. 1C depicts a block diagram of a system facilitating network play of a rhythm action game. As shown in FIG. 1C, a first gaming platform 100a and a second gaming platform 100b communicate over a network 196, such as a local area network (LAN), a metropolitan area network (MAN), or a wide area network (WAN) such as the Internet or the World Wide Web. The gaming platforms connect to the network through one of a variety of connections including standard telephone lines, LAN or WAN links (e.g., T1, T3, 56 kb, X.25), broadband connections (e.g., ISDN, Frame Relay, ATM), and wireless connections (e.g., 802.11a, 802.11g, Wi-Max). The first gaming platform 100a and the second gaming platform 100b may be any of the types of gaming platforms identified above. In some embodiments, the first gaming platform 100a and the second gaming platform 100b are of different types.

When a networked multiplayer game session begins at the direction of one of the players, that player's gaming platform 100a (the "host") transmits a "start" instruction to all other gaming platforms participating in the networked game, and the game begins on all platforms. A timer begins counting on each gaming platform, each player's game cues are displayed, and each player begins attempting to perform the musical composition.

Gameplay on gaming platform 100a is independent from game play on gaming platform 100b, except that each player's gaming platform contains a local copy of the musical event data for all other players. The timers on the various gaming platforms communicate with each other via the network 196 to maintain approximate synchrony using any number of the conventional means known in the art.

The gaming platforms 100a, 100b also continually transmit game score data to each other, so that each system (and player) remains aware of the game score of all other systems (and players). Similarly, this is accomplished by any number of means known in the art. Note that this data is not particularly timing sensitive, because if there is momentary disagreement between any two gaming platforms regarding the score (or similar game-related parameters), the consequences to gameplay are negligible.

In one embodiment, as each player plays the game at their respective location, an analyzer module 187a, 187b on that player's gaming platform 100a, 100 continually extracts data from an event monitor 185a, 185b regarding the local player's performance, referred to hereafter as "emulation data". Emulation data may include any number of parameters that describe how well the player is performing. Some examples of these parameters include:

- whether or not the most recent event type was a correctly-played note or an incorrectly played noted;
- a timing value representing the difference between actual performance of the musical event and expected performance of the musical event;
- a moving average of the distribution of event types (e.g., the recent ratio of correct to incorrect notes);
- a moving average of the differences between the actual performance of musical events and the expected performance times of the musical events; or
- a moving average of timing errors of incorrect notes.

Each analyzer module 187a, 187b continually transmits the emulation data it extracts over the network 196 using transceiver 190a, 190b; each event monitor 185a, 185b continually receives the other gaming platform's emulation data transmitted over the network 196.

In one embodiment, the emulation data essentially contains a statistical description of a player's performance in the recent past. The event monitor 185a, 185b uses received emulation data to create a statistical approximation of the remote player's performance.

In one particular example, an incoming emulation parameter from a remote player indicates that the most recent remote event was correctly reproduced. When the local event monitor 185a, 185b reaches the next note in the local copy of the remote player's note data, it will respond accordingly by "faking" a successfully played note, triggering the appropriate sound. That is, the local event monitor 185a, 185b will perform the next musical event from the other players' musical event data, even though that event was not necessarily actually performed by the other player's event monitor 185a, 185b. If instead the emulation parameter had indicated that the most recent remote event was a miss, no sound would be triggered.

In another particular example, an incoming emulation parameter from a remote player indicates that, during the last 8 beats, 75% of events were correctly reproduced and 25% were not correctly reproduced. When the local event monitor 185a reaches the next note in the local copy of the remote player's note data, it will respond accordingly by randomly reproducing the event correctly 75% of the time and not reproducing it correctly 25% of the time.

In another particular example, an incoming emulation parameter from a remote player indicates that, during the last 4 beats, 2 events were incorrectly performed, with an average timing error of 50 "ticks." The local event monitor 185a, 185b will respond accordingly by randomly generating incorrect events at a rate of 0.5 misses-per-beat, displacing them in time from nearby notes by the specified average timing error.

The above three cases are merely examples of the many types of emulation parameters that may be used. In essence, the remote player performances are only emulated (rather than exactly reproduced) on each local machine.

In this embodiment, the analyzer module 187a, 187b may extract musical parameters from the input and transmit them over a network 196 to a remote gaming platform. For example, the analyzer module 187a, 187b may simply transmit the input stream over a network 196 or it may extract the information into a more abstract form, such as "faster" or "lower." Although described in the context of a two-player game, the technique may be used with any number of players.

Still referring to FIG. 1C, in another embodiment, analyzer module 187a, 187b extracts data from the event monitor 185a, 185b regarding the local player's performance. In this embodiment, however, the extracted data is transmitted over the network 196 using the transceiver 190a, 190b. When the analyzer 187a, 187b receives the transmitted data, it generates an emulation parameter representing the other player's musical performance and provides the locally-generated emulation parameter to the event monitor 185a, 185b, as described above. One advantage of this embodiment is that each player may locally set their preference for how they want the event monitor 185a, 185b to act on emulation parameters.

In other embodiments, the transmitted data is associated with a flag that indicates whether the transmitted data represents a successfully executed musical event or an unsuccessfully executed musical event. In these embodiments, the analyzer 187a, 187b provides a locally-generated emulation parameter to the event monitor 185a, 185b based on the flag associated with the transmitted data.

One unusual side effect of these techniques is that each local player does not hear an exact reproduction of the remote players' performances; only a statistical approximation. However, these statistical approximations have two countervailing positive attributes: because they are synchronized to the local player's timer and the local copy of the remote players' note data, they are synchronous with the local player's performance; and while not exact reproductions, they are "close enough" to effectively communicate to the local player the essence of how well the remote players are performing musically. In this model, delays in the transmission of the data over the network 196 do not have the intolerable side effect of causing cacophonous asynchronicity between the note streams triggering sounds on each player's local system.

In other embodiments, a central server may be used to facilitate communication between the gaming platforms 100a, 100b. Extraction of emulation parameters is performed, as described above. The server distributes data, whether music performance data or emulation parameter data, to all other gaming platforms participating in the current game. In other embodiments, the server may store received data for use later. For example, a band may elect to use the stored data for the performance of a band member who is unavailable to play in a specific game.

Figure 1D:
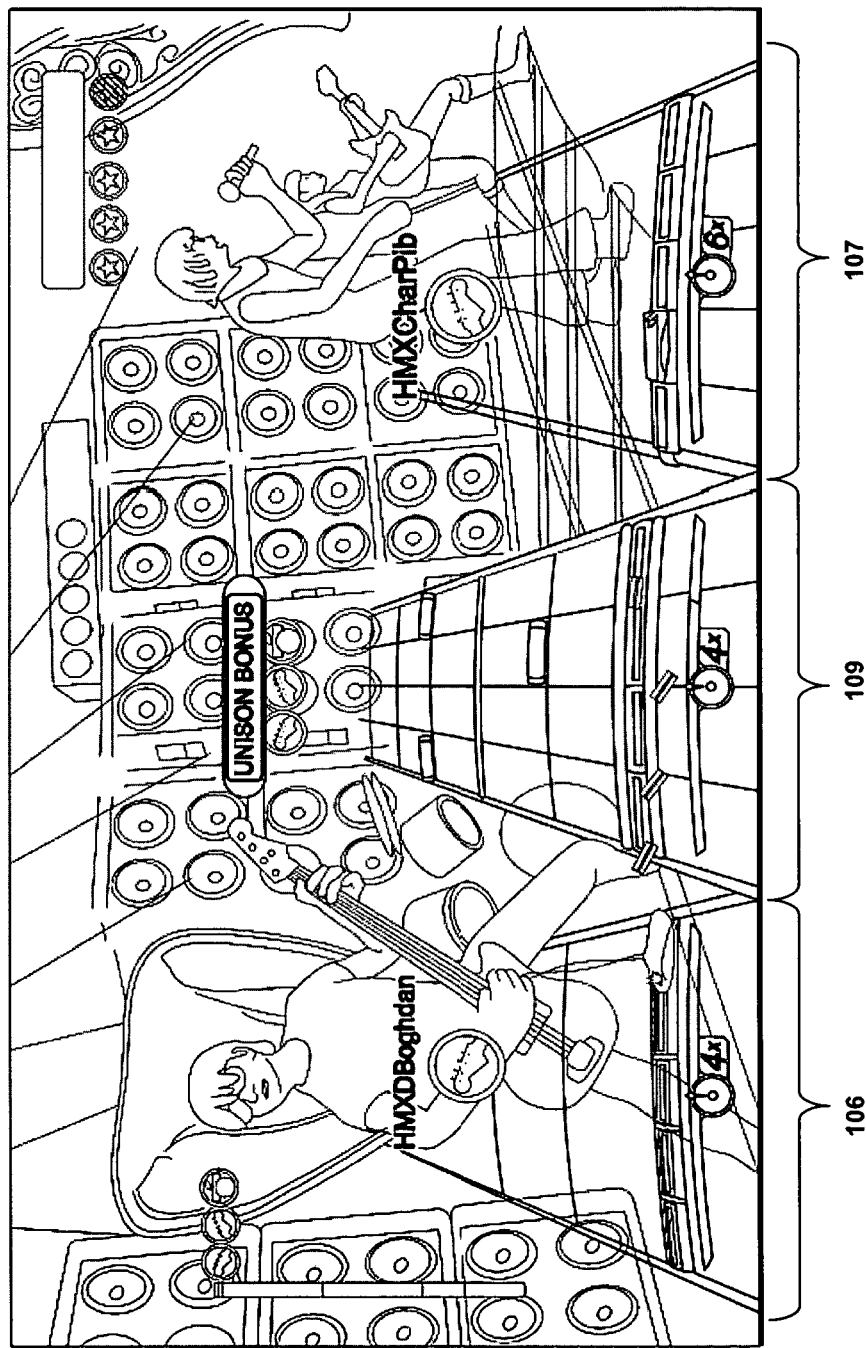
FIG. 1D depicts an indicator of the performance of a number of players on a single performance meter.

Referring now to FIG. 1D, one embodiment of a screen display for remote multiplayer play is shown. The embodiment of the screen display shown in FIG. 1D may be used for head-to-head play, for simultaneous competition, and for cooperative play. As shown in FIG. 1D, a local player's lane 109 is shown larger than the lanes 106 107 of two remote players. The avatars for remote players may appear normally on stage in a similar manner as if the avatars represented local players. In other embodiments, the lanes may be displayed in a similar manner for both local multiplayer and remote multiplayer. In still other embodiments, in remote multiplayer, only the local player or player's avatars may be shown.

As shown in FIG. 1D, the lanes 106, 107 associated with the remote players are shown smaller than the local player's lane 109. In other embodiments, the lanes of one or more remote players may be graphically distinguished in any other way. For example, the remote players' lanes may be shown translucently. Or for example, the remote players' lanes may have a higher transparency than local player's lanes. Or the remote players' lanes may be shown in grayscale, or in a different screen location than local players' lanes. In some embodiments, a remote vocalist's lane may not be shown at all, and instead only the lyrics of the song may be displayed.

In some embodiments, multiple players participate in an online face-off between two bands. A "band" is two or more players that play in a cooperative mode. In some embodiments, the two bands need to have the same types of instruments at the same difficulty level selection, e.g., a guitarist playing on "hard" and a bassist playing on "medium" playing against a guitarist playing on "hard" and a bassist playing on "medium." In other embodiments, the two bands still need to have the same types of instruments but the difficulty selections can be different: Players participating at a lower difficulty level simply have fewer gems to contribute to the overall score. The song to be played may be selected after the teams have been paired up. Alternatively, a band may publish a challenge to play a particular song and a team may accept the challenge.

For example, a local group of players may formed a band and give their band a name ("The Freqs."). Each of the four players in the "The Freqs" is local to one another. They may then competing against a team of players located remotely, who have formed a band called "The Champs." In some cases "The Champs" may each be local to one another. In other cases, members of "The Champs" may be remote to each other. Each player in "The Freqs" and "the Champs" may see a display similar to FIG. 1A or FIG. 1E. However, in some embodiments, an additional score meter may be displayed showing the score of the other band. In other embodiments, any other measure and indication of performance of a band may be given. For example, in some embodiments, meters may be displayed for each band indicating relative performance, crowd engagement, percentage of notes hit, or any other metric. In some embodiments, a four-in-one meter 180 as depicted in FIG. 1A may be displayed for each band. In some embodiments, avatars from both bands may be depicted on the stage.

In some embodiments, the bands "trade" alternating portions of the musical composition to perform; that is, the performance of the song alternates between bands. In these embodiments, musical performance output from "The Champs" is reproduced locally at the gaming platform used by "The Freqs" when "The Champs" are performing. Similarly, the musical performance of "The Freqs" is reproduced remotely (using the emulation parameter technique described above) at the gaming platform of "The Champs" when "The Freqs" are performing. In other embodiments, the bands play simultaneously. In these embodiments, the displayed score may be the only feedback that "The Freqs" are provided regarding how well "The Champs" are performing.

In some particular embodiments, members of cooperating bands may be local to one another or remote from one another. Similarly, members of competing bands may be local to one another or remote from one another. In one example, each player is remote from every other player.

In some embodiments, players may form persistent bands. In these embodiments, those bands may only compete when at least a majority of the band in available online. In some of the embodiments, if a member of a persistent band in not online and the other band members want to compete, a gaming platform may substitute for the missing band member. Alternatively, a player unaffiliated with the band may substitute for the missing band member. In still other embodiments, a stream of emulation parameters stored during a previous performance by the missing band member may be substituted for the player. In other embodiments, an online venue may be provided allowing players to form impromptu bands. Impromptu bands may dissolve quickly or they may become persistent bands.

Although FIGS. 1A, 1B and 1D show a band comprising one or more guitars, a drummer, and a vocalist, a band may comprise any number of people playing any musical instruments. Instruments that may be simulated and played in the context of a game may include, without limitation, any percussion instruments (including cymbals, bell lyre, celeste, chimes, crotales, glockenspiel, marimba, orchestra bells, steel drums, timpani, vibraphone, xylophone, bass drum, crash cymbal, gong, suspended cymbal, tam-tam, tenor drum, tom-tom, acme siren, bird whistle, boat whistle, finger cymbals, flex-a-tone, mouth organ, marching machine, police whistle, ratchet, rattle, sandpaper blocks, slapstick, sleigh bells, tambourine, temple blocks, thunder machine, train whistle, triangle, vibra-slap, wind machine, wood block, agogo bells, bongo drum, cabaca, castanets, claves, conga, cowbell, maracas, scraper, timbales, kick drum, hi-hat, ride cymbal, sizzle cymbal, snare drum, and splash cymbal), wind instruments (including piccolo, alto flute, bass flute, contra-alto flute, contrabass flute, subcontrabass flute, double contrabass flute, piccolo clarinet, sopranino clarinet, soprano clarinet, basset horn, alto clarinet, bass clarinet, contra-alto clarinet, contrabass clarinet, octocontra-alto clarinet, octocontrabass clarinet, saxonette, soprillo, sopranino saxophone, soprano saxophone, conn-o-sax, clar-o-sax, saxie, mezzo-soprano saxophone, alto saxophone, tenor saxophone, baritone saxophone, bass saxophone, contrabass saxophone, subcontrabass saxophone, tubax, aulochrome, tarogato, folgerphone, contrabassoon, tenoroon, piccolo oboe, oboe d'amore, English horn, French horn, oboe de caccia, bass oboe, baritone oboe, contrabass oboe, bagpipes, bugle, cornet, didgeridoo, euphonium, flugelhorn, shofar, sousaphone trombone, trumpet, tuba, accordion, concertina, harmonica, harmonium, pipe organ, voice, bullroarer, lasso d'amore, whip and siren), other stringed instruments (including harps, dulcimer, archlute, arpeggione, banjo, cello, Chapman stick, cittem, clavichord, double bass, fiddle, slide guitar, steel guitar, harpsichord hurdy gurdy, kora, koto, lute, lyre, mandola, mandolin, sitar, ukulele, viola, violin, and zither) and keyboard instruments (including accordion, bandoneon, calliope, carillon, celesta, clavichord, glasschord, harpsichord, electronic organ, Hammond organ, pipe organ, MIDI keyboard, baby grand piano, electric piano, grand piano, janko piano, toy piano, upright piano, viola organista, and spinets).

Referring now to FIG. 2, a method for allowing members of a band to resuscitating a band mate who has failed a song is shown. In brief overview, the method comprises determining a first player has failed a song (step 201); removing the first player from active participation in the song (step 203); and reinstating the first player in response to a bonus activation from a second player (step 205).

Still referring to FIG. 2, now in greater detail, a game may make it possible for a member of a band to fail a song midway though the song. A player may be determined to fail a song in any manner (step 201). In some embodiments, a player may fail a song by missing above an allotted threshold of notes. In other embodiments, a player may fail a song by missing above an allotted threshold of consecutive notes. In some embodiments, a player may fail a song by missing one or more specially designated notes or phrases. In other embodiments, a player may fail a song by allowing their performance to reach the bottom of a meter 180. In still other embodiments, a player may fail a song if their performance is at the bottom of a meter 180 in excess of a given amount of time. A player may be determined to fail a song at any point during a song.

After determining that a player has failed a song, the player may then be removed from active participation in the song (step 203). Removing a player from active participation may comprise any method of discontinuing a players involvement in the performing the song. In some embodiments, a failed player may no longer attempt to hit notes comprising the player's part. In some embodiments, the audio corresponding to the player's part in the band may be silenced. In some embodiments, the band's overall performance may be adversely affected by the failure. For example, a failed band member's performance may be continually given the lowest possible rating, such as for the drummer in FIG. 2. This low rating may then pull down the average rating of the band. In other embodiments, the failed player may continually be docked for notes that the player should be playing if not for the player's failure. In these embodiments, the continual missed notes may serve as a drain on the performance of the band. In some embodiments, after a player has failed, the penalty for other players missing notes may be raised.

In some embodiments, the failed player's lane may be removed from the display. For example, FIG. 2 depicts a drummer whose performance rating (indicated by the "D") hit the bottom of the performance meter 180 and consequently failed the song. The lane corresponding to the drummer has been removed from the display as a result. In other embodiments, any other graphical or audio output may be used to indicate a player has failed a song. In some embodiments, the failed players avatar may become dejected, stop playing the instrument, and/or be removed from the stage. In other embodiments, the player's avatar may be displayed along with graphical text stating "failed." In other embodiments, the crowd may be shown to boo, heckle, taunt, or otherwise indicate dissatisfaction with the failed player's performance. In some embodiments, the crowd meter may change color, size, or otherwise indicate that a player has failed a song. For example, a player performing poorly may cause their icon to change to red. After the player fails, the icon may change from red to black.

The player may then be reinstated in response to one or more band mates activating a bonus (step 205). In some embodiments, the activated bonus may reflect a bonus stored in a bonus meter 120. For example, a player may accumulate bonuses by successfully playing a designated musical phrase. The player may then activate the bonus in any manner. Examples of ways of activating a bonus may include pressing a button, tilting a guitar, hitting a special combo or gem, and singing or shouting a special phrase. In other embodiments, the activation may be automatic. For example, if a player's bonus meter 120 becomes full, the bonus may automatically be activated and the failed player may be reinstated. In some embodiments, reinstating a player may "cost" a certain amount of bonus. In some embodiments, reinstating a failed player may take the place of any other effects (e.g. score multipliers, and/or graphical and aural effects) that would typically be associated with activating a bonus. In other embodiments, a player may be reinstated in addition to any effects that typically accompany bonus activation.

The player may be reinstated in any manner. In some embodiments, the player may be reinstated with a predetermined level of performance. For example, a reinstated player may have their performance set in the middle of a performance meter. Once the player has been reinstated, the player may resume their participation in playing the song as they did previously. Likewise, the audio corresponding to the player's performance may be resumed. In some embodiments, the reinstated player may be shown with a message "resurrected" or a similar message indicating that the player has returned. In other embodiments, the player who saved the failed player may be shown with a graphic stating "savior" or a similar message identifying the player as the reinstater of the failed player.

A player reinstatement may be indicated graphically and aurally in any manner. In some embodiments, a lane corresponding to the player that has been removed may reappear. In other embodiments, a player's avatar may return to the stage, become energized, resume playing their on-screen instrument, or otherwise indicate their reinstatement. In some embodiments, the crowd may cheer, encourage, or otherwise indicate renewed approval for the reinstated player.

Figure 3A:
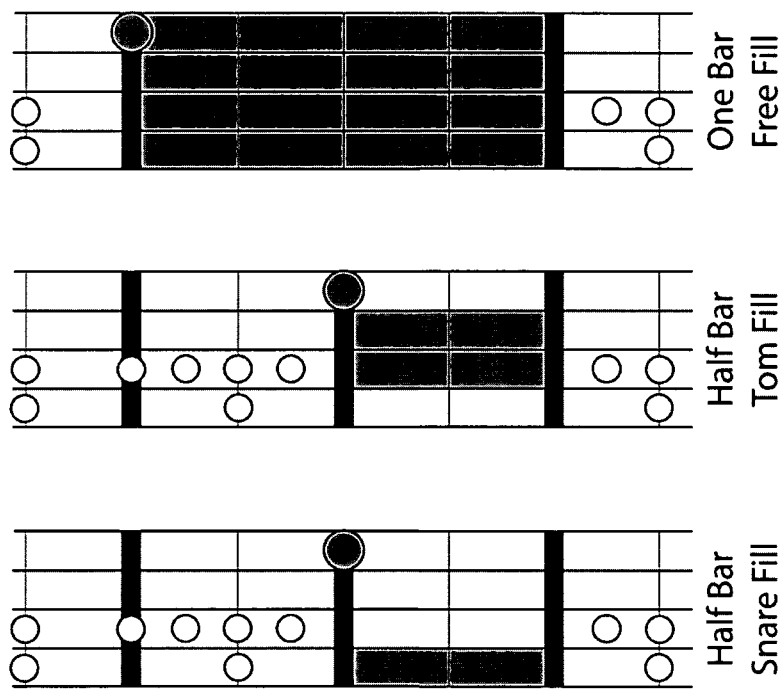
FIG. 3A depicts embodiments of lane displays which may indicate improvisational sections in music.

Referring now to FIG. 3A, in some games it may be desirable to provide players with the feel of improvisational sections in music. This may be in contrast to the scenarios described above in which players must mimic a predetermined progression of gems to playa predetermined piece of music. An improvisational section may allow players to freely perform on their simulated instruments without requiring a specific progression of notes or sounds. In some embodiments, a player's actions during an improvisational section may have no impact on a performance meter. In some of these embodiments, a performance meter may be removed from the display during an improvisational section.

An improvisational section of a song may be indicated in any manner. In some embodiments, an improvisational section of a song may be indicated graphically. For example, an improvisational section may be indicated by highlighting all the columns in a player's lane. Or for example, an improvisational section may be indicated by a special gem or series of special gems. Or for example, an improvisational section may be indicated by a message displayed to a player.

In some embodiments, an improvisation section may be indicated by a color block spanning some or all the columns or rows of a player's lane. FIG. 3A demonstrates color blocks which may indicate specific percussion fills. In each example, the colored columns correspond to the columns the player is encouraged to freestyle on. In the embodiment shown, the columns correspond to a simulated drum set with a snare, and at least two tom-toms arranged left-to-right. The colored bars extend for the length of the improvisational section, and may extend any length of time, including without limitation 1, 2, 3, 4, 8, 12, 16, or 32 measures of a song. Although the colored blocks shown are in the context of percussion fills, similar colored blocks may be used to designate improvisational sections for any instrument or vocal part. For example, a guitar lane showing a colored block of the two leftmost columns may indicate the guitarist may freestyle among the two notes corresponding to the leftmost lanes.

In these embodiments, a color block indicating an improvisational section may then be graphically altered in response to a player's input. For example, after a player plays a note corresponding to a given column, that column may temporarily be made brighter and then fade. In this example, a player may be incentivized to play notes corresponding to each of the columns in order to keep all the columns brightly lit. In this example, score bonuses may be awarded for keeping the lanes lit.

In some embodiments, improvisational sections may be implemented similarly across all the instruments in the game. In other embodiments, improvisational sections may be implemented differently across a number of instruments to reflect unique properties of the simulated instruments.

For simulated guitars, in one embodiment, improvisational sections may be provided in which a player must strum or press fret buttons at above a minimum rate and/or move among a minimum number of different fret buttons. While the minimum rate is met, then audio from a pre-recorded guitar solo may be played. This may provide the player with the feeling of freely playing a section and producing an improvised solo, without having to mimic a note progression contained in the pre-recorded solo. If the player meets the minimum threshold, the player may also be awarded a bonus or given a score addition.

For a simulated drum set, in one embodiment, in improvisational sections each of the simulated drum pads and foot pedal may be mapped to a different drum sound. The player may then freely play the simulated drum set as though it were an actual drum set, and hear similar audio as if the player was playing a drum set. In some embodiments, a player may be required to play the simulated drum set at above a given minimum rate and/or move between the simulated drum pads at least a minimum amount in order to keep the improvisational section going. In other embodiments, the player may be required to play the simulated drum set at above a given minimum rate and/or move between the simulated drum pads at least a minimum amount in order to score points or acquire a bonus for the improvisational section.

In some embodiments, improvisational drum sections may be used in conjunction with bonuses. In one embodiment, after a player has accumulated a predetermined amount of bonuses, drum fill sections of a song may be "unlocked." These sections may appear during the course of songs where drum fills might typically be played. The player may then use their simulated drum set to play their own drum fills during these sections. Scoring for these fill sections may be computed using the technique described above of requiring a player to play above a given minimum rate and/or move between the simulated drum pads at least a minimum amount in order to collect a score for the section. In some embodiments, these fill sections may be tied to activation of a bonus. In one embodiment, at the end of a fill section, a special gem may be displayed. If the player hits a drum pad corresponding to the gem, the player's accumulated bonus will be activated. If the player does not hit the gem, the player's accumulated bonus will not be activated. In some cases, the special gem may correspond to the drum pad typically used for a crash cymbal.

For a vocalist, in one embodiment, during improvisational sections the audio from a prerecorded vocal solo may be played, while the player is given the freedom to sing as he/she chooses. In some embodiments, the player may be required to make a minimum amount of noise or sing a minimum number of notes to sustain the improvisational section and/or collect a bonus. In some embodiments, a color block representing a vocal improvisational section may be distorted in an artistic or aesthetic manner in response to a player's vocal improvisations. Such distortions may mimic a tye-dye, fractal, wave, explosion, or other visual effects.

Figure 3B:
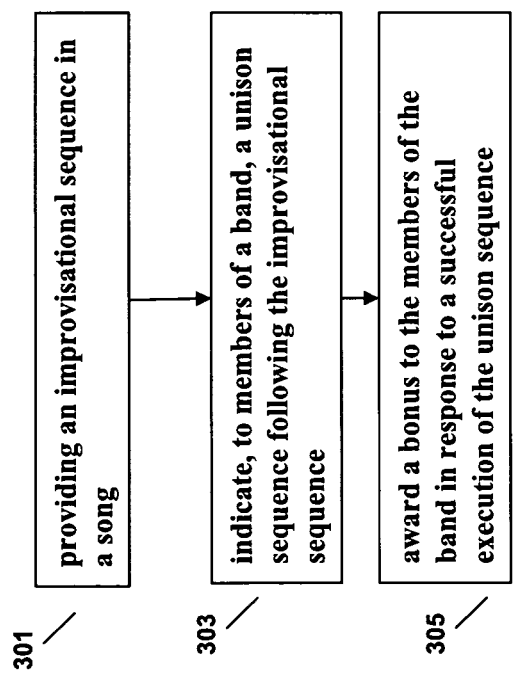
FIG. 3B illustrates a flow diagram of a method for awarding a bonus in response to a successful execution of a unison sequence.
Figure 3C:
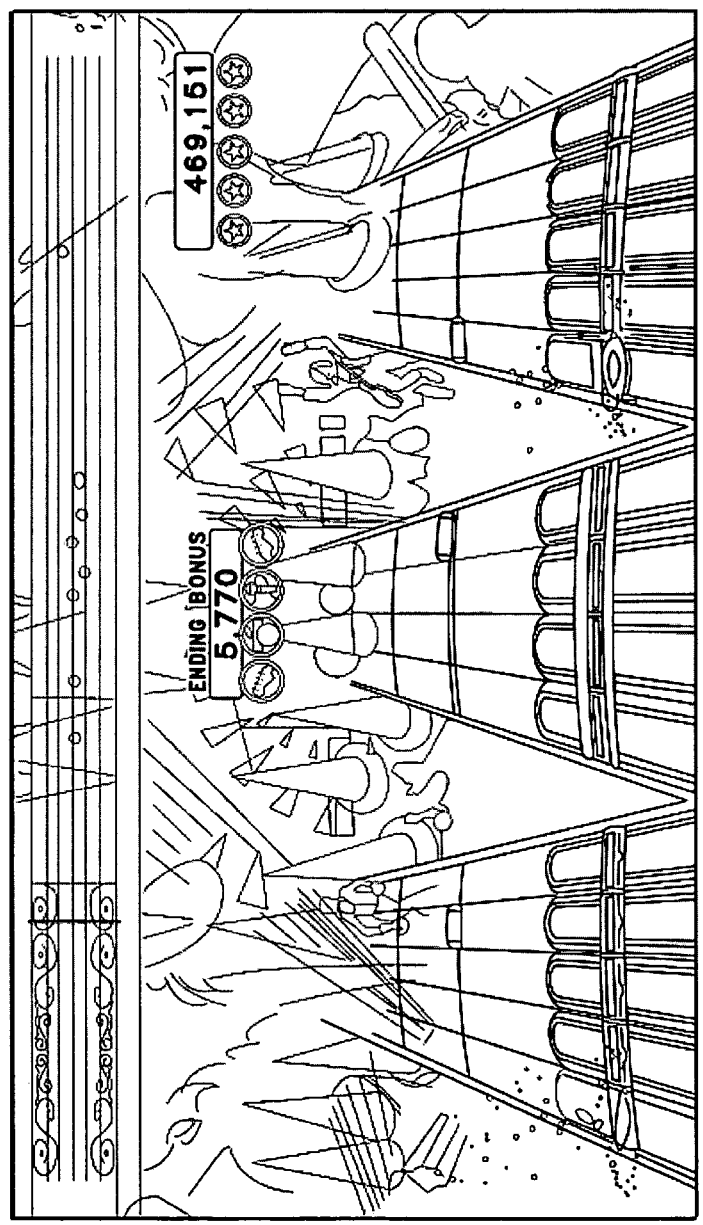
FIG. 3C is an example screenshot where players are allowed to improvise to accumulate a bonus.

Referring now to FIGS. 3B and 3C, a method is shown for awarding a bonus to a band for successfully executing a unison sequence following an improvisational section. In brief overview the method comprises providing an improvisational sequence in a song (step 301). FIG. 3C illustrates an example screenshot during which players are allowed to improvise for a period of time to accumulate a bonus. The method then comprises indicating, to the members of a band, a unison sequence following the improvisational sequence (step 303); and awarding a bonus to the members of the band in response to a successful execution of the unison sequence (step 305).

In greater detail, an improvisational sequence may be provided during a song to players of a game (step 301). In some embodiments, the improvisational sequence may correspond to an improvisational sequence in the prerecorded version of the song. For example, a recorded song may have an ending sequence during which a number of the artists freestyle. This section of the song may be provided to players of a game as an improvisational sequence using any of the techniques described above. For example, each of the players may have to maintain a certain level of input in order to sustain the improvisational section. In some embodiments, icons may be displayed above each player's lane to indicate whether each player is sustaining the correct amount of input. In other embodiments, the audio of corresponding a given player may be discontinued in the event the player fails to maintain the correct level of input.

In some embodiments, the players may accumulate a bonus during the improvisation section depending on the speed, variety, or skill of their improvisation. FIG. 3C shows a bonus gauge which indicates the current bonus the players have accumulated during the improvisational section. Icons may also be displayed for each player to indicate whether that player is currently improvising in such a manner to accumulate a bonus. In the embodiment shown, the icons may change color or be hidden in the event a player drops below the improvisation threshold required for a bonus.

The game may then indicate to the players a unison sequence following the improvisational sequence (step 303). The game may indicate the unison sequence in any manner used to indicate musical sequences, including gems, indicators, and/or note bars. The unison sequence may comprise any musical sequence. In some embodiments, the unison sequence may correspond to an ending hit or riff played after an improvisational section. For example, some rock songs feature an ending where one or more of the artists freestyle until a climax is reached where one or more ending riffs is played in unison. The improvisational sequence followed by the unison sequence may mimic such a song ending. In some embodiments, icons may be displayed to indicate whether each player is successfully playing the unison sequence. For example, an icon may be displayed for each player which turns red in the event that a player misses a note in the unison sequence.

The game may then award a bonus to the members of the band or the band as a whole for successfully executing the unison sequence (step 305). Examples of bonuses that may be awarded include additional points, score multipliers, in-game money, in-game frame, in-game gear, and/or access to additional levels. Additionally, the game may alter one or more graphical and/or audio elements in response to the successful execution, including, without limitation, crowd volume, crowd animation, arena lighting, arena effects, avatar demeanor, and avatar actions. In some embodiments, a bonus accumulated as in FIG. 3C may only be awarded to the band upon successful execution of the unison sequence. In other embodiments, a bonus accumulated as in FIG. 3C may be multiplied by a given number in the event the following unison sequence is executed.

Figure 4A:
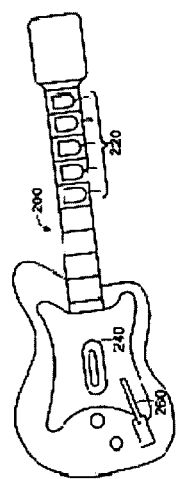
FIGS. 4A, 4B, 4C, 4D, 4E and 4F are embodiments of a simulated guitar controller for use with a video game.

Referring now to FIG. 4A, an embodiment of a simulated guitar controller 200 for use with a video game is shown. The simulated guitar controller 200 is provided with fret buttons 220. Although five fret buttons are shown in FIG. 4A, any number of fret buttons 220 may be provided by the controller 400. The simulated guitar controller also includes a "strum bar" 240. In order to successfully "play" a game event, the player holds down one or more of the fret buttons 220 while simultaneously strumming the strum bar 240, in much the same way that one would playa guitar. In some embodiments players may also execute "hammer ons" and "pull offs," as described below, which allow a player to "play" a game event by pressing or releasing only a fret button 220.

Figure 4C:
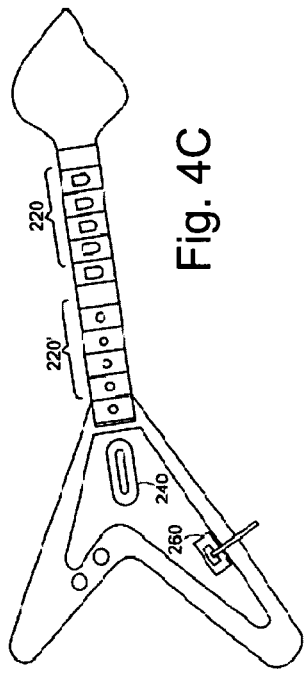
Figure 4B:
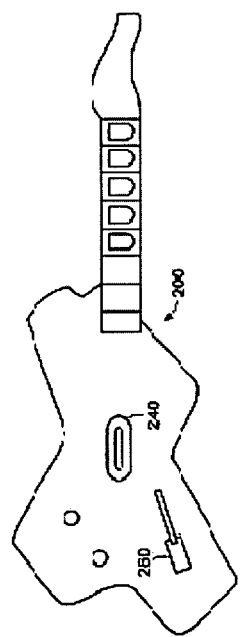

FIGS. 4B and 4C depict alternate embodiments of the guitar controller of FIG. 4A. FIG. 4B depicts an embodiment of the guitar controller intended to simulate a guitar model known as the "Explorer." FIG. 4C depicts an embodiment of the guitar controller intended to simulate a guitar model by Gibson known as the "Flying V." Any other body styling may be provided. For example, in some embodiments, the body portion of the guitar controller simulates a Gibson Blueshawk, Gibson Byrdland, Gibson Chet Atkins SST, Gibson Citation, Gibson Corvus, Gibson Digital, Gibson ES-120, Gibson ES-125, Gibson ES-135, Gibson ES-137, Gibson ES-150, Gibson ES-165, Gibson ES-175, Gibson ES-225, Gibson ES-295, Gibson ES-330, Gibson ES-335, Gibson ES-335 "Lucille", Gibson ES-345, Gibson ES-347, Gibson ES-355, Gibson EDS-1275, Gibson Explorer (also known as the X-plorer), Gibson Firebird, Gibson Futura, Gibson Howard Roberts Fusion, Gibson Invader, Gibson L4-CES, Gibson L5, Gibson L5S, Gibson L6-S, Gibson Les Paul, Gibson Les Paul Black Beauty, Gibson Les Paul Custom Anniversary 25/50, Gibson Les Paul Junior, Gibson Les Paul Studio, Gibson Les Paul Swamp Ash Studio, Gibson Les Paul Recording, Gibson Les Paul 23, Gibson Les Paul 432, Gibson (Les Paul) "The Paul" Deluxe (which has a cutaway SG body), Gibson (Les Paul) "The Paul" Deluxe Firebrand (which is characterized in having a cutaway SG body with firebranded Gibson logo), Gibson Marauder, Gibson Melody Maker, Gibson Nighthawk, Gibson RD, Gibson S-I, Gibson SG, Gibson SG Special, Gibson SG Supreme, Gibson Sonex, Gibson Super 400, Gibson MIII, Gibson Advanced Jumbo, Gibson Blues King, Gibson B12-45 12 string, Gibson C-165 Maple, Gibson C-165 Rosewood, Gibson Hummingbird, Gibson Hummingbird Custom, Gibson Dove, Gibson Dove Artist Model, Gibson Doves In Flight Custom, Gibson J-160 E VS Std, Gibson J-180, Gibson J-185, Gibson J-185 EC, Gibson J-185 EC Rosewood, Gibson J-185 EC Cutaway, Gibson J-90 Super Fusion, Gibson J-45, Gibson J-45 Deluxe, Gibson J-45 Rosewood, Gibson 0.145 Custom Vine, Gibson J-50, Gibson L-00, Gibson L-130, Gibson L-140, Gibson L-150 Custom, Gibson LC-I Cascade, Gibson LC-2 Sonoma, Gibson J-100, Gibson Nick Lucas Reissue, Gibson Nick Lucas Elite, Gibson J-150 Maple, Gibson J-200, Gibson J-200 EC, Gibson SJ-200 Western Classic, Gibson .I-200 Custom Vine, Gibson J-250 Monarch, Gibson J-2000, Gibson Super 200 Cutaway Custom, Gibson SJ-300 Rosewood, Gibson Sheryl Crow Signature Model, Gibson Songwriter Deluxe, Gibson Songwriter Deluxe Cutaway, Gibson Songwriter Deluxe 12 String, Gibson Southern Jumbo, Gibson Traveling Songwriter, Fender Broadcaster, Fender Bullet, Fender Cyclone, Fender Duo-Sonic, Fender Electric XU, Fender Jaguar, Fender Jag-stang, Fender Jazzmaster, Fender Katana, Fender Contemporary Stratocaster Japan, Fender Lead Series, Fender LTD, Fender Musicmaster, Fender Mustang, Fender Prodigy, Fender Performer, Fender Showmaster, Fender Starcaster, Fender Stratocaster, Stratocaster XII, Fat Strat, Fender Telecaster, Fender Telecaster Custom, Fender Telecaster Deluxe, J5 Telecaster, Fender Telecaster Squire, Fender Toronado, Fender Swinger, Fender Bronco, or Fender Custom.

The body portion of the guitar may simulate bass guitars, such as the Gibson EB-0, Gibson EB-I, Gibson EB-2, Gibson EB-3, Gibson EB-6, Gibson RD bass, Gibson Thunderbird, Gibson Ripper, Gibson Grabber, Gibson G3, Gibson Victory Standard bass, Gibson Les Paul bass, Fender Jazz Bass, Fender Jaguar Bass, Fender Mustang Bass, Fender Precision Bass, Fender Performer Bass, Fender Telecaster Bass, Fender VI, Fender Zone Bass, Fender Dimension Bass, Fender Bass V, Fender Bronco Bass, or Fender Bullet Bass.

FIG. 4C depicts another alternate embodiment of the guitar controller having two sets of fret buttons 220, 220'. As shown in FIG. 4C a second set of fret buttons 220' is disposed on the "neck" of the guitar proximal to the guitar body, i.e. in between the first set of fret buttons 220 and the guitar body. In some embodiments, the ordering of the second set of fret buttons 220' is the same as the first set of fret buttons 220; that is, if the first set of fret buttons 220 are colored, beginning at the "head" of the guitar neck and moving toward the body, green, red, yellow, blue, orange, then the second set of fret buttons 220' have the same coloring as one continues down the neck toward the guitar body.

In some embodiments, the fret buttons 220 and 220' may be colored to indicate that the buttons correspond to a particular note, chord, or fret. In some embodiments, a fret button 220 may indicate color by the color of the entire fret button. In other embodiments, only a portion of the fret button may be colored. For example, a fret button may be mostly black, but contain a colored dot or stripe indicating color. Or for example, the fret button may be clear, and one or more lights underneath the fret button may indicate the color.

In other embodiments, other markings on the neck may indicate the "color" of a particular fret button. For example, colored dots may be placed on the neck of the guitar next to one or more fret buttons 220 indicating the color corresponding to the fret button. In another example, patterns of dots may be used to indicate the note, chord, or fret to which a given button corresponds, similar to the patterns of dots used on traditional guitars to designate frets by thirds and octaves. In these embodiments, the fret buttons themselves may be white, clear, black, or all colored a similar color. In still other embodiments, one set of fret buttons 220 may be colored, while a second set of fret buttons is colorless. For example, in an embodiment such as the one shown in FIG. 4F, only one of the two fret buttons disposed on a given fret may be colored.

In some embodiments, a user of a guitar controller may be able to change the colors corresponding to one or more fret buttons, such as by using stickers, removable button colors, multiple colored LED's under the fret buttons, or otherwise. A game using the guitar controller may then have a configuration tool such that the user can configure the game to recognize the altered colors.

In some embodiments, one or more fret buttons may be pressure sensitive. In one embodiment, the fret buttons may sense the amount of force a player is holding them down with, and transmit a signal accordingly. In one embodiment, this pressure sensitivity may be used to simulate a vibrato effect, in which a player can vary the pressure on a fret button to bend the pitch of a played note up and down. In another embodiment, a player may be able to control the volume of playing by varying the amount of pressure on a fret button. In still other embodiments, a player may vary the amount of pressure on a fret button to vary the attack or tail of a played note.

Although shown in FIG. 4C as round buttons, fret buttons 220' may be any shape or size, including the same shape and size of the first set of fret buttons 220.

Figure 4E:
Figure 4D:
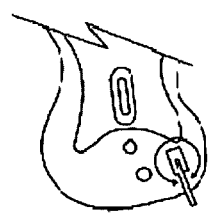
Figure 4F:
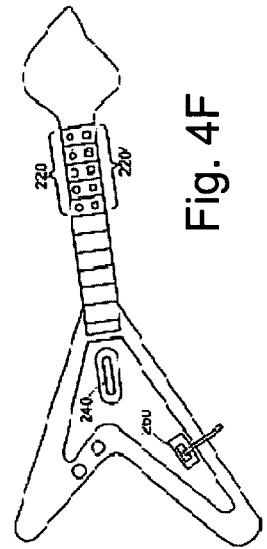

Referring ahead to FIG. 4F, the second set of fret buttons 220' may be positioned on the neck portion of the guitar controller such that respective ones of the first set of fret buttons and corresponding ones of the second set of fret buttons are positioned on the same fret of the neck (i.e. a red fret button of the first set of buttons 220 and a red fret button of the second set of fret buttons 220' are located near each other on the same "fret" of the neck portion of the guitar controller). In specific ones of these embodiments, fret buttons are physically connected to a toggle switch which allows a single physical button to provide two fret buttons, one associated with a first set of fret buttons and one provided with a second set of fret buttons. In further embodiments, respective ones of the first set of fret buttons 220 and corresponding ones of the second set of fret buttons 220' are electrically connected, e.g. wired together, so that activation of either one of the respective fret buttons is identified by the controller as activation of the fret button, regardless of whether the fret button from the first set of fret buttons 220, the fret button from the second set of fret buttons 220', or both, are activated. In still other embodiments, the respective ones of the fret buttons are not wired together, that is, the controller can distinguish between activation of fret buttons in one set versus activation of fret button in another set.

In some of these latter embodiments, the second set of fret buttons 220' may be used for playing "solos" during gameplay. Use of the guitar controller in this manner provides a player with a more realistic gameplay experience, since guitar solos are often played very close to the body of the guitar. In some embodiments, the second set of fret buttons 220; may be the only set of fret buttons on which hammer-ons and pull-offs may be executed, as described below. In other embodiments, the second set of fret buttons 220' may be used to trigger specific guitar effects, such as pick slides, screeches, or feedback. Alternatively, "performing" using the second set of fret buttons may alter game graphics (such as venue animation, venue lighting, crowd animation, brightness, avatar animation, game cue sustain tail, game cue brightness, game cue sustain tail brightness, game cue size, game cue shape, game cue sustain tail pulsation, and game cue sustain tail size), sound quality, or other gameplay characteristics, such as character health, character wealth in the game, the player's score, or in-game "powerups."

Referring back to anyone of FIGS. 4A, 4B and 4C, the simulated guitar controller 400 also includes a vibrato bar 260, also known to guitar players as a tremolo bar or "whammy bar." The vibrato bar 260, for convenience, will be referred to throughout the remainder of this document as a "whammy bar" The whammy bar 260, as will be described below, may be used to alter the frequency, pitch, volume, sound quality, distortion, simulated feedback sound, or any other attribute of the current note or chord being played by the player.

The whammy bar 260 of the controller resembles a whammy bar of a real guitar. As shown in FIG. 4D, and with comparison to FIG. 4B, the whammy bar 260 can be rotated to any one of a number of positions for the convenience of the player. As shown in FIG. 4D, the whammy bar 260 has been rotated to a position that places it out of the way of the player's strumming hand. In some embodiments, the whammy bar 260 is spring-loaded, like the whammy bar of a real guitar. In these embodiments, as depicted by FIG. 4E, the whammy bar 260 can be pushed down or pulled up to affect the played note. When released, it settles back to its default, neutral position.

The whammy bar is typically manipulated by the guitarist's strumming hand, that is, the hand with which the player operates the strum bar 240. In a real guitar, manipulating the whammy bar directly affects the tension of the guitar strings, and therefore causes the pitch of the vibrating strings to rise and fall as the bar is pulled or pushed. The simulated whammy bar of the guitar controller, the vibrato bar, can be used as a continuous controlling actuator, much like a joystick. Typically, the vibrato bar has a single degree-of-freedom, but it may have more degrees of freedom. It may additionally be used as an on-off switch, instead of a continuous controller. The whammy bar 260 of the controller looks and feels like the whammy bar of a real guitar, and, therefore provides a much more enjoyable gaming experience for the player.

The guitar controller 200 also allows a player to use more sophisticated guitar playing techniques to interact with a game. Two such techniques are "hammer ons" and "pull offs."Hammer-ons and pull-offs allow a guitarist to player notes in rapid succession. Typically, they only require the use of the player's fretting hand. To playa hammer-on note, the guitarist uses one of the free fingers of his fretting hand to strike the guitar string with high velocity. This results in the string vibrating due to the force of the string hitting a fret. As a result, the string need not be strummed by the strumming hand. Pull offs require the guitarist to tug slightly on the string when he releases it from a fret. This pulling action also causes the string to vibrate more, again, eliminating the need to strum the string with the strumming hand.

In the simulated guitar controller 400, hammer-ons may be simulated by allowing the player to press down fret buttons 420 without needing to simultaneously strum the strum bar 440. This is achieved by the manufacturer of the game authoring the game content to identify a note as amenable to hammering on or pulling off. For a hammer on, a player will generally need to capture a "lower" pitched note traditionally, that is, by holding down a fret button and simultaneously activating the strum bar. If the next note is identified as amenable to being played by a hammer technique, the player need only activate the "higher" pitched fret button to successfully capture the note.

Similarly, in pull-offs, the player can "playa note" by releasing a fret button 220 without needing to simultaneously strum the strum bar 240. This is achieved, again, by the manufacturer of the game authoring the game content to identify a note as amenable to hammering on or pulling off. For a pull off, a player will generally need to capture a pair of notes traditionally, that is, by holding down both fret buttons and simultaneously activating the strum bar. If the next note is identified as amenable to being played by a pull off technique, the player need only release the "higher" pitched fret button to successfully capture the note. As discussed above, when using the embodiment of a guitar controller 200 depicted in FIG. 4E, the second set of fret buttons may be used to perform hammer-ons and pull-offs. In either of these embodiments, notes that may be played using a hammer-on or pull-off technique may be visually indicated to the player by, for example, changing their geometric shape, transparency, color, or brightness.

Real guitarists often perform flamboyant motions on stage when playing guitar as part of their showmanship. One typical motion involves rotating the guitar vertically so that the neck of the guitar points up, while the body of the guitar is down, usually at waist level. In the simulated guitar controller 200, a mechanical "tilt sensor" can be included that monitors the guitar's physical orientation. This tilt sensor is typically a mercury switch or a ball-bearing switch which acts as a binary actuator, indicating whether the guitar has been rotated into a "neck up" position, or is in the normal playing position. Such tilt sensors have been included in guitar controllers manufactured by Konami and by Red Octane. Other secondary techniques for interacting with the controller include shaking the controller and slapping the controller.

Figure 4I:
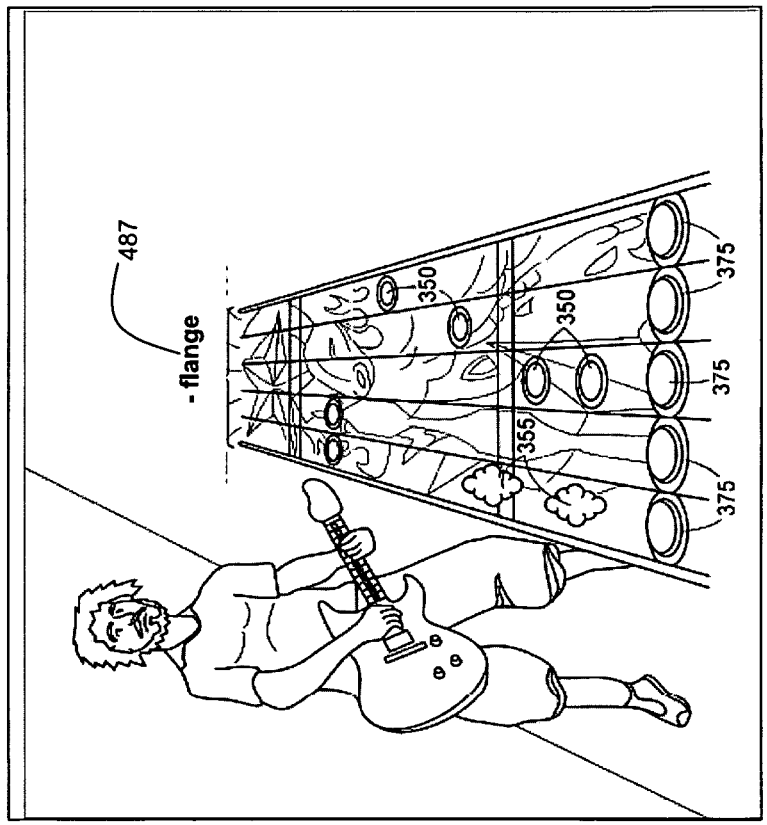
FIG. 4I is an example screen display in which a player uses a 5-way switch to select a guitar effect.
Figure 4G:
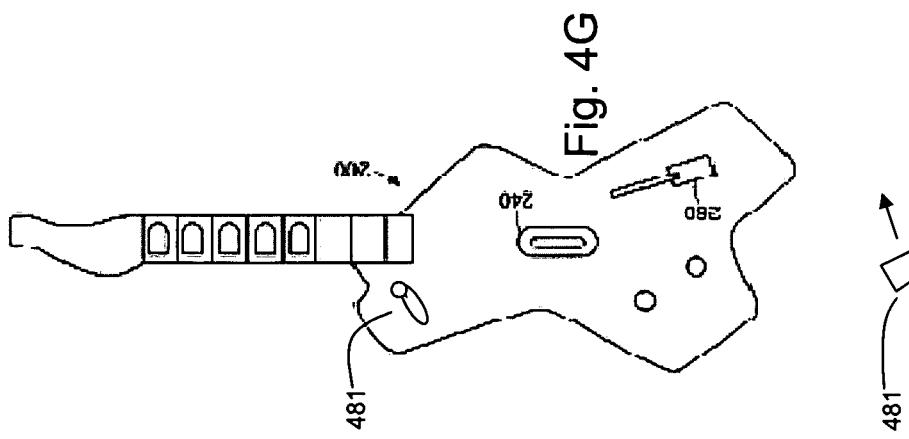
FIG. 4G depicts an embodiment of a guitar controller with a 5-way switch.

Referring now to FIG. 4G, an embodiment of a guitar controller with a 5-way switch is shown. A 5-way switch 481, which may be similar in appearance and function to 5-way switches which appear on real guitars, is included on the guitar controller. A 5-way switch may be included on any type of guitar controller, including without limitation all of the guitar controller embodiments described herein. A 5-way switch may be located anywhere on the guitar controller, including without limitation near the neck, as in FIG. 4G, near the strum bar, near a whammy bar, near a shoulder strap attachment, and near the bottom of the guitar. Although the remainder of this description will discuss a 5-way switch, it should be understood that a switch with any number of positions may be substituted for a 5-way switch, including a 2-way, 3-way, 4-way, 6-way, 7-way and 8-way switch.

Figure 4H:
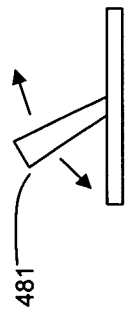
FIG. 4H depicts a side view of one embodiment of a 5-way switch.

Referring now to FIG. 4H, a side view of one embodiment of a 5-way switch is shown. A 5-way switch may comprise a toggle switch 481 which may be toggled between 5 unique positions. In other embodiments (not shown) a 5 way switch may comprise any input mechanism which can specify 5 states, including without limitation a slider, dial, or push button. In some embodiments, each of the five states may correspond to a guitar effect, including, without limitation, feedback, distortion, screech, flange, wah-wah, echo, reverb, or dry (no effect).

Referring now to FIG. 4I, an example screen in which a player has used a 5-way switch to select a guitar effect is shown. In the screen shown, a message 487 is displayed to the player indicating which effect the player has selected. In other embodiments, the selected effect may be indicated via an icon, audio message, or not explicitly indicated at all.

A selected guitar effect may be implemented in any manner within the game. In some embodiments, the selected guitar effect may immediately be applied to the guitar sounds produced by the player, and be applied for as long as the player has the switch set to the guitar effect. In other embodiments, guitar effects may only be deployed for certain amounts of time, and in certain places in songs. In one embodiment, a guitar effect may only be activated when a player activates a bonus. For example, when a player activates a bonus (such as from a bonus meter 120) the player's currently selected guitar effect may be deployed for a set amount of time, or a set number of notes. In another embodiment, a player may earn the right to deploy one or more guitar effects by achieving a given score or completing a certain task. Once the guitar effects are earned, then the player may deploy them at any time. In some embodiments, certain guitar effects may positively or negatively impact a player's score.

Figure 5A:
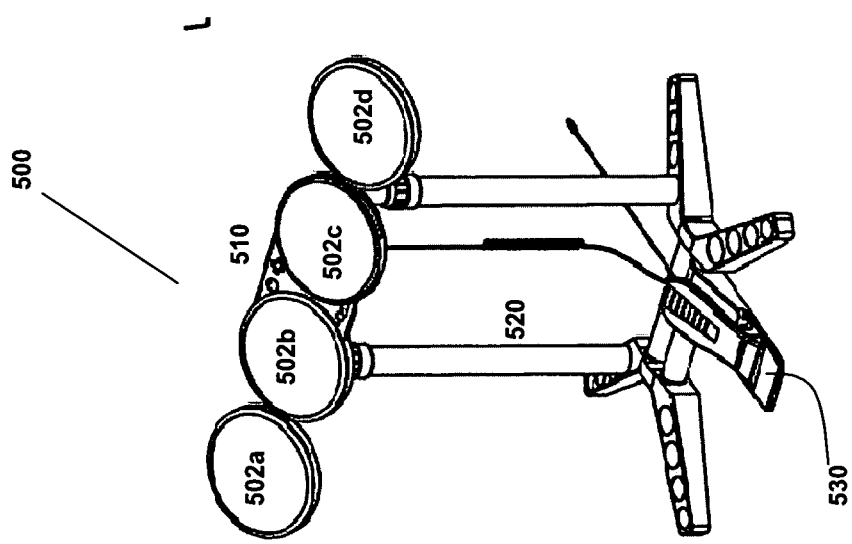
FIG. 5A shows an embodiment of simulated drum set for use with a video game.

Referring now to FIG. 5A an embodiment of a simulated drum set for use with a video game are shown. In brief overview, a simulated drum set 500 comprises a number of drum pads 502a, 502b, 502c, 502d (generally 502). The simulated drum set 500 may also comprise a controller 510 with various buttons, switches, and/or joysticks. The simulated drum set may also comprise a foot pedal 530 to simulate a foot-activated percussion instrument, such as a bass drum or hi-hat. The simulated drum set 500 may be mounted on a stand 520 to elevate the drum pads 502 and secure the foot pedal 530.

Still referring to FIG. 5A, now in greater detail, a simulated drum set may comprise any number of drum pads 502, including without limitation zero, one, two, three, four, five, six, seven, eight, nine, or ten. Upon a user striking a drum pad 502, the drum set 500 may transmit a signal to a game system that the pad was struck. This signal may be transmitted via any means, including cables and wireless signals. The signal may comprise any information about a strike including without limitation the time, force, duration, location on the pad, size of the object striking the pad, and texture of the object striking the pad. For example, the drum set may transmit a signal indicating that pad 502b was struck with a force above a given threshold. Or, for example, the drum set may transmit a signal indicating that pad 502c was struck very near the rim of the pad.

In some embodiments, the drum pads 502 may be struck with drum sticks used with ordinary drums. In other embodiments, the drum pads 502 may be struck with customized drum sticks designed specially to work with the set 500.

During a game session, each drum pad may be configured to simulate an individual percussion instrument. For example, a user striking a drum pad 502a may cause a snare drum sound to be played, while the user striking drum pad 502b may cause a tom-tom sound to be player, while the user striking drum pad 502d may cause a crash cymbal sound to be played. In some embodiments, the played sound may reflect any of the properties of the user's strike of the drum pad. For example, a game may playa louder snare drum sound in response to a user hitting a drum pad harder. Or for example, a game may alter the sound of a ride cymbal played depending on how close to the center or the rim of the drum pad the user strikes. In some embodiments, the sound played in response to a drum pad strike may be chosen from a prerecorded library of percussion sounds. In other embodiments, in response to a user successfully striking a pad 502 corresponding to an on screen gem, a portion of a pre-recorded drum track corresponding to the current song may be played.

The drum set 500 may also comprise a number of foot pedals 530. In some embodiments, a single foot pedal may be provided. In other embodiments, any number of foot pedals may be provided, including two (such as one to simulate a bass drum and one to simulate a hi-hat), three or four. During a game, the foot pedal may be used to create any percussion sound.

In some embodiments, a drum set 500 may comprise a stand 520 which allows a user to sit or stand while playing the drum pads, and still have access to the foot pedal 530. In one embodiment, the stand may allow a user to adjust the height of the drum pads as a whole. In another embodiment, the stand 520 may allow a user to adjust the height of the drum pads individually. In still another embodiment, the stand 520 may allow a user to adjust the position of one or more pads, such as by swiveling one or more pads closer to the player. In some embodiments, the stand 520 may allow a user to adjust the placement of the foot pedal, including moving the foot pedal forwards, backwards, and side-to-side. In one embodiment, the foot pedal and/or drum pads 502 may be detachable from the stand. In this embodiment, the drum pads 502 may be placed on a table top or held on a player's lap.

In some embodiments, a simulated drum set 500 may include a controller 510. The controller may comprise inputs for configuring the simulated drum set, including, for example, sensitivity, left/right handed switching, and turning the drum set on and off. The controller 510 may also comprise any other game inputs. In some embodiments, the controller 510 may comprise some or all of the functionality of a standard game controller for any of the game systems described herein. In some embodiments, the controller may be used for navigating menus, or inputting configuration or other game data.

A simulated drum set 500 may also comprise any other elements incorporated in game controllers. In some embodiments, a drum set 500 may comprise a speaker which may provide individual feedback to the player about the player's performance. In large multiplayer games, this individual speaker may assist a player in assessing their performance and hearing whether or not they missed a note. In other embodiments, a drum set 500 may comprise a microphone which may be used to chat with other players, provide vocal input, or provide hand claps, microphone taps, or other aural input. In other embodiments, such an individual speaker may be included in any other simulated instrument, including a guitar and/or microphone.

In some embodiments, the drum pads 502 and/or foot pedal 530 may be color coded. For example, drum pad 502*a* may be green, pad 502*b* may be red, pad 502*c* may be yellow, pad 502*d* may be blue, and the foot pedal 530 may be orange. Color coding may be indicated in any manner, including the color of the pads 502, the color of the rims surround the pads 502, the color of an icon or design on the pads 502 or rims, or one or more labels on the pads, rims, and/or stand. The color code of the foot pedal may also be indicated in any manner, including the color of the foot pedal, the color of a design or icon on the foot pedal, or one or more labels on the foot pedal or stand.

In addition to being used during gameplay, in some embodiments the simulated drum set may be used to navigate one or more menus or produce other game input. For example, a game may display a menu to users in which different menu options are color coded. A user may then strike the drum pad or stomp the foot pedal corresponding to the color of a menu option to activate that menu option. Or for example, a series of menus may be provided in which a user may use two drums 502*b* 502*c* to cycle up and down among choices within a menu, and use two drums 502*a*, 502*d* to move forward and backward between different menus. In some embodiments, one or more drums may be assigned a designated function throughout a game interface. For example, during the course of navigating a series of menus, startup, and/or configuration screens, a player may always be able to use the foot pedal to return to a main screen. Or for example, the player may always be able to use the leftmost drum 502*d* to alter a currently selected option. In some embodiments, navigating menus and configuration screens may be done via a combination of the drum pads, foot pedal, and controller.

Figure 5B:
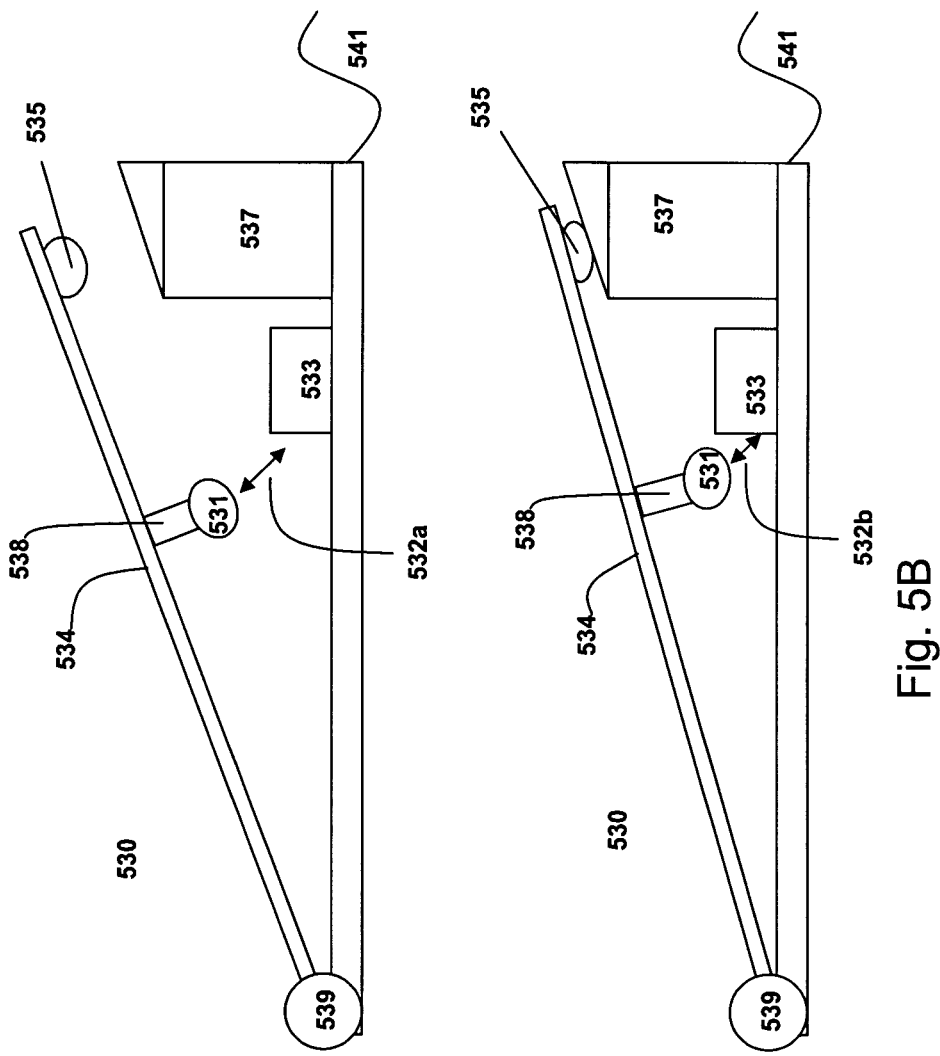
FIG. 5B illustrates side views of a foot pedal in an up and down state.

Referring now to FIG. 5B, side views of a foot pedal 530 in an up and down state are shown. In brief overview, a foot pedal 530 comprises a foot board 534 which can be pressed down by a user's foot. The foot board 534 will move down until a pad 535 reaches the base of the pedal 537. The foot pedal 530 may comprise contactless means for determining the angle of depression of the foot pedal. In the embodiment shown, the foot pedal 530 comprises a magnet 531 mounted to the foot board 534 via an attachment 538. Upon pressing of the foot board, the magnet 531 moves closer to a sensor 533 which can detect the movement and distance of the magnet. The sensor 533 may then transmit a signal carrying information about the position and/or motion of the foot board to a simulated drum set 500 or directly to a game system. This signal transmission may be done via a wire 541 or wirelessly.

Still referring to FIG. 5B, now in greater detail, the foot pedal shown comprises a sensor 533 for determining the position of the foot board 534 without requiring contact with the foot board, or any moving parts within the sensor. This may allow the foot pedal to reliably detect a depression of the foot pedal without producing a "click" or other noise, which may be distracting to a player of a game. For example, the pad 535 which contacts the base 537 may be softened or otherwise treated such that the noise from the pad hitting the base of the foot pedal is minimized. This may also allow the foot pedal to have a longer lifespan by not requiring a mechanical switch which may wear out. This may also allow the foot pedal 530 to perform reliably under a wide range of potential force profiles—for example some players may aggressively stomp the foot board 534, while other players may press the foot board 534 more delicately.

The sensor 533 may comprise any electrical means for measuring the position and/or velocity of the magnet 531 and generating a signal indicating the position and/or velocity. In some embodiments, the sensor may measure an electrical charge created by the magnet's 531 position. In these embodiments, the sensor may comprise a Hall Effect sensor. In other embodiments, the sensor 533 may measure an electrical current induced by the motion of the magnet. Although the sensor is shown mounted to the base 537 of the foot pedal, in other embodiments the sensor 533 may be mounted to the foot board 534 of the foot pedal. Further, although a magnet 531 is shown activating the sensor, in other embodiments, any other contactless switch and/or sensor may be used, including without limitation optical sensors.

The foot pedal 530 may transmit any signal relating to the position and/or velocity of the foot pedal. In some embodiments, the foot pedal may transmit a signal each time the pedal is pressed past a certain threshold. In one embodiment, the threshold may be defined as a predetermined angle of depression. In another embodiment, the threshold may be defined as a predetermined velocity of the depression. In still another embodiment, the threshold may be defined as a predetermined velocity combined with a predetermined angle. For example, the foot pedal may transmit a signal when the angle between the base 537 and foot board 534 becomes less than 15 degrees (which may correspond to when the pad 535 contacts the base). In another example, the foot pedal may transmit a signal when the angle between the base 537 and foot board 534 becomes less than 15 degrees provided that the foot board 534 was pressed above a minimum velocity. In this manner, the foot pedal may simulate a real bass drum in that a minimum velocity and angle are required to produce a sound. In other embodiments, the foot pedal may transmit a continuous signal detailing the position and velocity of the foot board 534.

A game may use any aspects of the signal produced by a foot pedal in simulating a drum sound. For example, in some embodiments, the game may reproduce a louder drum sound in response to a harder stomp from a player on the foot pedal.

A foot pedal 530 may comprise a spring, elastic, or any other mechanism for returning the foot pedal 530 to its original state after the foot pedal has been depressed. In some embodiments, the foot pedal 530 may comprise a spring in a pivot point 539. In other embodiments, the foot pedal 530 may comprise one or more springs positioned between the base 537 and the foot board 534. In some embodiments, the springs of a foot pedal 530 may be configured to simulate the feel of a real kick drum.

Referring back to FIG. 1A, one embodiment of a screen display for a video game in which a player emulates a musical performance by providing vocal input is shown. A player provides vocal input matching the pitch and duration of notes included in musical content associated with the game. As shown in FIG. 1A, the notes of a vocal track may be represented by "note tubes" 124. In the embodiment shown in FIG. 1A, the note tubes 124 appear at the top of the display and flow horizontally, from right to left, as the musical content progresses. In other embodiments, the note tubes 124 may be positioned at the bottom of the display. In still other embodiments, the note tubes 124 may be positioned above the lanes but below the avatars.

In these embodiments, vertical position of a note tube 124 represents the pitch to be sung by the player; the length of the note tube indicates the duration for which the player must hold that pitch. The arrow 108 provides the player with visual feedback regarding the pitch of the note that is currently being sung. If the arrow is above the note tube 124, the player needs to lower the pitch of the note being sung. Similarly, if the arrow 108 is below the note tube 124, the player needs to raise the pitch of the note being sung. In these embodiments, the player providing vocal input may do so using a USB microphone of the sort manufactured by Logitech International of Switzerland. As shown in FIG. 1A, lyrics 105 may be provided to the player to assist their performance.

In some embodiments, in addition to detecting the pitch the player is singing, a game may also detect phonemes used by a player to determine whether a player is singing the correct lyrics to a song. For example, for the lyrics "She's the girl for me" a phoneme detection scheme may require that the player sing words that at least begin with a "sh" sound, followed by a "th" sound, a "g" sound and end with a "ee" sound. In some embodiments, the phoneme detection may be synchronized with the rhythm of the song being played, such that a player is required to sing certain syllables at the proper times within a song. In some embodiments, phoneme detection may be used in all the songs of a game. In other embodiments, phoneme detection may only be used with certain songs or difficulty levels. In still other embodiments, phoneme detection may be used in place of pitch detection during vocal sections of songs which meant to be spoken or shouted instead of sung traditionally. In some embodiments, a phoneme detection library software package may be used to facilitate the phoneme detection.

As discussed above, in some embodiments one or more of the players may participate remotely. In these embodiments, remote play may be facilitated using the "emulation data" methods described above. In those methods, a remote gaming platform receives emulation parameters, either from a central service or directly from a participating player, regarding the player's performance. As above, the emulation data may include any number of parameters that describe how well the player is performing. In some specific embodiments, the emulation data may also reflect whether the player providing vocal input is singing an octave higher or lower than the target musical data.

In one particular example, an incoming emulation parameter from a remote player indicates that the most recently performed note tube was performed at one of a set of quantized quality levels, e.g., "lousy," "poor," "ok," "good," "great," and "perfect." The local gaming platform will respond accordingly by modifying the vocal track that is locally reproduced in a manner that approximates the received emulation data. For example the pitch of the vocal track may be elevated or depressed a number of half steps corresponding to the received emulation data. In other embodiments, distorting effects may be applied to the reproduced vocal musical data to reflect the emulation data received. Such distorting effects may include white noise, frequency shifting, frequency shaping, volume adjustments, and tempo shifting. In certain embodiments, the vocal track may not be reproduced if the emulation data reflects a very poor vocal performance. In other embodiments, the volume of the vocal track may be decreased to reflect poor performance, and increased to reflect good performance.

In another particular example, an incoming emulation parameter from a remote player indicates that the player providing vocal input is providing input an octave higher than expected. In these embodiments, the pitch of the vocal track may be raised by an octave to reflect the vocal player's performance. A similar technique may be used if the vocal player provides vocal input that is an octave lower than the expected musical performance data. In other embodiments, incoming emulation parameters may reflect whether a remote singer is flat or sharp, and the pitch of the vocal track may be adjusted accordingly.

Figure 6A:
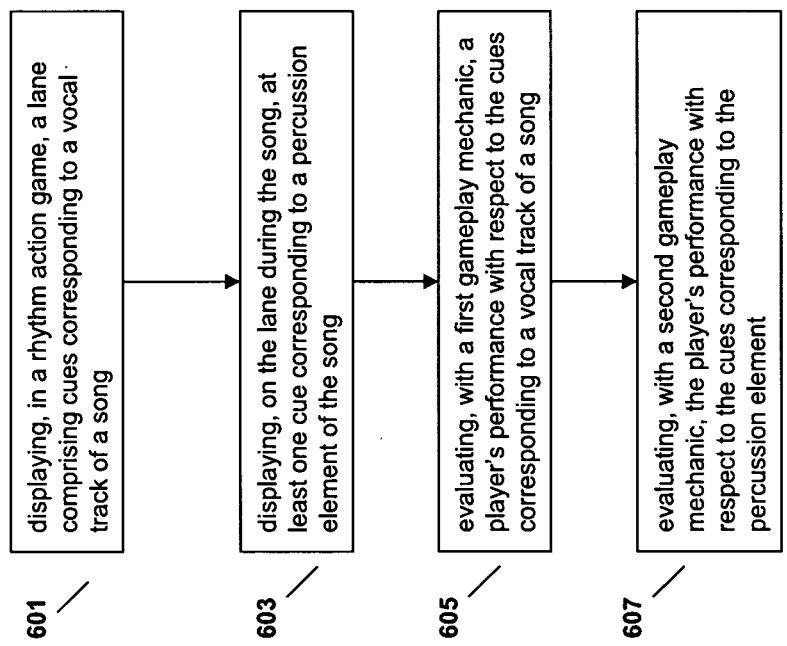
FIG. 6A is a flow diagram of one embodiment of a method for combining vocal cues and percussion cues for a player of a rhythm action game during a song.

Referring now to FIG. 6A, a flow diagram of one embodiment of a method for combining vocal cues and percussion cues for a player of a rhythm action game during a song. In brief overview, the method comprises: displaying, in a rhythm action game, a lane comprising cues corresponding to a vocal track of a song (step 601); displaying, on the lane during the song, at least one cue corresponding to a percussion element of the song (step 603); evaluating, with a first gameplay mechanic, a player's performance with respect to the cues corresponding to vocal elements (step 605); and evaluating, with a second gameplay mechanic, the player's performance with respect to the cues corresponding to the percussion element (step 607).

Still referring to FIG. 6A, now in greater detail, cues corresponding to a vocal track of a song may be displayed in any manner (step 601), including any manner described herein. In some embodiments, the cues may comprises a vocal cue similar to the vocal cue 124 shown in FIG. 1A. A vocal track of a song may comprise any part of a song involving vocal elements. Examples of vocal tracks may include lead vocal tracks, backup vocal tracks, chorus tracks, and any combinations of those tracks.

At least one cue corresponding to a percussion element of the song may be displayed on the same lane as the cues corresponding to the vocal track (step 603). The at least one cue may be displayed at any point during the song, including prior to, during, or after the display of any vocal cues. In some embodiments, the at least one percussion cue may be displayed during a portion of the song with no lead vocals. For example, a song may have an instrumental section in the middle of the song where no lead vocals (or no vocals at all) are present. During this section, cues may be displayed to the vocalist corresponding to a percussion instrument that is present during the instrumental section that may typically be played by a singer, such as a cowbell or tambourine. In this way, the vocalist does not have a long portion of a song with nothing to do.

Figure 6B:
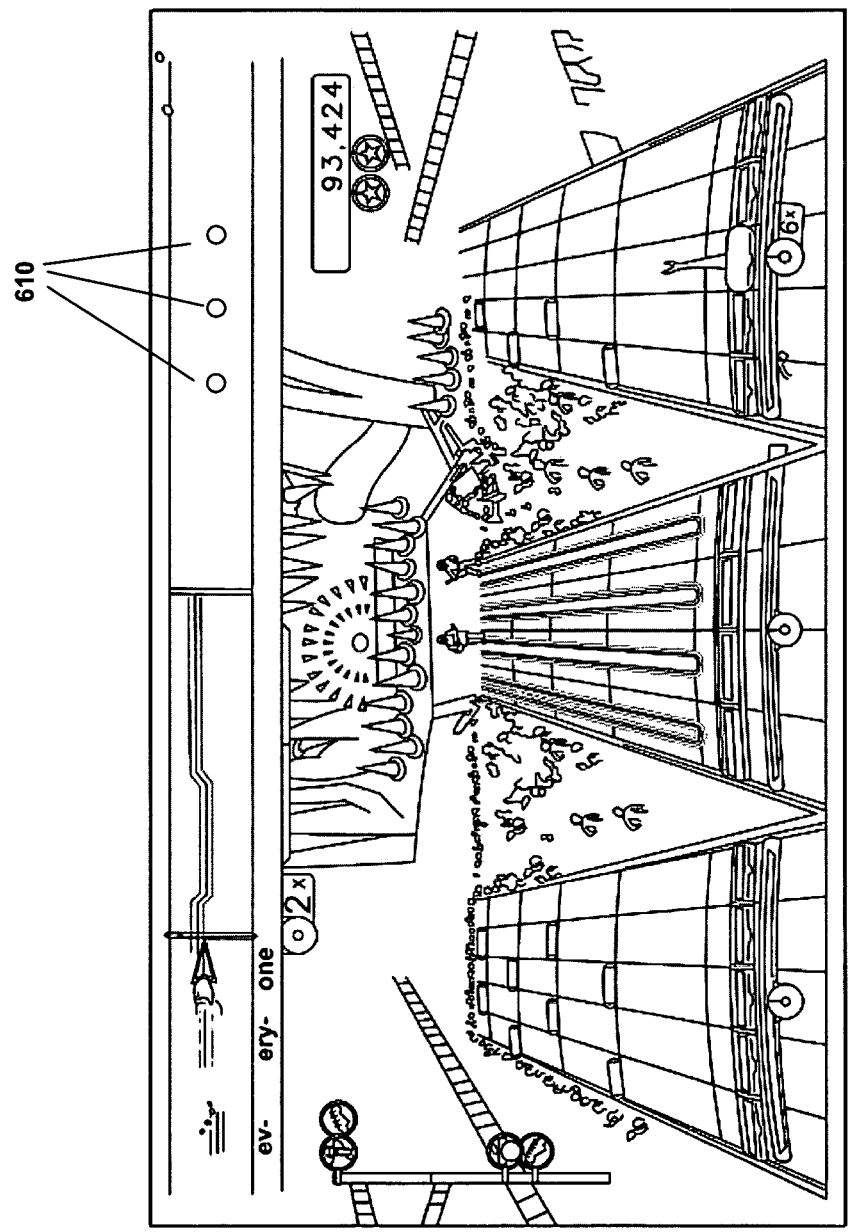
FIGS. 6B and 6C illustrate embodiments of a screen display in which a player provides both vocal and percussive input.

Referring ahead to FIG. 6B one embodiment of a screen display for a video game in which a player emulating a musical performance by providing vocal input is also asked to supply percussive input is shown. In the embodiment shown, the round musical targets 610 indicate that the vocalist must supply percussive input, such as input representing a tambourine, hand clap, thigh slap, maraca, castanet, tympani, or cymbal crash.

The musical targets 610 may comprise any graphical indication of a percussion act to be performed. In some embodiments, musical targets may be shaped to resemble the percussion instrument to be played. For example, cues may be shaped like a tambourine to indicate that a tambourine part should be mimicked. In some embodiments, the musical targets may be displayed in the vocalist's lane along with the pitch indications. In other embodiments, the musical targets may be displayed in the row where lyrics typically appear.

Figure 6C:
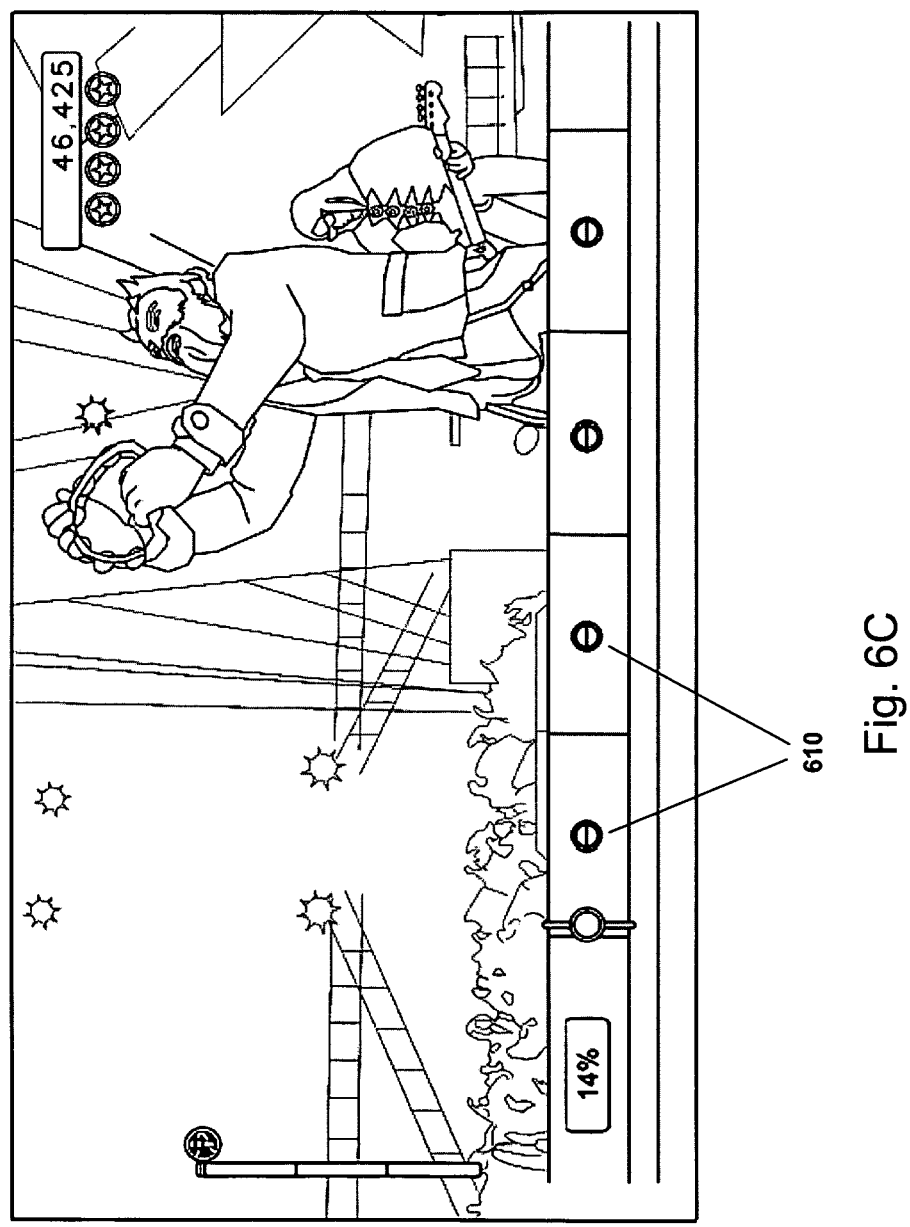

Referring now to 6C, a second embodiment of a screen display for a video game in which a player emulating a musical performance by providing vocal input is also asked to supply percussive input is shown. The screen depicts tambourine targets 610 scrolling across the bottom of the screen. If a player successfully shouts or taps the microphone at the correct time, the targets 610 may explode or flash to indicate the success. The screen also depicts the avatar of the vocalist holding a tambourine. In other embodiments, a vocalist avatar may be depicted holding or using any other percussion instrument the player vocalist is asked to mimic. Although no vocal cues are shown in FIG. 6C, vocal cues may be displayed before and/or after the shown section of the song.

Referring back to FIG. 6A, any first gameplay mechanic may be used to evaluate a player's performance with respect to the cues corresponding to vocal elements (step 605). The first gameplay mechanic may comprise any mechanic described herein for evaluating a vocal performance of a player, including without limitation pitch evaluation, phoneme evaluation, and any combination thereof.

A second gameplay mechanic may be used to evaluate the player's performance with respect to the cues corresponding to the percussion element. In one embodiment, the second gameplay mechanic may be to evaluate the timing of one or more bursts in sound data received from a microphone. In certain of these embodiments in which the player providing vocal input uses a USB microphone, input may be provided by tapping or striking the microphone or, in some embodiments, by shouting sharply or otherwise vocalizing into the microphone. In other embodiments, a sensor may be included in a microphone and a player may be required to shake, tilt, strike, or otherwise move the microphone to produce the percussion effect.

In some embodiments, the success of a player in performing the percussion targets may be included in their overall vocal performance metric, such as on a performance meter. In other embodiments, the success of a player in performing the percussion targets may be scored separately. For example, a vocalist's standing on a performance meter may be unaffected by their performance on the percussion targets. However, in this example successful execution of the percussion targets may trigger one or more bonuses, and/or increase a point score awarded to the vocalist or band.

Referring now to FIG. 7, a flow diagram of a method for providing improvisational vocal sections of a song during a rhythm action game is shown. In brief overview, the method comprises: identifying that a value associated with a vocalist's performance of a song in a rhythm action game exceeds a first predetermined threshold (step 701); providing, in response to the identifying, a vocal improvisational section during the song (step 703); determining, that sound data from a microphone assigned to the vocalist exceeds a second predetermined threshold during the improvisational section (step 705); and deploying, in response to the determining, a bonus (step 707).

Still referring to FIG. 7, now in greater detail, any value associated with a vocalist's performance of a song in a rhythm action game may be identified as exceeding a first predetermined threshold (step 701). In some embodiments, the value may be a total score for the song performance. In other embodiments, the value may be an accumulated bonus, such as a bonus accumulated by successfully executing predetermined vocal phrases. In still other embodiments, the value may be a current performance level.

In response to the identifying, an improvisational section of any length may be provided during the song (step 703). An improvisational section may be in contrast to the scenarios described above in which players must mimic a predetermined progression of gems to playa predetermined piece of music. An improvisational section may allow players to freely perform on the microphone without requiring a specific progression of notes or sounds. In some embodiments, a player's actions during an improvisational section may have no impact on a performance meter. In some of these embodiments, a performance meter may be removed from the display during an improvisational section.

An improvisational section of a song may be indicated in any manner. In some embodiments, an improvisational section of a song may be indicated graphically. For example, an improvisational section may be indicated by highlighting all the columns in a player's lane. Or for example, an improvisational section may be indicated by a special gem or series of special gems. Or for example, an improvisational section may be indicated by a message displayed to a player.

In some embodiments, an improvisation section may be indicated by a color block spanning some or all the columns or rows of a player's lane. In these embodiments, a color block indicating an improvisational section may then be graphically altered in response to a player's input. For a vocalist, in one embodiment, during improvisational sections the audio from pre-recorded vocal solo may be played, while the player is given the freedom to sing as he/she chooses. In some embodiments, a color block representing a vocal improvisational section may be distorted in an artistic or aesthetic manner in response to a player's vocal improvisations. Such distortions may mimic a tye-dye, fractal, wave, explosion, or other visual effects.

A determination may then be made that that sound data from a microphone assigned to the vocalist exceeds a second predetermined threshold during the improvisational section (step 705). The second predetermined threshold may comprise any threshold measure including without limitation volume, pitch, duration, and any combination thereof. In one embodiment, the second predetermined threshold may be a volume threshold, such that a player is required to make noise above a given volume. In another embodiment, the threshold may be a burst threshold, such that the player is required to produce a burst of sound with given parameters.

In response to the determining, a bonus may be deployed (step 707). In some embodiments, the deployed bonus may be a bonus accumulated by playing a predetermined number of selected phrases. For example, a player may accumulate bonuses by singing certain vocal sections above a given standard of performance. Once a player has accumulated enough bonuses, improvisational sections may begin to be provided to the player (such as, for example, during breaks between vocal phrases of the song). If a player sings or otherwise makes sufficient sound during the improvisational section, the accumulated bonus may be activated. The accumulated bonus may result in a score multiplier, improved performance meter, and/or increased crowd reaction.

Figure 8A:
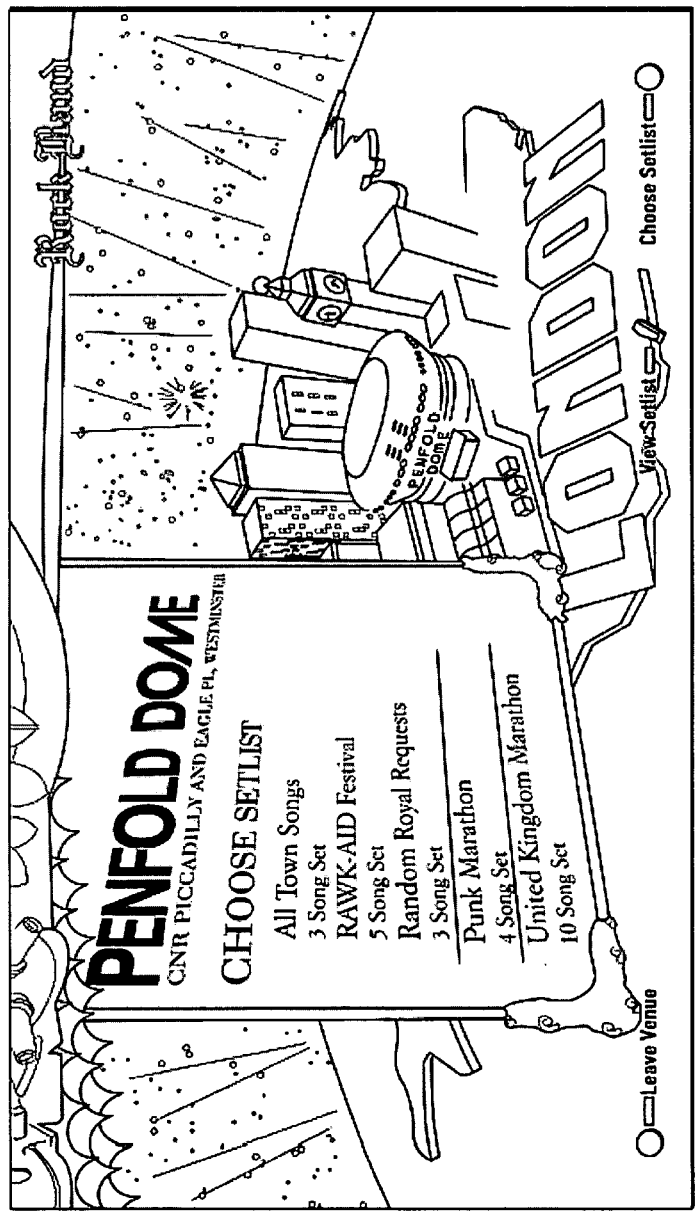
FIG. 8A is an example screenshot for allowing a band to choose a set of songs to play.

Referring now to FIG. 8A an example screen showing a band's options and progress through a simulated world tour in a video game are shown. In brief overview, a rhythm action game may present a single player or a band with the option to participate in a simulated world tour. Broadly speaking, a world tour may simulate the experience of traveling to and performing at a number of different venues in a quest to earn fame and money. As the tour progresses, a band may gain access to more and more content within the game, such as new venues, new cities, new songs, and new gear. Although the proceeding description with respect to FIG. 8A mainly refers to a band progressing through a tour, in other embodiments, a single player world tour may also be provided. In some embodiments, a unique single player tour may be provided in a game depending upon the instrument the player uses to play the tour.

Figure 8B:
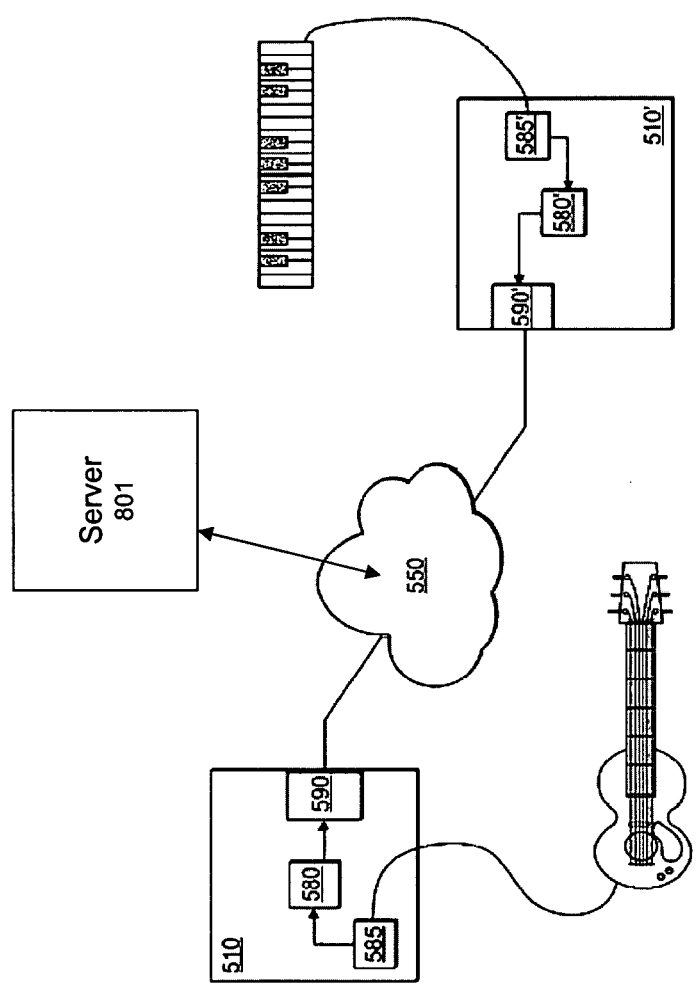
FIG. 8B illustrates one embodiment of a network environment providing an online multiplayer game simulating a rock band experience.

In the tour mode, members of the band earn money by traveling to various cities and countries and performing at venues within the locations. A band may earn money for successfully completing a show comprising one or more songs at a venue. A band may spend money by purchasing items, hiring assistants, and renting venues. The game experience may be provided in part by a number of servers which host data related to a bands progress through a tour and which comprise information about the venues and locations of the tour. In this manner, the venues, locations, and songs available to bands on a tour may be continually changed or updated as new content is added to servers. Referring ahead to FIG. 8B, a block diagram of an example network environment for such a system is shown.

The band may earn fame by performing well, and lose fame by performing poorly. The amount of a band's fame may determine the number and type of venues at which the band can play. For example, a band with a relatively low fame rating may not be able to access large arenas or concert halls. Fame may be measured both locally with respect to a given geographic region and globally. For example, a band may have a high fame rating in their hometown if they have played a number of gigs there, but have a low fame rating in a foreign city if they have not played any gigs there.

In some embodiments, a band may also have a "buzz" rating which is related to fame, but only calculated with respect to a band's most recent gigs. For example, a band's fame may steadily increase as they perform a large number of shows well, and remain high even if a recent number of shows are poor. However, the "buzz" rating for the band may fall much faster than their fame as a result of recent failures. In some embodiments, the buzz rating may be calculated relative to previous performances. For example, a band may receive buzz points if their most recent performance was better than their previous performance, regardless of the absolute level of the performance. Likewise, a band may lose buzz if their performance was worse than a previous performance, regardless of the absolute level of their performance. In some embodiments, however, a band may not lose buzz (and may even gain buzz) if their performance is at a high enough level regardless of any previous performances. In some embodiments, the amount of buzz a band has may be decremented if the band is inactive for longer than a given period of time.

In some embodiments, special events may be triggered based on a band's changing fame and/or buzz levels. For example, a band with a falling buzz level may be granted events for "washout" or "failure" bands. Or for example, a band with a rising buzz level may be eligible for "success" events, which may include bonus venues, songs, or prizes. Or for example, a band with a buzz cycling from high to low and back to high may be eligible for "comeback" events.

The venues available for band to play in may have a number of properties. In one embodiment, venues may have a minimum amount of fame required to play in the venue. In some embodiments, venues may be stratified related to their capacity and the amount of fame required for a band to be able to book them. For example, house parties, small bars, and open mic nights may require no fame or only a small amount of fame to play. Clubs, radio contests, and battles of bands may require a moderate amount of fame to play in. Arenas, large concert halls, and Outdoor venues may then require a larger amount of fame to play. In some embodiments, the amount of fame required to play a venue may vary depending on the type of gig. For example, playing a Thursday night opening set may require a smaller amount of fame than headlining a Saturday night show. In other embodiments, venues may require a minimum amount of buzz, or a minimum amount of increasing buzz.

Venues may also cost a given amount of money to rent. In some embodiments, this cost may vary depending on the type of gig. In some embodiments, the cost of a venue may be roughly proportional to the size and prestige of the venue.

Venues may also pay a certain amount to a band or players within a band for a successful performance. In some embodiments, the amount of money paid may be dependent on the quality of the player's performance. For example, a venue may offer to pay each player of a band $500 per star (out of five) earned on their performance. In this embodiment, different members of a band may be paid different amounts based on their individual performances. In some embodiments, the amount paid to a band or player may be decreased if the band fails one or more songs. For example, if a band fails 1 song out of a five song set, the band may only receive 4/5 of the original compensation.

In other embodiments, venues may require that a band be playing at a given difficulty level. For example, a band playing at a low difficulty level may not be able to access large arenas or clubs. In still other embodiments, venues may require that a band have a certain number of employees. For example, a gig at a club may require that a band employ a band manager to book the gig. Or for example, a gig at an arena may require that a band employ a number of set and/or lighting personnel, in addition to a number of roadies to set up the band's equipment.

Any data relating to a band's progress or performance at a given venue may be stored on a server so that it can be accessed by members of the band and/or other players. For example, a leaderboard may be maintained for each venue listing the bands with the best performances at that venue.

The following paragraphs provides one detailed example of how a band may be created and managed using the funds earned by the band in the context of an XBOX environment.

In this example, by default, all players are in a 'pick-up band' when they first begin a session in the online world tour area of a game. At any time, the session leader has the option of formalizing the group as a band. This may be accomplished through a Band Management screen by selecting "Create New Band" and assigning the current pick-up mix of players a collective moniker. The location of the data being stored is dependent on the type of people in the band. If all players are local or in System Link mode, then the data is stored on the band leaders' local Xbox save. If any player is also on Xbox Live, then the data is stored in the Band Leader's Xbox Live profile data for under the rock band game. In this example, by default, when all members of a band are in a session, the session automatically converts to the applicable persistent band instead of a pick-up band.

In this example, various band customization abilities are available depending on the current fame and cash level of the band. Naming your band is available from the instant you formalize the pick-up band as a persistent band. Creating a band logo is available once your band can play outside of town, and costs a small amount of money. Using your band logo as a stamp is available once a Merchandise Guy is hired, and costs money also. Making band posters for the practice room is possible once a Promotions Guy is hired, and costs money. Making band signs for the stage is possible once a Set Director is hired, and costs money. Spraypainting the band logo on the main menu screen of the game is available for a large amount of money. Downloading virtual stickers to be placed on instruments or clothing may also be available for some amount of money.

Still referring to FIG. 8A, an example screenshot that may allow a band to choose a set of songs to play at a venue is shown. In some embodiments, a game may allow a band to select from a predetermined number of sets of songs to play at a venue. In other embodiments, a band may choose any songs to play at a given venue. In some embodiments, a venue may limit the number, type, artist, or difficulty of the songs which may be played there. In other embodiments, a venue may allow a band to play any songs. In some embodiments, the set list chosen may affect the cost and/or reward for playing a given gig at a venue. In some embodiments, a set selection menu may allow a band to see results of past sets the band has played at a venue. In other embodiments, a band may only play a given set or song at a venue a limited number of times. This may be used to simulate a fan base in an area becoming tired of a given show.

In some embodiments, screens may also display a band status (e.g. "Garage Band"). In some embodiments a band status may reflect a band's current amount of fame. In other embodiments, a venue, event, or city selection screen may display the amount of money held by each player of the band, the name of the band, and the name of the geographic location the band is currently in. A band's selections and progress through a world tour may be saved on a server such that the information is retrievable by any of the band members, remote or local, at any time. In some embodiments, the band leader may be responsible for selecting the venue and gigs that a band plays. In other embodiments, a band may all have to accept a given gig and venue before it is played.

In FIG. 8A, a star indicator may indicate how many stars (out of five for each gig) the band has earned, both globally and in the currently selected city. The stars earned may provide access to more venues and cities. The indicator 0 fans may be an indicator of the band's current buzz level, the band's current fame level, or some combination of the two.

In some embodiments, a venue may have a prerequisite for playing. For example, an arena may require that a band hire roadies before the band may play in the arena. A game may provide any in-game mechanism for hiring virtual assistants. In some embodiments, a band may recruit employees after achieving a given amount of fame. In other embodiments, a band may hire employees after earning a set amount of money. In still other embodiments, employees may be awarded to a band after completion of certain tasks or songs.

In some embodiments, a city selection screen may be provided. A city selection screen may allow a band to choose a city to travel to and play venues in that city. In some embodiments, the cities available to a band may be determined based on one or more of a band's fame, money, or vehicles. For example, in some games, a band might be required to own a van before the band can play at cities outside the band's hometown. In other games, a band might be required to pay a given amount of money to buy plane tickets to a given city. In other embodiments bands may choose to visit any type of geographic or geopolitical region, including without limitation towns, suburbs, blocks, districts, counties, states, countries and continents.

Referring now to FIG. 8B, one embodiment of a network environment which may be useful for providing an online multiplayer game simulating a rock band experience is shown. The diagram is similar to FIG. 1C with the addition of a server 801 to store data related to bands and service requests for band, venue, and location data. In some embodiments, the server 801 may comprise a server farm. In other embodiments, the functionality of server 801 may be spread among a number of different servers, potentially operated by different service providers. For example, in an XBOX game, data relating to individual players and player leaderboards may be stored in servers maintained in conjunction with XBOX LIVE, while data relating to venues, bands, and locations may be stored in separate independent servers.

In some embodiments, a player may be able to download game content from a server 801. Examples of game content that may be downloaded may include new songs, new venues, new virtual instruments, new avatars, new avatar clothing, new avatar animations, and music videos. In some embodiments, downloadable game content may be made freely available. In other embodiments, downloadable game content must be purchased with earned in-game money or points. In still other embodiments, downloadable game content might be purchased using actual currency or currency equivalents such as XBOX LIVE points. In some embodiments, downloadable content may be for use in a single player game. In other embodiments, downloadable content may be for use in a multiplayer game. In some embodiments, all members of a band must purchase the downloadable content for it to be used by the band. In other embodiments, only one member of a band must purchase the content for the content to be usable by the band. In some embodiments, downloadable content may be purchased by a band as a whole.

In some embodiments, downloadable content may be offered in packs arranged by themes. For example, a downloadable pack may feature a number of songs, music videos, and avatar designs based on a real life band. Or for example, a downloadable pack may feature a number of songs, venues, and avatar designs centered around a given style of music.

Although a world tour mode has been shown, it should be understood that any other gameplay mode may be offered in the context of a rock band game. In some embodiments, a "quickplay" mode may be selected which allows a player or band to quickly select and play a single song. In other embodiments, a practice mode may be provided which allows a player or band to rehearse a song. In some embodiments, the practice mode may allow players to slow down or speed up a song, or only rehearse a given section or lick of a song. All of these modes may be offered in the context of both remote and local play.

Referring now to FIG. 9, an embodiment of a method for allowing players to purchase real-world merchandise based on in-game characters and/or bands is shown. In brief overview, the method comprises allowing a player or players to create a character and/or band (step 901), and then storing data corresponding to the created character and/or band (step 903). The method may then include receiving an order for a piece of merchandise corresponding to the band and/or character (step 905), and producing, using the saved data, the merchandise (907). FIG. 9 also illustrates some examples of merchandise featuring bands or characters including a poster, t-shirt, and figure.

Still referring to FIG. 9, now in greater detail, a player may create a character or band in any manner (step 901). In some embodiments, a player may create a character using a character creation screen which allows the player to customize a number of player attributes such as appearance, clothes, gear, gestures, demeanor, or any other character attributes. In other embodiments, a player may create a character over the course of a game by accumulating gear and altering the character's appearance as the game progresses. In some embodiments a character may be created from a template or default character model. In some embodiments a band may be created using a band creation screen, which allows a player to customize any of the band attributes described herein. In some embodiments, a band may comprise a number of created characters.

Information corresponding to the created character or band may then be stored in any manner (step 903). In some embodiments, the information may be stored on a server 801. In other embodiments, the information may be stored on a player's game system. In other embodiments, the information may be stored on a combination of the player's game system and the server 801. The information may be stored in any format, and may persist for any amount of time.

An order may then be received for a piece of merchandise corresponding to the created character or band (step 905). The order may be received in any manner. In some embodiments, the order may be received from a web site operated in conjunction with a game. In other embodiments, the order may be received from an in-game store. In some embodiments, the order may be received bye-mail or other electronic messaging protocol. In some embodiments, the order may be transmitted via the internet. In other embodiments, the order may be transmitted over a network operated in conjunction with a game system.

In some embodiments, the merchandise may be sold for money. In other embodiments the merchandise may be given away, or sold for in-game currency. In still other embodiments, the merchandise may be ordered after completing certain in-game tasks. In still other embodiments, a character or band must acquire certain items, experience, or fame before merchandise may be ordered featuring the band or character.

The merchandise ordered may comprise any articles typically sold as merchandise, including any merchandise typically associated with real world bands. Examples of merchandise that may be sold include, without limitation, key rings, sunglasses, watches, patches, posters, hats, visors, t-shirts, long-sleeve t-shirts, sweatshirts, polo shirts, golf shirts, belts, belt buckles, mugs, coffee cups, letter openers, paperweights, action figures, statues, figurines, jackets, scarves, gloves, stickers, purses, bags, totes, jewelry, toys, and/or guitar picks.

The merchandise may correspond to the character or band in any manner. In some cases, the merchandise may be imprinted with the name of the band or character. In other embodiments, the merchandise may be printed with a picture of the band or character. In still other embodiments, the merchandise may be printed with a logo of a band or character. In some embodiments, the person ordering the merchandise may customize the way the band or character appears on the merchandise. For example, the person may select a given pose for their character's avatar to appear on a t-shirt. Or for example, the person may select a given venue for their band to appear on a poster of the band. Or for example, the person may select the size, location, color, and/or style of the logo, text, or image printed on the merchandise. In other cases, the person may be able to select the color, size, or style of the underlying merchandise, such as the color or size of the t-shirt on which their band appears.

In some embodiments, the merchandise may also indicate accomplishments, fame, ratings, or skill of the character or band. For example, a poster may be offered with a picture of a character and caption reading "5 star performance on all songs." Or for example, a t-shirt may be offered with a picture of a band and a listing on the back of the shirt of a number of gigs the band played along with the ratings the band received. Or for example, a figurine of a character may be ordered with a plaque stating that the character played to a sold-out arena. In some embodiments, any or all of the order processing steps may be automated. For example, an e-commerce web site may be created for accepting merchandise orders. Upon a person logging into the site, the person may be asked to specify a band or character they would like to order merchandise for. After the person specifies this (and enters a password if necessary), the e-commerce server may access the stored character or band data to create one or more images and/or text descriptions of merchandise that may be ordered featuring the band or character. The e-commerce site may then comprise any means for the person to specify and customize their order before purchasing it.

The ordered merchandise may then be produced in any manner (step 907). In some embodiments, some or all of the production and shipping of the merchandise may be automated. For example, after an order is placed, an e-commerce server may transmit details of the order to a poster printer, including the image to be printed and the shipping address. The poster printer may then print the poster and mail it to the designated address. Or for example, an e-commerce server may transmit specifications of a figure ordered to a 3D printer which may produce a 3D sculpture of a specified character in an automated fashion. The ordered merchandise may be delivered to the consumer in any manner, including electronically, by mail, by fax, and by hand delivery.

Now referring to FIG. 10, examples of how a game may produce a different gaming experience in response to different hardware are shown. A game may comprise content for a number of different simulated instruments, including any of the simulated instruments discussed herein. In some embodiments, a game may alter the content and gameplay provided to a user in response to the simulated instrument the user connects to a game system playing the game.

For example, in the first column of FIG. 10, a player has connected a guitar to a game system. The game system detects the guitar and provides the gameplay experience of playing guitar, which may include any of the guitar gameplay features described herein. In addition the player's avatar is automatically determined to be a guitar player. In other cases, a game system may detect a drum set, microphone, or other instrument is connected to the system and provide the gameplay interface for a drummer, singer, or other instrumentalist as appropriate. The gameplay may be changed in any manner to accommodate different hardware, including altering the interface, graphics, audio, song selection, and scoring system. In some embodiments, one or more unique character creation screens or characters may be provided for a number of simulated instruments. In these embodiments, the characters available to a player who is a drummer may be different than the characters available to a player who is a vocalist.

In the second column of FIG. 10, a game is shown displaying a quest or tour which is specific to the hardware connected to the game. The player has connected a drum set to the game system, and accordingly the player is given the option of playing a single player tour as a drummer, and as a drummer character the player has created: "DrumDude." The drummer tour may contain unique content specific to drummers, including unique songs, set lists, venues, gear rewards, scoring systems, fame calculations, buzz calculations, quest length, and tour locations. For example, a drum tour may include songs specifically chosen due to interesting or challenging drum parts. Or for example, a drummer may be rewarded with drum gear, such as new drumsticks, drumheads, or new percussion instruments as a result of performing well in a show. In other cases, a game system may detect a guitar, microphone, or other simulated instrument and provide unique tour content customized to the appropriate simulated instrument.

In some embodiments a single game may contain entire unique and separate single-player modes and quests for each of a number of simulated instruments which may be used with the game. For example, a game may be sold which contains a separate guitar, bass, drum, and singing campaign, with the campaign that is presented to a player depending on the hardware the player has connected to the system.

In the third column of FIG. 10, a game is shown displaying a multiplayer band formation screen displayed in response to specific hardware connected. A player has connected a microphone to the system, and as a result the game displays a multiplayer interface in which the local player is assigned as the singer and may search for other simulated instrumentalists as bandmates. In this embodiment, a game may alter a multiplayer experience depending on the simulated instrument a player has connected to a game system.

Figure 11:
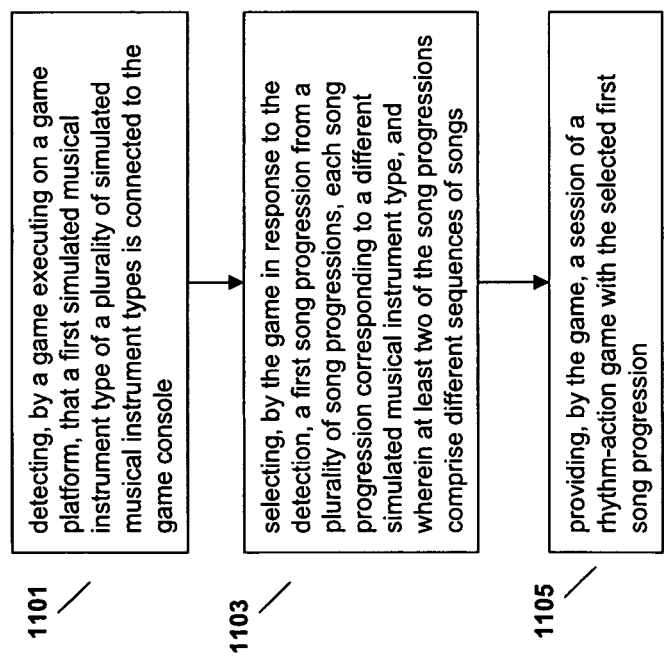
FIG. 11 is a flow diagram of one embodiment of a method for altering game content responsive to detecting a type of controller used by a player of a rhythm action game.

Referring now to FIG. 11, a flow diagram illustrating one embodiment of a method for altering game content responsive to detecting a type of controller used by a player of a rhythm action game is shown. In brief overview, the method includes: detecting, by a game executing on game platform, that a first simulated musical instrument type of a plurality of simulated musical instrument types is connected to the game platform (step 1101); selecting, by the game in response to the detection, a first song progression from a plurality of song progressions, each song progression corresponding to a different simulated musical instrument type, and wherein at least two of the song progressions comprise different sequences of songs (step 1103); and providing, by the game, a session of a rhythm-action game with the selected first song progression (step 1105).

Still referring to FIG. 11, now in greater detail, a game executing on a game platform may detect a first simulated musical instrument type of a plurality of simulated musical instrument types is connected to the platform in any manner (step 1101). In some embodiments, the game may detect a unique serial number, device ID, control sequence, or other transmission sent from a device connected to the game platform. For example, a game may be released to be used with both guitars and drums. The game may receive a device ID (which may comprise any signal or sequence of bits used to identify a device) from a device connected to the platform, and check a list of known device IDs to determine whether the device is a simulated guitar controller or a simulated drum controller. Or for example, the device may transmit a unique string which identifies the devices as either a drum or guitar controller. The connection to the game platform may comprise any type of connection, including wired and wireless connections.

In some embodiments, the game may detect a musical instrument type and a corresponding game controller. For example, a game may detect a microphone is connected to the platform, as well as a standard game controller. The standard game controller may be used by the player using the microphone to navigate menus and other game functions.

A game may then select, in response to the detection, a first song progression from a plurality of song progressions, each song progression corresponding to a different simulated musical instrument type, and wherein at least two of the song progressions comprise different sequences of songs (step 1103). A song progression may comprise any sequence of songs presented to a player of the game during the course of play.

For example, a song progression may comprise a linear sequence of songs, in which a player must successfully complete each song to advance to the next song. Or for example, a song progression may comprise a series of groups of songs, in which a player must complete a certain number of songs from a group before the player may advance to the next group.

Or for example, a song progression may comprise a matching of a number of songs with a plurality of difficulty levels. In this example, songs may be assigned different difficulties depending on which instrument is used to play the song.

For example, a song may have a very difficult drum part, but a relatively easy vocal part. Thus the song may be placed higher in a song progression provided to a player using a drum controller than to a player using a microphone controller.

For example, the table below illustrates three song progressions which may be provided depending on whether a guitar, drum, or microphone controller is connected to the game platform.

| Drum   | Microphone | Guitar |
|--------|------------|--------|
| Song A | Song B     | Song A |
| Song B | Song C     | Song C |
| Song C | Song E     | Song B |
| Song D | Song A     | Song F |
| Song E | Song D     | Song E |

Although in the above example, the three song progressions have the same number of songs, in some embodiments, different song progressions may comprise different numbers of songs. For example, more songs may be available to be played on drums than on guitar.

Figure 12A:
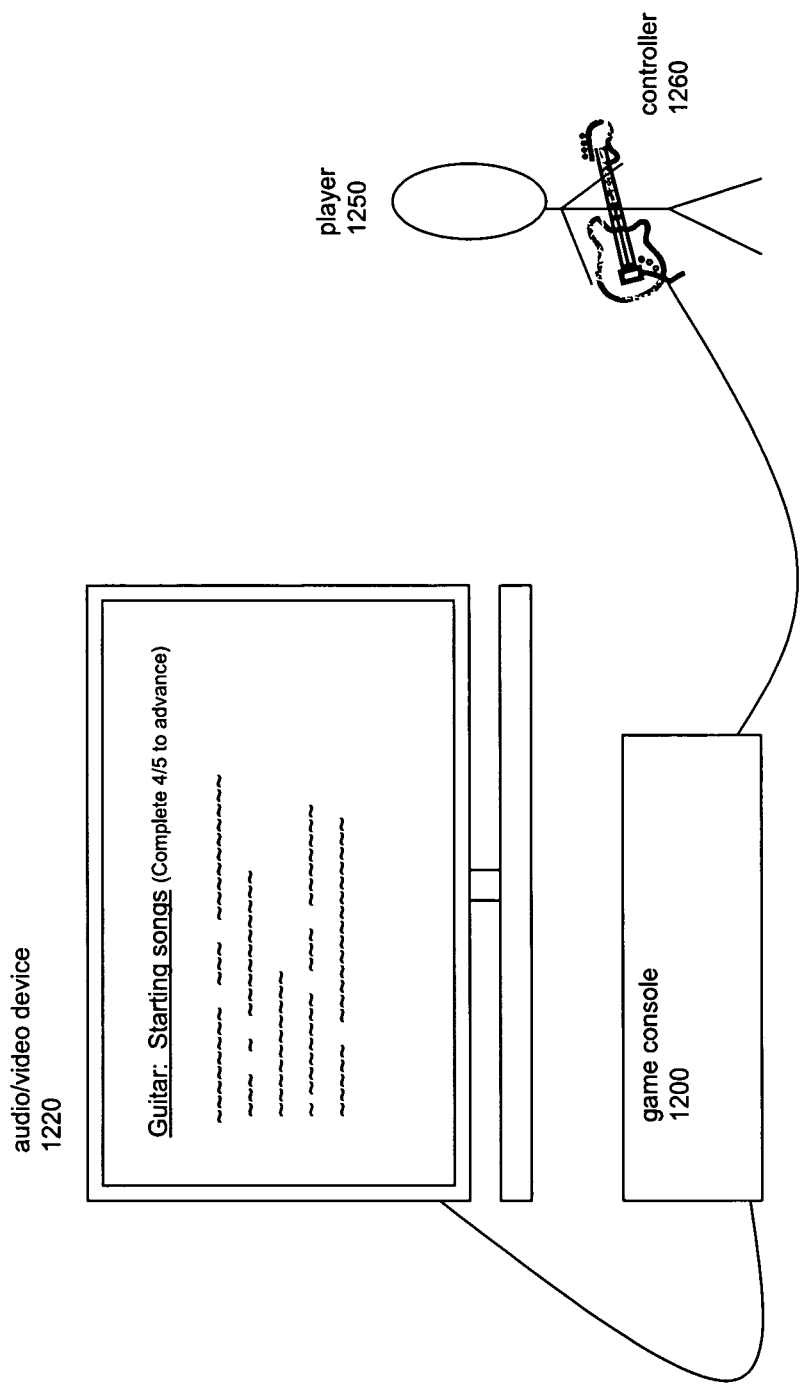
FIGS. 12A and 12B illustrate one embodiment of a game which alters a song progression depending on a type of controller attached.
Figure 12B:
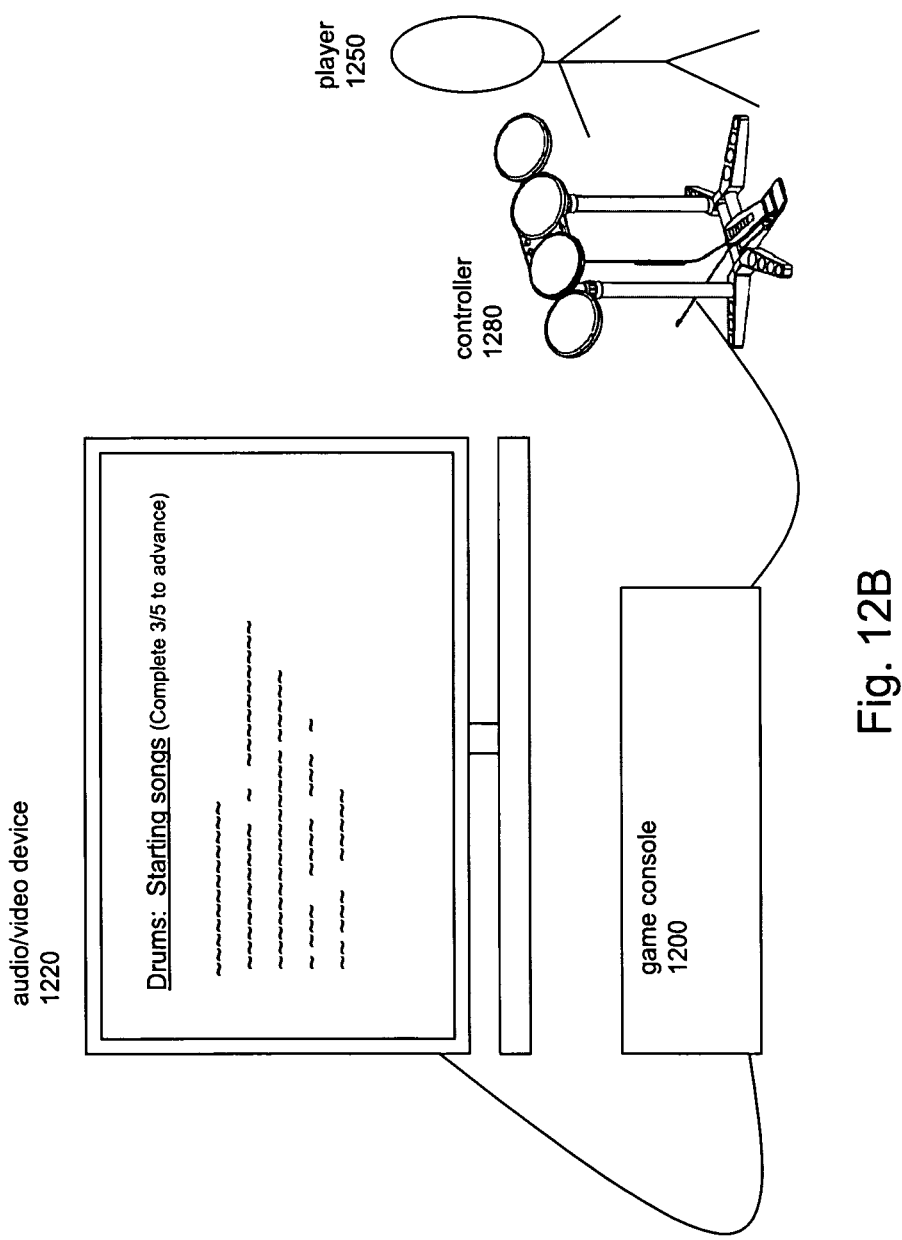

FIGS. 12A and 12B illustrate a player 1250 using a game console. Depending on whether the player has connected a guitar controller 1260 or a drum controller 1280, a different song progression is displayed to the player. In the example shown, the sequence of songs is different, and also a different number of songs are required for completion of the difficulty level.

Figure 13A:
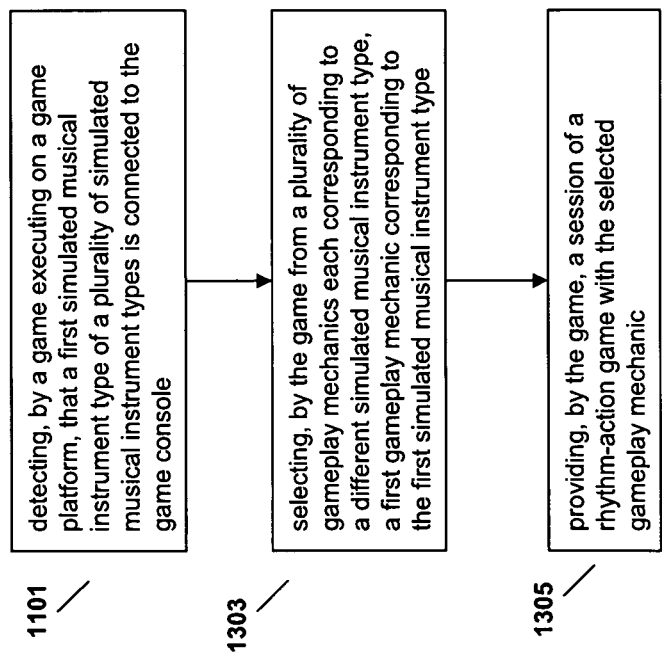
FIG. 13A illustrates a flow diagram of a method for altering gameplay mechanic responsive to detecting a type of controller used by a player of a rhythm action game.

Referring now to FIG. 13A a flow diagram of a method for altering gameplay mechanic responsive to detecting a type of controller used by a player of a rhythm action game is shown. In brief overview, the method includes detecting, by a game executing on a game platform, that a first simulated musical instrument type of a plurality of simulated musical instrument types is connected to the game platform (step 1101); selecting, by the game from a plurality of gameplay mechanics each corresponding to a different simulated musical instrument type, a first gameplay mechanic corresponding to the first simulated musical instrument type (step 1303); and providing, by the game, a session of a rhythm-action game with the selected gameplay mechanic (step 1305).

Still referring to FIG. 13A, now in greater detail, after detecting a type of controller connected to the game platform (step 1101) a game may select a gameplay mechanic based on the detected controller type. A gameplay mechanic comprises any method for specifying input to e received from a player and evaluating the player's response. In a rhythm-action game, a gameplay mechanic may comprise any method for displaying musical cues to a player and evaluating a player's response. Although the method shown in FIG. 13A may be applied to any gameplay mechanics, three specific mechanics will be discussed to provide detailed examples.

The first gameplay mechanic, which may be referred to as the "guitar mechanic," comprises displaying a series of cues to a player, which may correspond to a guitar track of a song. In this mechanic, the player executes the cue by activating the "strum bar" while pressing the correct fret button of the controller when a cue passes under the target marker. The player may also execute certain cues by performing a "hammer on" or "pull off," which requires quick depression or release of a fret button without activation of the strum bar. The player is judged based on how closely the activations of the strum bars and fret buttons match the provided cues. A guitar mechanic may be selected by a game if the game detects a guitar controller connected to the platform.

The second gameplay mechanic, which may be referred to as the "drum mechanic," comprises displaying a series of cues to a player, which may correspond to a drum track of a song. The player executes the cues by striking an appropriate drum pad, or depressing a foot pedal, based on the displayed cues. The player is then evaluated based on how closely the player's activations of the drum pads and/or foot pedal match the provided cues. A drum mechanic may be selected by a game if the game detects a drum controller connected to the platform.

The third gameplay mechanic, which may be referred to as the "vocal mechanic," comprises displaying a series of cues to a player, which may correspond to a vocal track of a song. The player executes the cues by singing the pitches and/or words indicated by the cues. The player is then evaluated based on how closely the player's pitches and words match the provided cues. A vocal mechanic may be selected by a game if the game detects a microphone connected to the platform.

Though three specific mechanics have been described, any other gameplay mechanics may be used. In some embodiments, the other gameplay mechanics may correspond to different musical instrument types. For example, a "keyboard mechanic" may be employed in which a player is evaluated based on their activation of keys and foot pedals on a simulated musical keyboard.

The selection of the gameplay mechanic occurs without requiring user input. That is, a user who has connected a guitar controller is not required to select "guitar" from a menu to be provided with the guitar gameplay mechanic (however, a user may select a part to play, such as whether to play a guitar part or a bass part of a song, both of which utilize the guitar mechanic). Likewise, a user connecting a simulated drum controller is not required to specify that they wish to play according to the drum mechanic.

In some embodiments, a game may select a gameplay mechanic for each of a plurality of local and/or remote players. For example, a multiplayer rhythm action game may allow for guitar, drums, and vocals to be simultaneously performed by three players. The game may detect a controller type corresponding to each player, and assign each player the appropriate gameplay mechanic.

After selecting a gameplay mechanic, the game may provide a session of a rhythm-action game with the selected gameplay mechanic (step 1305). In addition to the gameplay mechanic, a session may comprise any game elements known to rhythm-action games, including without limitation song performance, avatar display, crowd and venue animations, menu navigation, character creation, song selection, gig selection, and career and tour modes. Any or all of these game elements may be determined based on the detected controller type. For example, if a drum controller is detected, a player's avatar may be displayed as a drummer, and career events may be tailored to reflect events that might happen to a drummer.

Figure 13B:
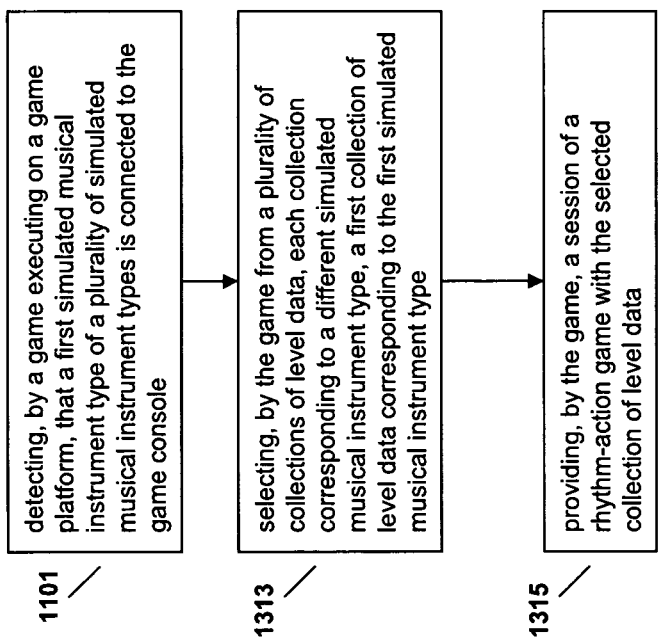
FIG. 13B illustrates a flow diagram of a method for altering level data responsive to detecting a type of controller used by a player of a rhythm action game.
Figure 13C:
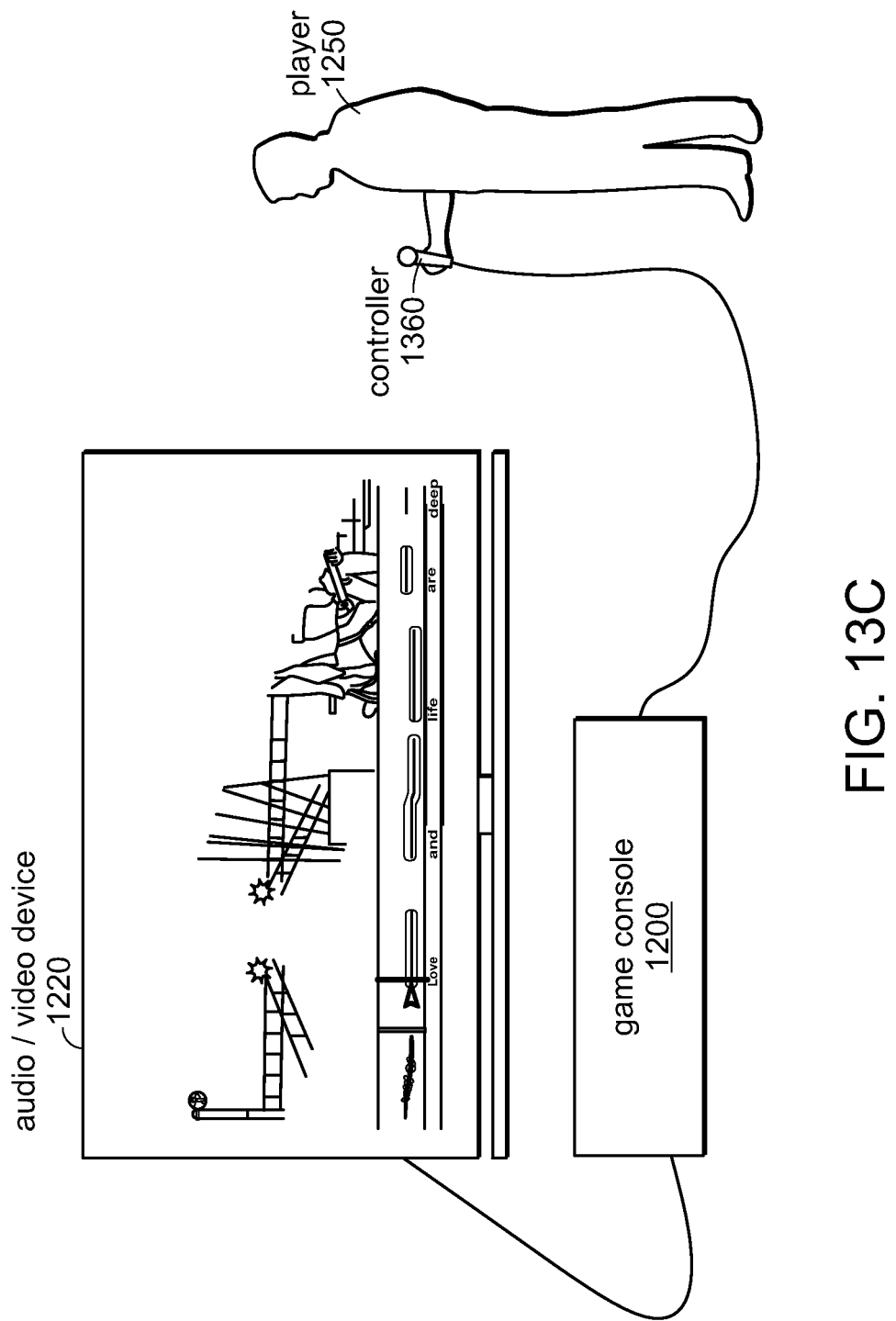
FIGS. 13C and 13D illustrate one embodiment of a game which alters level data and/or a gameplay mechanic depending on a type of controller attached.
Figure 13D:
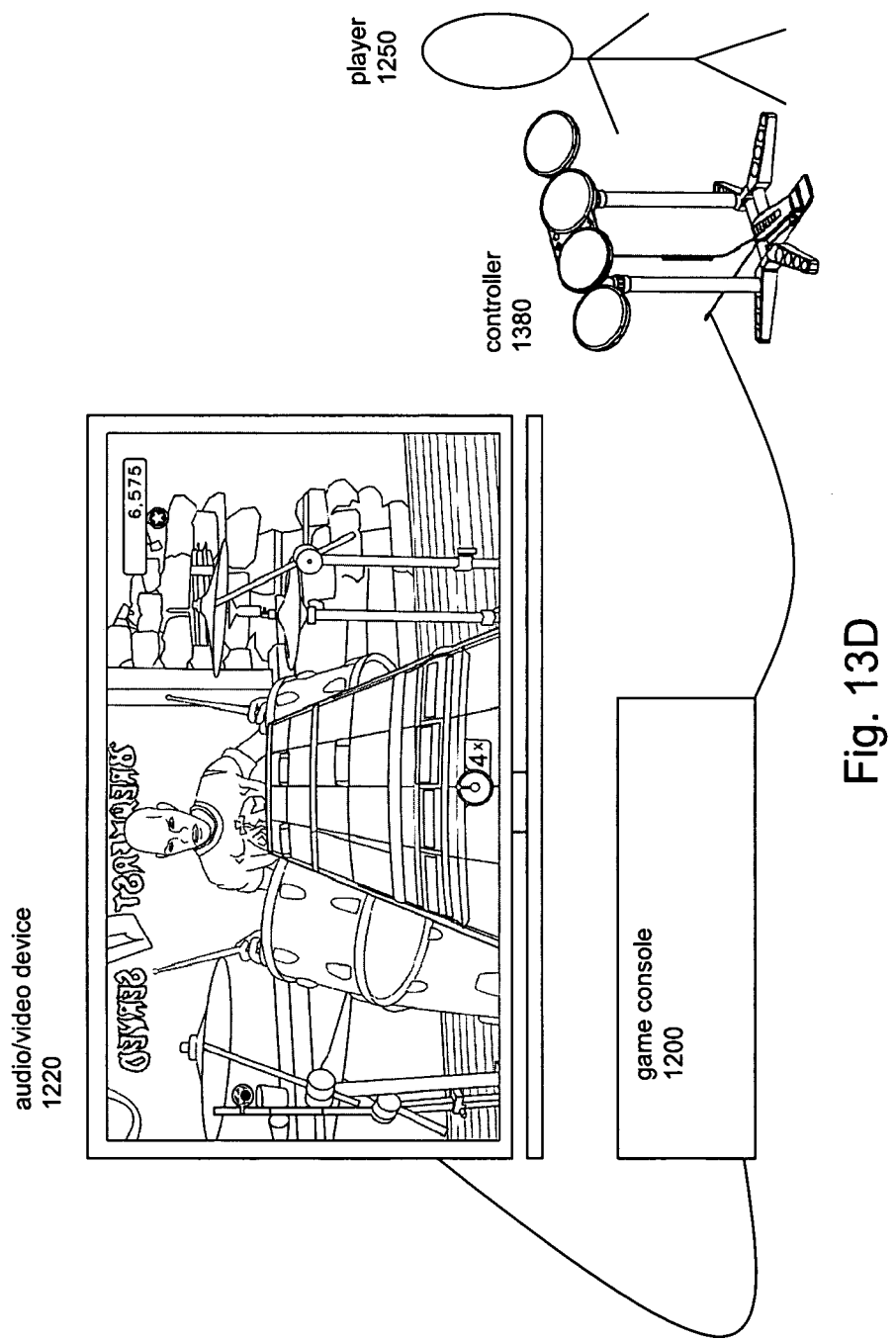

Referring ahead to FIG. 13C, a player 1250 has connected a microphone 1360 to a game platform 1200. The game responds by selecting the vocal mechanic and providing a session of a rhythm action game on the audio/video device 1220 using the vocal mechanic. In FIG. 13D, the same player 1250 has connected a drum controller 1380 to the platform, and the game responds by providing a session of the game featuring the drum mechanic. As shown in these figures, elements of the game's display and/or sound, such as the player's avatar, the relative volume of tracks in a song (such as by making the track of the instrument corresponding to the controller type louder), and the camera angles selected (such as by selecting camera angles focusing on the instrument corresponding to the controller type) may be changed based on the controller type.

Referring now to FIG. 13B, a flow diagram of a method for altering level data responsive to detecting a type of controller used by a player of a rhythm action game is shown. In brief overview, the method comprises: detecting, by a game executing on a game platform, that a first simulated musical instrument type of a plurality of simulated musical instrument types is connected to the game platform (step 1101); selecting, by the game from a plurality of collections of level data, each collection corresponding to a different simulated musical instrument type, a first collection of level data corresponding to the first simulated musical instrument type (step 1313); and providing, by the game, a session of a rhythm-action game with the selected collection of level data (step 1315).

Still referring to FIG. 13B, now in greater detail, after detecting the controller type (step 1101) a game may select a collection of level data corresponding to the controller type (step 1313). As used herein "level data" refers to the series of cues displayed to a player for a given song. Thus, for a given song, the level data may comprise a plurality of cues, each cue specifying a time and an action to be performed. A collection of level data may comprise any set of level data. For example, a collection of level data might comprise level data for each of 15 songs. Or for example, a collection of level data might comprise level data for each of 15 songs, each at four different difficulty levels (that is, each difficulty level of a song may have a unique set of cues).

A collection of level data may correspond to a type of simulated musical instrument if the collection of level data is related to musical events of the instrument type. That is, a vocal collection of level data may comprise a collection of level data corresponding to vocal events (e.g. pitches and/or words sung) for each of the songs in the collection. Likewise a drum collection of level data may comprise a collection of level data corresponding to drum events (e.g. drums struck) for each of the songs in the collection. The level data may correspond to a type of simulated musical instrument by specifying actions that can be performed by the controller type. For example, level data might specify a particular pitch, which may be performed by singing into a microphone. Or for example, level data might specify a particular fret button and strum combination, which can be performed using a simulated guitar. Or for example, level data might specify a particular drum pad or foot pedal to activate on a simulated drum controller.

After selecting a collection of level data, the game may provide a session of a rhythm-action game with the selected collection of level data. Referring to FIG. 13C, the game on the game platform 1200 is providing vocal level data (lyrics and relative pitches) to the player 1250 responsive to detecting a microphone 1360 connected to the platform. Likewise, in FIG. 13D, the game on the game platform 1200 is providing drum level data (cues indicating drum pedal and foot pad activations) to the player 1250 responsive to detecting a simulated drum controller connected to the platform.

Figure 14:
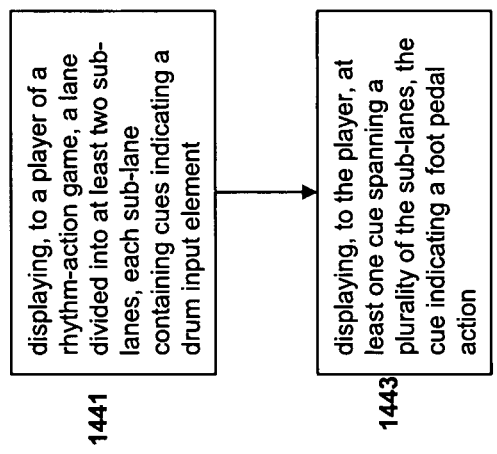
FIG. 14 is an illustration of one embodiment of a simulated drum set for use with a video game.

Referring now to FIG. 14, a flow diagram of one embodiment of a method for displaying a foot-pedal cue in a rhythm-action game is shown. In brief overview, the method includes: displaying, to a player of a rhythm-action game, a lane divided into at least two sub-lanes, each sub-lane containing cues indicating a drum input element (step 1441); and displaying, to the player, an additional cue spanning a plurality of the sub-lanes, the additional cue indicating a foot pedal action (step 1443). In some embodiments, the additional cue may span all the sub-lanes. In some embodiments, the additional cue may be a different color than other cues.

Still referring to FIG. 14, a lane divided into at least two sub-lanes, each sub-lane containing cues indicating a drum input element, may be displayed to a player in any manner (step 1441). In some embodiments, a lane may be divided into two sub-lanes. In other embodiments, a lane may be divided into any number of sub-lanes including without limitation, two, three, four, five, six, seven, eight, nine, or ten sub-lanes. A sub-lane may comprise any division of a lane containing cues corresponding to a single input element, and may comprise any shape or orientation.

In some embodiments, lines or other demarcations may be displayed in between sub-lanes. For example, referring back to FIG. 1A, a line is used to indicate a separation between sub-lane 171 and sub-lane 172. In other embodiments, no such line or demarcation may be displayed. For example, referring ahead to FIG. 15A, the lane shown is divided into four sub-lanes, 1551, 1552, 1553, 1554 which are not separated by lines or other indicators.

Figure 15A:
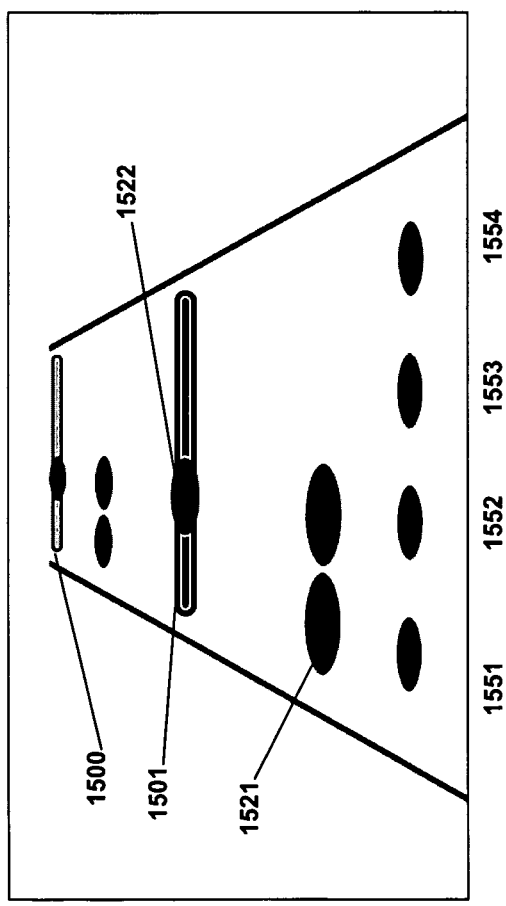
FIG. 15A is a flow diagram of a method for displaying a foot-pedal cue in a rhythm-action game.

In some embodiments, each sub-lane may contain cues corresponding to a different drum pad. For example, a lane may be divided into four sub-lanes, each sub-lane corresponding to one of four drum pads. Referring ahead to FIG. 15A, an example diagram of such a lane is shown. The lane is divided into four sub-lanes, 1551, 1552, 1553, 1554. Each lane may correspond to a drum pad in a linear arrangement. For example, using the drum set 500 from FIG. 5A, sub-lane 1551 may correspond to drum pad 502a, sub-lane 1552 may correspond to drum pad 502b, sub-lane 1553 may correspond to drum pad 502c, and sub-lane 1554 may correspond to drum pad 502d. As used herein a "linear" arrangement of drum pads or other input elements does not necessarily indicate input elements arranged in a straight line, but rather any arrangement of input elements which have a clear left-to-right sequence or top-to-bottom sequence. For example, the drum set 500 may be configured such that the pads 502a, 502b, 502c, 502d are arranged in a curve where pads 502a and 502d are moved closer to the player. In this case the pads still comprise a linear arrangement for purposes of this description, as they still have a clear left-to-right sequence.

In some embodiments, cues in each sub-lane may always correspond to a given percussion sound during a song. For example, cues in sub-lane 1550a may correspond to a snare drum, while cues in sub-lane 1550b, 1550c may correspond to tom-tom sounds while cues in sub-lane 1550d may correspond to crash cymbal sounds. In other embodiments, cues in a single sub-lane may correspond to different percussion sounds over the course of a song. For example, during the course of a song, gems in sub-lane 1550d may first correspond to cowbell sounds, and then correspond to a crash cymbal sound. In some embodiments, the display of cues within a sub-lane may be changed to indicate to a user that the cues represent a different percussion sound.

Figure 15B:
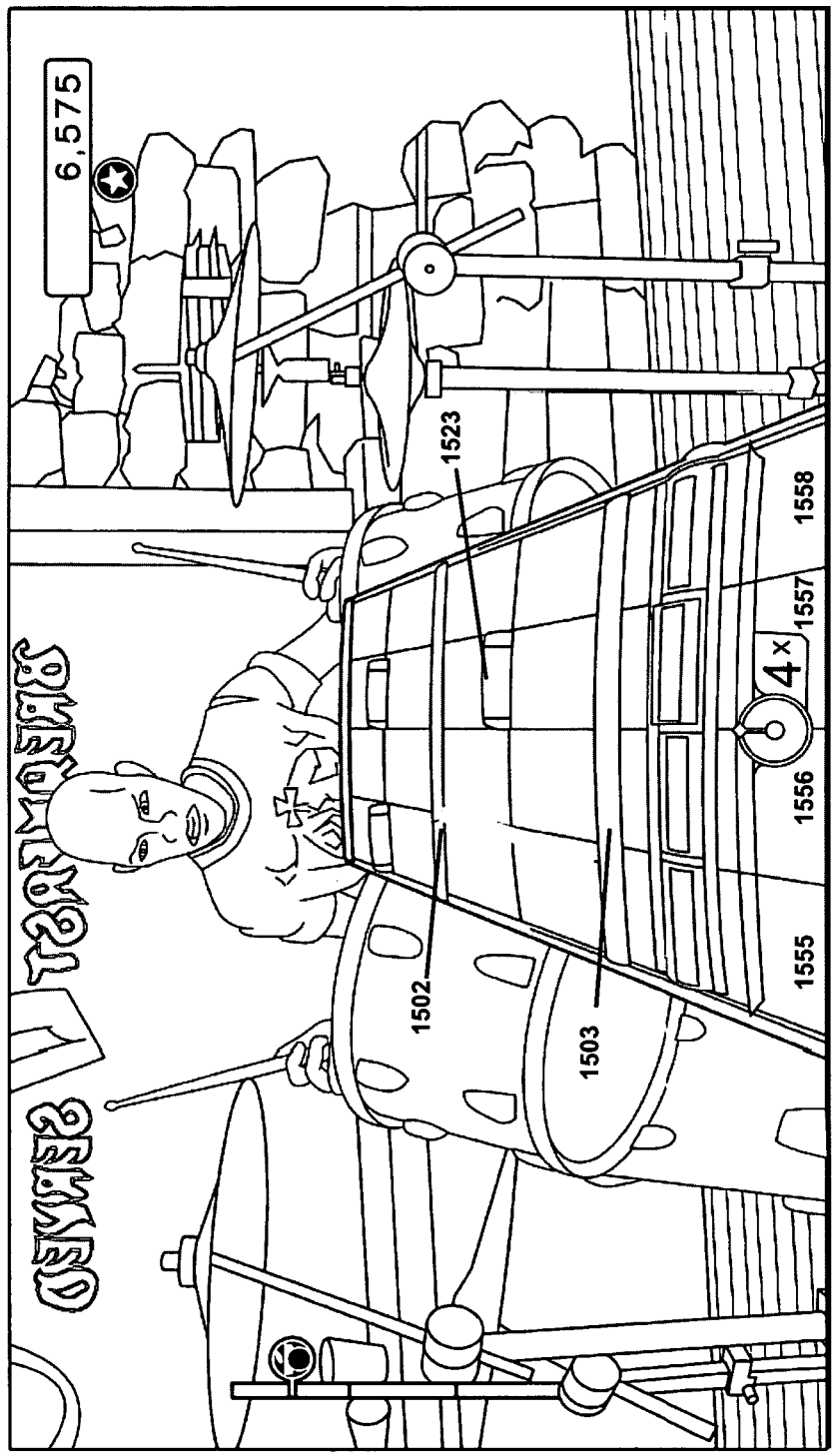
FIG. 15B is an illustration of one embodiment of displaying cues spanning a plurality of sub-lanes.

Referring back to FIG. 14, a cue spanning a plurality of the sub-lanes may be displayed in any manner (step 1443). In some embodiments, the cue may indicate a foot-pedal action. In some embodiments, the cue may span all the sub lanes, such as the cues 1500 and 1501 in FIG. 15A, the cues 1502, 1503 in FIG. 15B, or the cue 1504 in FIG. 15C. The cue spanning a plurality of the sub-lanes may be displayed in any shape, size or color.

A cue may span a plurality of sub-lanes by occupying a portion of visual space corresponding to each of the plurality of sub-lanes. In some embodiments, a cue may span a plurality of sub-lanes by being displayed as covering some or all of each of the plurality of sub-lanes. For example, the cue 1503 in FIG. 15B covers a portion of each of the sub lanes 1555, 1556, 1557, and 1558. Or for example, the cue in 1500 in FIG. 15A covers a portion of each of the sub lanes 1551, 1552, 1553, and 1554. This is true even though a portion of the cue 1501 in sub-lane 1552 is in turn overlaid by a cue 1522 which corresponds to sub-lane 1552. In other embodiments, a cue may span a plurality of sub-lanes by being displayed in space above or below each of the plurality of sub-lanes. For example, a cue may be displayed that appears to "hover" over the plurality of sub-lanes. Or for example, a cue may be displayed that appears to be attached to the bottom or hovering beneath each of the plurality of the plurality of sub-lanes.

Figure 15C:
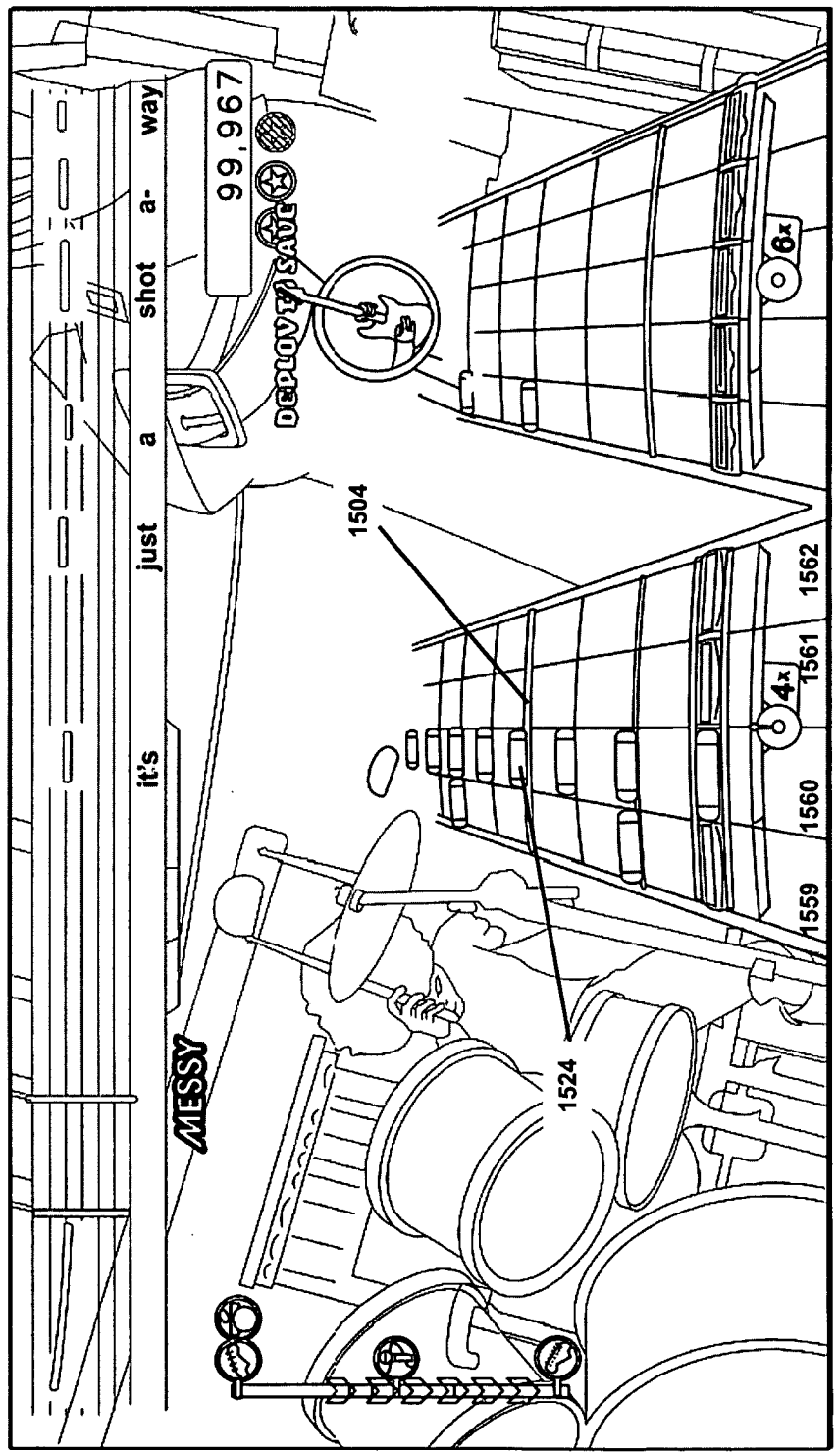
FIG. 15C is an example screenshot of an embodiment of displaying cues spanning a plurality of sub-lanes.

In some embodiments, a cue spanning a plurality of sub-lanes may have one or more cues corresponding to an individual sub-lane overlaid on the cue. For example, the cue 1500 in FIG. 15A is displayed such that it appears to be "under" the cue 1522. Likewise, the cue 1524 in FIG. 15C is overlaid over the cue 1504. This may be done to indicate a foot-pedal action simultaneous with one or more drum pad strikes or other actions. In other embodiments, a cue spanning a plurality of sub-lanes may be displayed such that it appears "over" any cues corresponding to the individual sub-lanes.

In some embodiments, a cue spanning a plurality of sub-lanes may comprise a different color than any of the cues corresponding to individual sub-lanes.

Figure 16B:
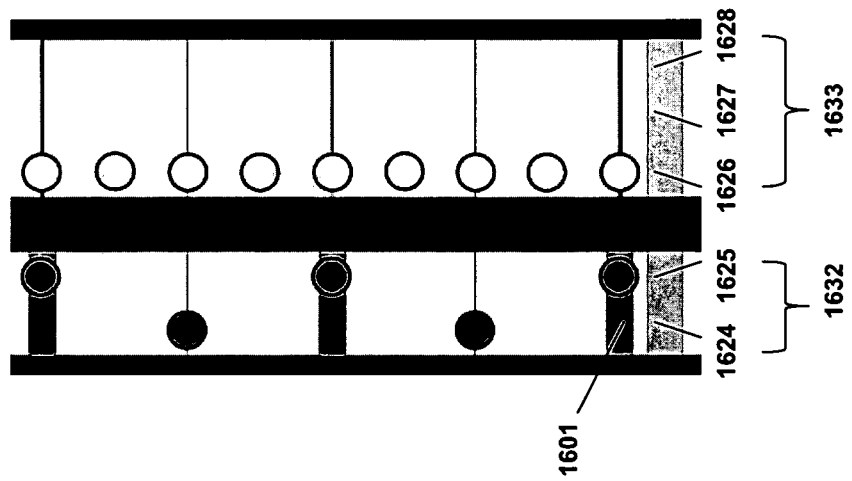
FIGS. 16A and 16B are example diagrams of alternative embodiments of displaying cues spanning a plurality of sub-lanes.
Figure 16A:
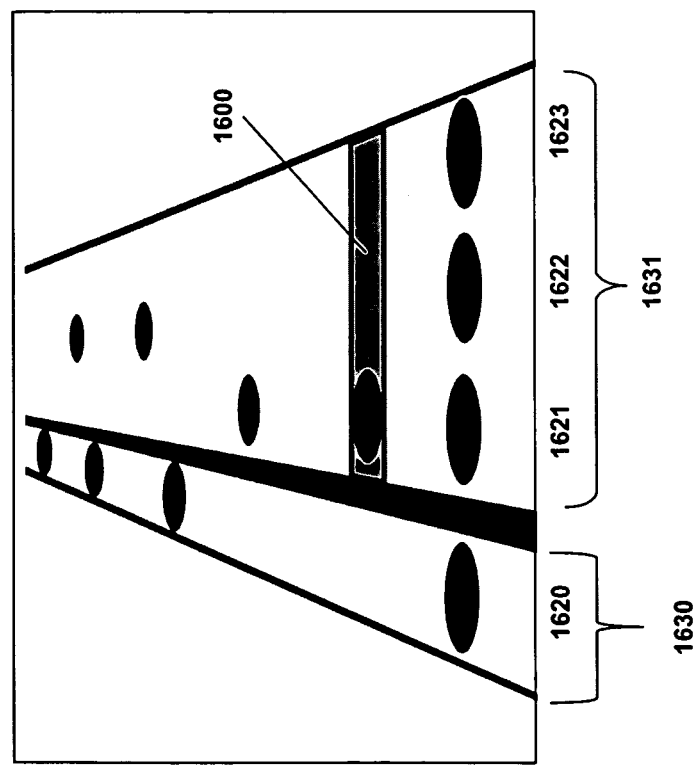

Referring now to FIGS. 16A and 16B, additional examples of a display of a cue spanning multiple sub-lanes are shown. In FIG. 16A, a lane is divided into four sub-lanes 1620, 1621, 1622, 1623. A cue 1600 spans the three sub lanes 1621, 1622, and 1623. In the illustration shown, the sub-lanes 1621 and 1620 are separated by a larger divider than the other sub-lanes, forming two divisions 1630, 1631. This may be done to indicate that the sub-lanes on one side of the divider correspond to a certain set of drum pads, while the sub-lanes on the other side of the divider correspond to a different set of drum pads. In FIG. 16B, a lane is divided into five sub-lanes 1624, 1625, 1626, 1627, 1628. The lane is also divided into two divisions 1632, 1633. The cue 1601 spans both sub-lanes 1624 and 1625 and may be used to indicate a foot pedal action.

In some embodiments, multiple foot pedals may be used, and different types of cues spanning multiple sub-lanes may be used to indicate which pedal a user should strike. For example, a drum set may comprise an orange color-coded pedal and a purple color-coded pedal. An orange cue spanning all the sub-lanes may be used to indicate the user should step on the orange pedal, and a purple cue spanning all the sub lanes may be used to indicate the user should step on the purple pedal. Or, for example, a drum set may comprise a left foot-pedal and a right foot-pedal. A cue spanning a plurality of sub-lanes on the right side of a lane may indicate the right foot pedal, while a cue spanning a plurality of sub-lanes on the left side of a lane may indicate the left foot pedal. In this case, a display similar to FIG. 16B might be used, where a cue 1601 spanning the entire division 1632 would indicate a left foot pedal action, and a cue spanning the entire division 1633 would indicate a right foot pedal action.

Although cues spanning multiple sub-lanes have been described above in the context of indicating foot-pedal actions, they may be useful in for indicating any other type of input event. In some embodiments, cues spanning multiple sub-lanes may be used in any case where a series of X input elements corresponds to a series of X sub-lanes, and there is a need to indicate an additional input action not in the series. The use of a cue spanning multiple lanes can serve as a clear indication to the player that the additional input action is different in character and/or location than the input elements in the series.

Figure 17:
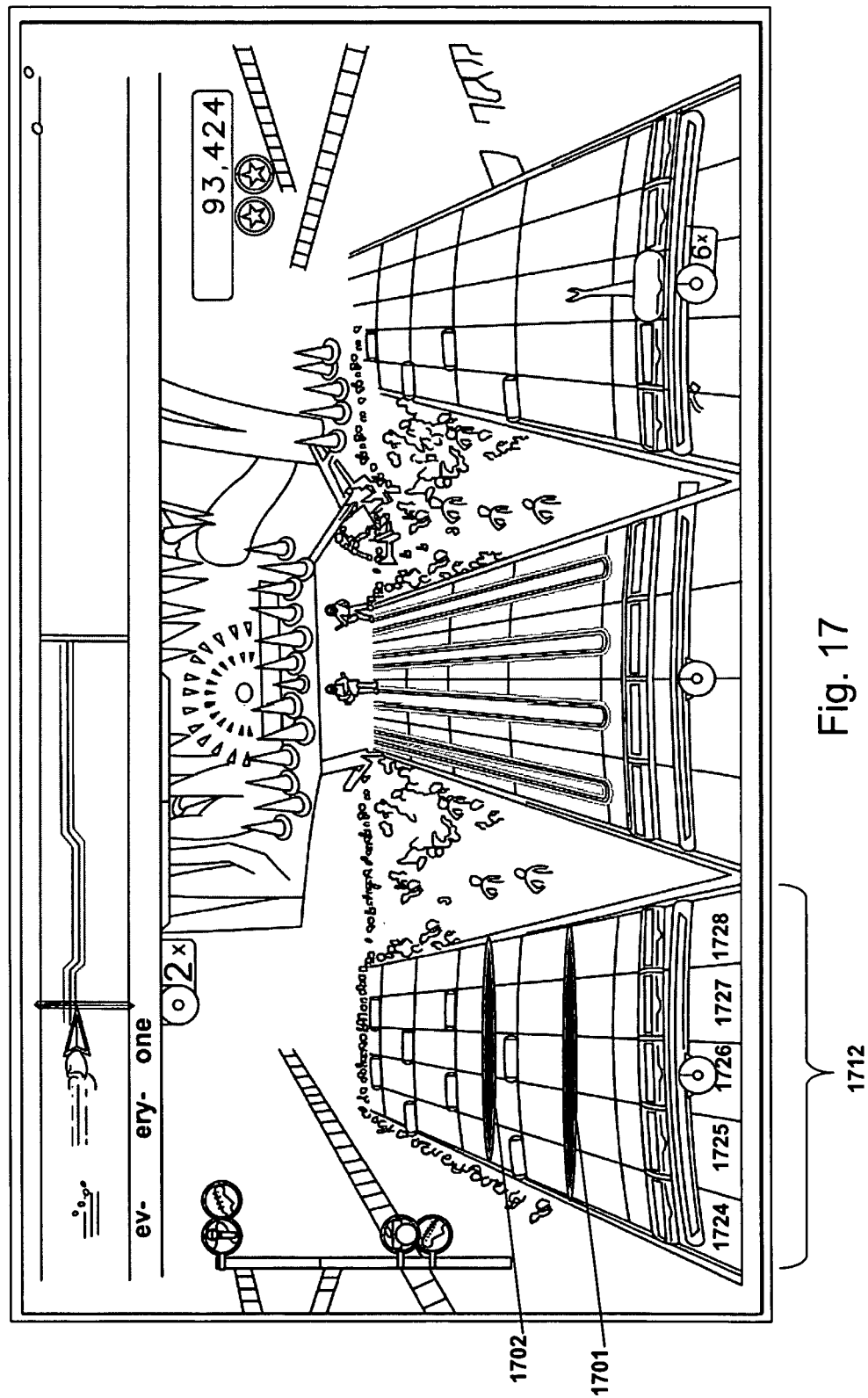
FIG. 17 is an example screenshot of a lane divided into 5 sub-lanes, each corresponding to a fret button on a simulated guitar.

Referring now to FIG. 17, a lane 1712 is divided into 5 sub-lanes 1724, 1725, 1726, 1727, 1728, each corresponding to a fret button on a simulated guitar. Each sub-lane thus may contain cues that, when they reach the target marker, indicate the user should depress the corresponding fret button and strum the simulated guitar. Cues 1701, 1702 spanning all the sub-lanes 1724, 1725, 1726, 1727, 1728 may indicate an "open strum," that is, where the player strums a guitar without depressing any fret buttons.

Other examples of input actions that may be indicated by a cue spanning multiple sub-lanes include, without limitation, a foot-pedal-action on a simulated keyboard, a striking of a microphone, and a tilting of a guitar.

Figure 18:
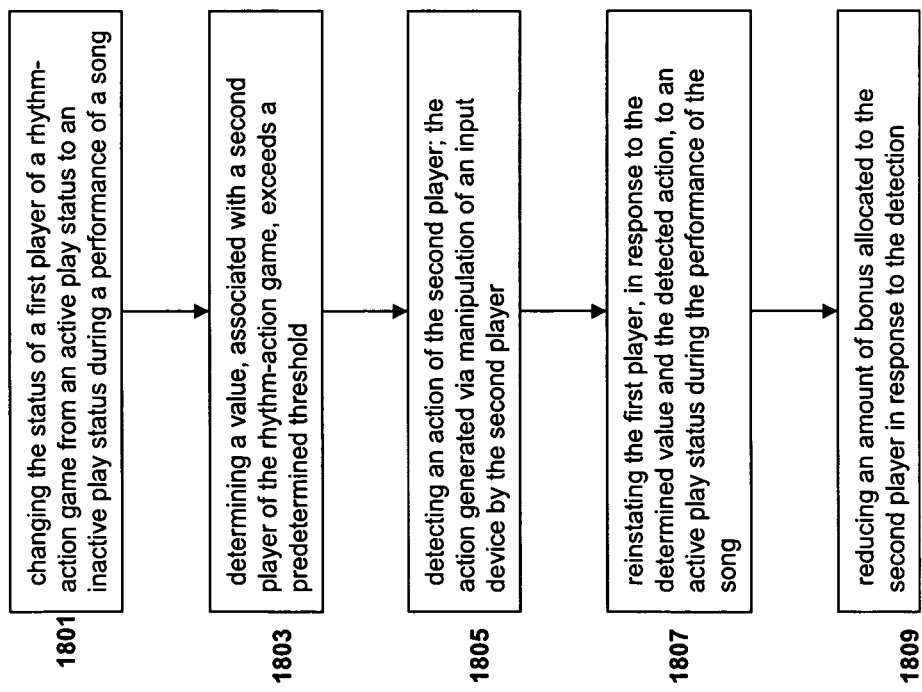
FIG. 18 is a flow diagram of one embodiment of a method for reinstating a player within a rhythm action game.

Referring now to FIG. 18, a flow diagram of one embodiment of a method for reinstating a player within a rhythm action game is shown. In brief overview, the method includes: changing the status of a first player of a rhythm-action game from an active play status to an inactive play status during a performance of a song (step 1801); determining that a value, associated with a second player of the rhythm-action game, exceeds a predetermined threshold (step 1803); detecting an action of the second player; the action generated via manipulation of an input device by the second player (step 1805); and reinstating the first player, in response to the determined value and the detected action, to an active play status during the performance of the song (step 1807). In some embodiments, a bonus may be subtracted from the second player as a cost of the reinstatement. In some embodiments, a total performance level for the band may be drained during the time a player is inactive, providing additional incentive for a band mate to reinstate the failed player.

Still referring to FIG. 18, now in greater detail, a game may change the status of a first player of a rhythm-action game from an active play status to an inactive play status during a performance of a song (step 1801). In some embodiments, the player may be changed to an inactive status as a result of "failing" the song. A player may be determined to fail a song in any manner. In some embodiments, a player may fail a song by missing more than an allotted threshold of notes. In other embodiments, a player may fail a song by missing more than an allotted threshold of consecutive notes. In some embodiments, a player may fail a song by missing one or more specially designated notes or phrases. In other embodiments, a player may fail a song by allowing their performance to reach the bottom of a meter. In still other embodiments, a player may fail a song if their performance is at the bottom of a meter in excess of a predetermined amount of time. A player may be determined to fail a song at any point during a song.

Removing a player from active participation may comprise any method of discontinuing a player's involvement in performing the song. In some embodiments, a failed player may no longer be allowed to hit notes or cues comprising the player's part. In some embodiments, the audio corresponding to the player's part in the band may be silenced. In some embodiments, a lane corresponding to the inactive player may be removed from the display. For example, referring ahead to FIG. 19, the lane for the lead guitarist has been removed 1903 from the display as a result of the guitarist's performance indicator 1905 reaching the bottom of the meter. In other embodiments, a lane for an inactive player may be shown grayed out, smaller, or with other graphical indications of the failed status.

In other embodiments, any other graphical or audio output may be used to indicate a player has failed a song. In some embodiments, the failed players avatar may become dejected, stop playing the instrument, and/or be removed from the stage. In other embodiments, the player's avatar may be displayed along with graphical text stating "failed." In other embodiments, the crowd may be shown to boo, heckle, taunt, or otherwise indicate dissatisfaction with the failed player's performance. In some embodiments, the crowd meter may change color, size, or otherwise indicate that a player has failed a song. For example, a player performing poorly may cause their icon on a performance meter to change to red. After the player fails, the icon may change from red to black or gray.

Figure 19:
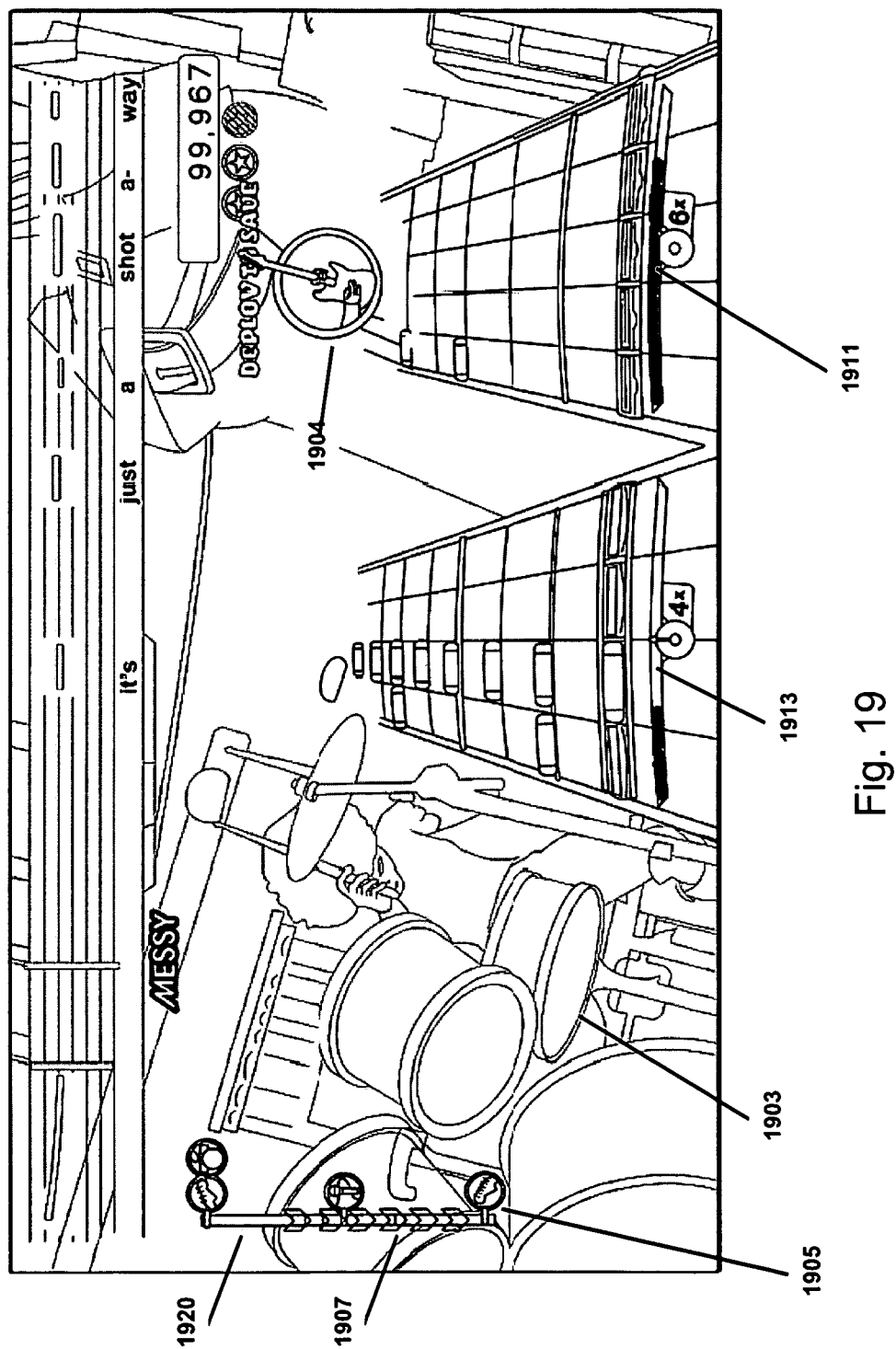
FIGS. 19 and 20 are example screenshots of a rhythm-action game enabling player reinstatement.

In some embodiments, a band's overall performance may be adversely affected by the inactivation of a member. For example, a failed band member's performance may be continually given the lowest possible rating. This low rating may then pull down the average rating of the band. In other embodiments, the failed player may continually be docked for notes that the player should be playing if not for the player's failure. In these embodiments, the continual missed notes may serve as a drain on the performance of the band. In some embodiments, after a player has failed, the penalty for other players missing notes may be raised. In some embodiments, after a player has failed, a drain may be applied to the band's performance rating such that if the player is not reinstated in time, the band as a whole will fail the song. For example, the performance meter 1920 in FIG. 19 illustrates a visible "drain" 1907 that indicates the band's rating is continually dropping while the guitarist is inactive.

Referring back to FIG. 18, a method for reinstating a player may comprise determining a value, associated with a second player of the rhythm-action game, exceeds a predetermined threshold (step 1803). The determination may be made in any manner, and at any time. In some embodiments, the determination may be made prior to, simultaneous with, or after the inactivation of the first player.

In some embodiments, the value associated with the second player may comprise an amount of bonus stored by the player. In cases where a player may accumulate bonuses by successfully executing designated series of notes, a game may then determine whether the amount of accumulated bonus of the player exceeds a given threshold. For example, a player may be required to successfully execute two designated series of notes before the player reaches the predetermined bonus threshold.

A method for reinstating a player may also comprise detecting an action of a player (step 1805). An action of a player may comprise any movement, sound, and/or manipulation of an input device. In some embodiments, the action may comprise the pressing of a button or strumming of a strum bar. In some embodiments, the action may comprise moving a simulated instrument, such as tilting a guitar controller. In other embodiments, the action may comprise striking a drum pad. In other embodiments, the action may comprise generating sound into a microphone.

In some embodiments, the action may be time-sensitive. For example, a player may be required to strike a given drum pad at a predetermined time, such as striking a pad corresponding to a cymbal crash at the end of a drum fill. Or for example, a player may be required to make noise into a microphone during a time when no lyrics are displayed.

In some embodiments, a player may be specifically prompted to perform the action if another player has failed and the player has enough accumulated bonus to "save" the failed played. Referring ahead to FIG. 19, the rightmost lane displays a prompt 1904 indicating that if the player tilts their guitar, it will restore the failed player. In some embodiments, a prompt may specifically call the player's attention to what type of action needs to be performed. In other embodiments, a prompt may simply let a player know they have exceeded the threshold needed to bring back a failed player. In FIG. 19, the leftmost lane may display the icon because the player in that lane has accumulated enough bonus (shown by meter 1911) to be eligible to save the failed bandmate. The player in the center lane has not accumulated enough bonus (indicated by meter 1913) to be eligible to save the fallen bandmate, and thus no icon is displayed.

Referring back to FIG. 18, the first player may be reinstated to an active play status during the performance of the song in response to the determined value and the detected action (step 1807). The player may be reinstated in any manner. In some embodiments, the player may be reinstated with a predetermined level of performance. For example, a reinstated player may have their performance set in the middle or top of a performance meter. Once the player has been reinstated, the player may resume their participation in playing the song as they did previously. Likewise, the audio corresponding to the player's performance may be resumed. In some embodiments, the reinstated player may be given a brief pause between the time the player is reinstated and when the player has to resume playing, in order to give the reinstated player time to prepare to resume playing.

A player reinstatement may be indicated graphically and/or aurally in any manner. In some embodiments, a lane corresponding to the player that has been removed may reappear. In other embodiments, a player's avatar may return to the stage, become energized, resume playing their on-screen instrument, or otherwise indicate their reinstatement. In some embodiments, the crowd may cheer, encourage, or otherwise indicate renewed approval for the reinstated player.

Figure 20:
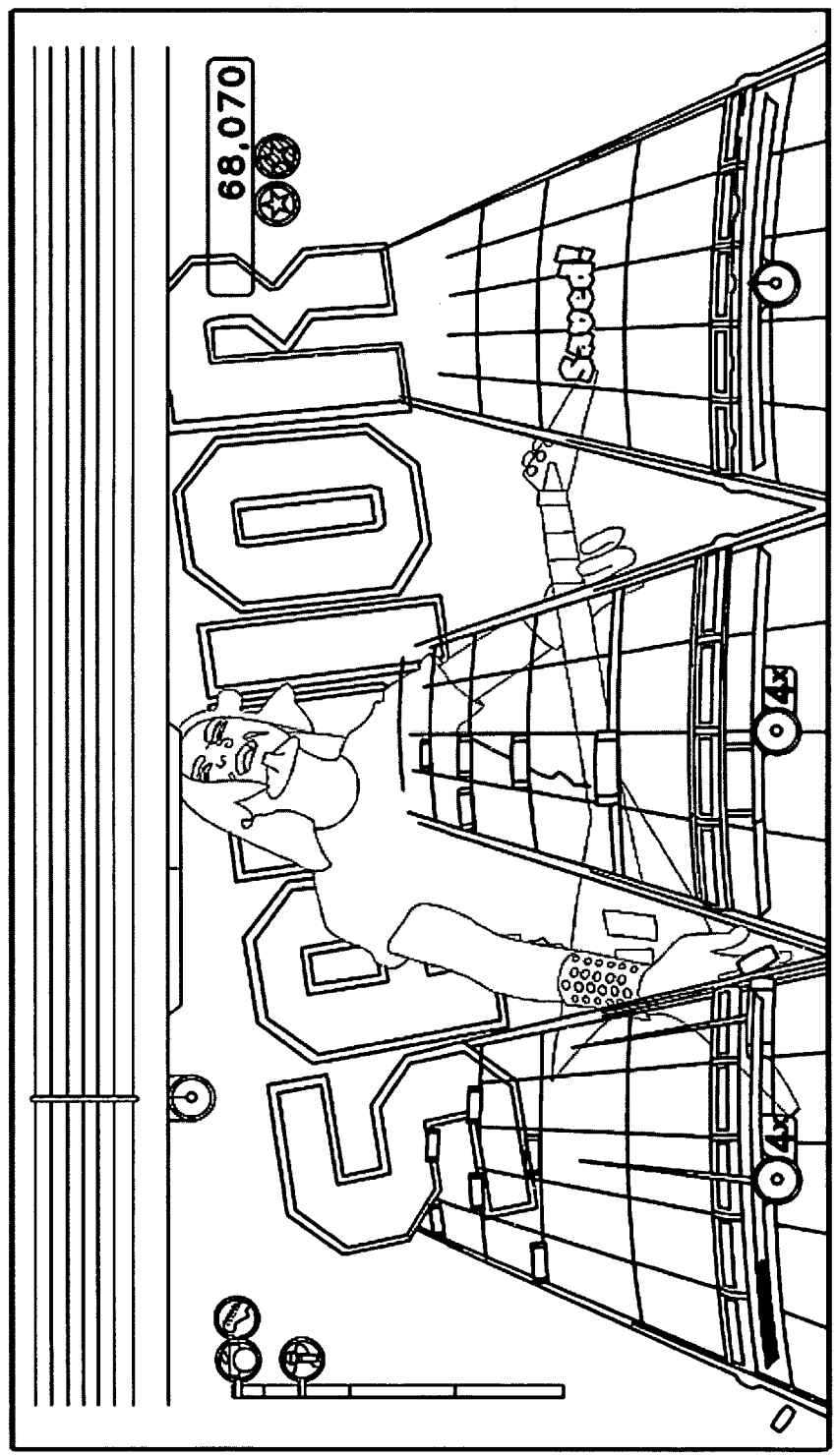

In some embodiments, the reinstated player may be shown with a message "resurrected" or a similar message indicating that the player has returned. In other embodiments, the player who saved the failed player may be shown with a graphic stating "savior" or a similar message identifying the player as the player who resuscitated the failed player. Referring to FIG. 20, the player corresponding to the leftmost lane (bass) has just been saved by the player corresponding to the rightmost lane (lead guitar). The lead guitarist's avatar is displayed on screen with the message "savior." In this manner the saved player may be informed who was responsible for his reinstatement.

Referring back to FIG. 18, in some embodiments, after the first player is reinstated, an amount of bonus assigned to the second player may be reduced (step 1809). In some embodiments, reinstating a player may "cost" a certain amount of bonus. For example, a player's bonus meter may be reduced by one quarter as the cost for saving a bandmate. This bonus reduction may require that the second player earn more bonuses before they are able to reinstate another bandmate. In some embodiments, reinstating a failed player may take the place of any other effects (e.g. score multipliers, and/or graphical and aural effects) that would typically be associated with activating a bonus. In other embodiments, a player may be reinstated in addition to any effects that typically accompany bonus activation.

Though FIG. 18 illustrates reinstating a player in response to an action by a second player, in some embodiments, the activation may be automatic. For example, if a player's bonus meter becomes full, the bonus may automatically be activated and the failed player may be reinstated.

In other embodiments, a player may be able to resuscitate a bandmate simply by performing an action, such as tilting their guitar controller without the requirement of accruing a certain amount of points or bonus. Or, for example, a player may be able to reinstate a bandmate by executing a specific sequence of actions. Such a sequence of actions may be adjusted based on the difficulty level of the failed player and/or the player attempting reinstatement. Or, for example, a player may be able to reinstate a bandmate by successfully completing a mini-game during the song.

In some embodiments, the number of times a player may be reinstated during a song may be limited. For example, a player may only be allowed to be reinstated twice during a given song. If the player fails the song a third time, the player may be kept inactive for the duration of the song and ineligible for reinstatement. In some embodiments, the number of times a player may be reinstated during a performance of a set of songs may be limited. For example, a player may only be allowed to be reinstated twice during a given performance. If the player fails a song a third time during the performance, the player may be kept inactive for the duration of the performance. In some embodiments, the number of times a player is allowed to be reinstated may be varied based on a preset difficulty level. In other embodiments, the number of times a player is allowed to be reinstated may be varied based on the instrument type corresponding to the player.

Figure 21A:
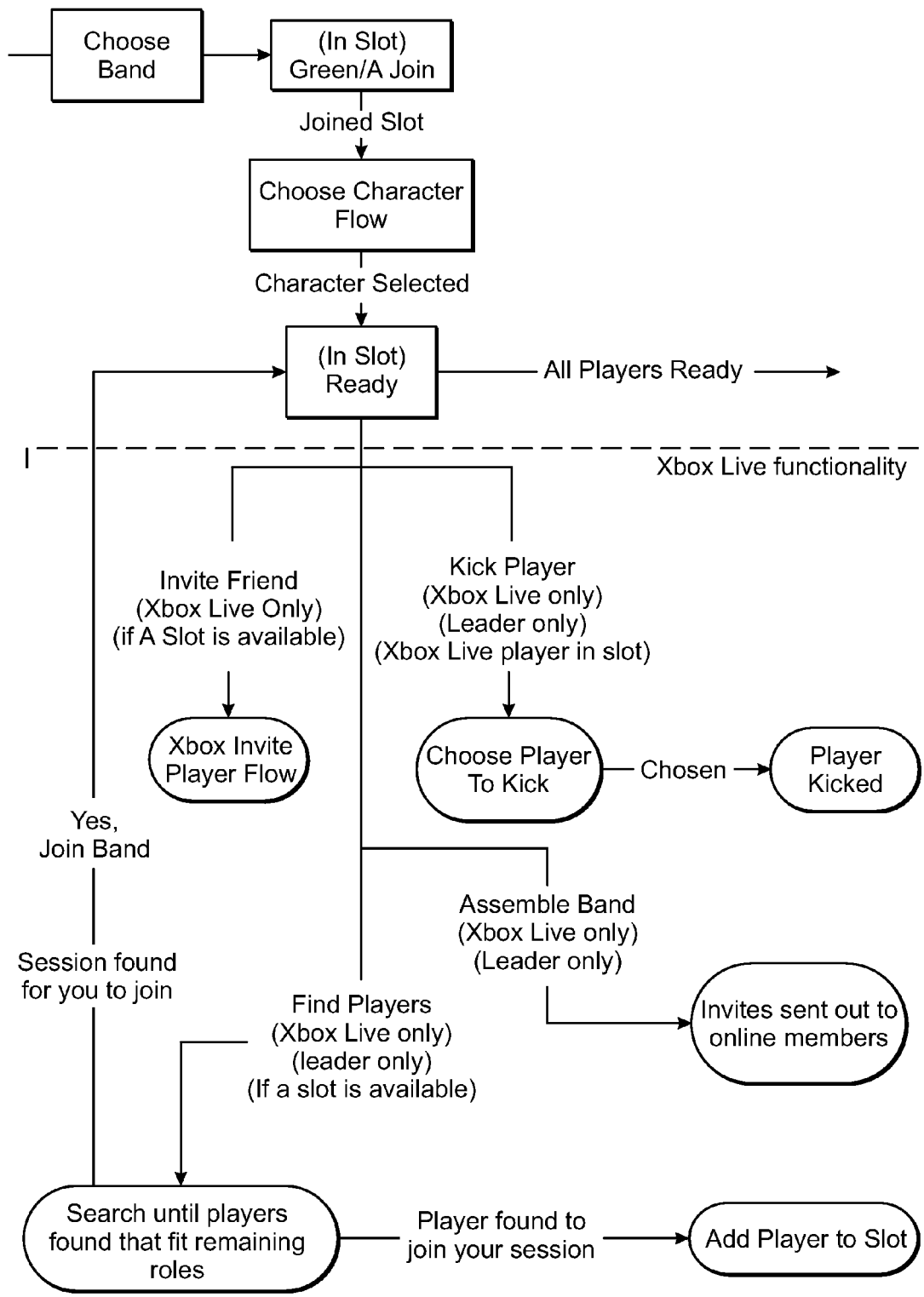
FIGS. 21A and 21B are flow diagrams of embodiments of methods for matching suitable remote players to one or more local players of a rhythm-action game.

Referring now to FIG. 21A, a flow chart illustrating one embodiment of a method for allowing players to form transient online bands is shown. Players may form online bands for the purpose of playing a rhythm action game cooperatively and/or competitively with remotely located players. In brief overview, the method comprises plugging into a local machine which assigns the player, who has chosen a character to playas, to a slot. One or more additional local players may join. The player may then find additional players, invite specific players, or remove players from the band. Once the band slots have been filled, the game may begin. Although FIG. 21A discusses online functionality in the context of MICROSOFT XBOX LIVE, it should be understood that any game system and any network functionality associated with any game system may be used.

Still referring to FIG. 21A, a player may decide to play an online experience by selecting an option from a menu. In some embodiments, a game may provide a "quickplay" option in which a player may play one or more songs with a number of other players without first creating a persistent band. Throughout the description, this mode may be referred to as "quickplay" or "transient band" mode.

The game may first detect whether one or more local players are present, and which simulated instruments the local players would like to use. In some embodiments, the game may detect the type or types of controllers plugged into the game to determine the simulated instruments used by the local players. In other embodiments, the game may allow a player to select their instrument. For example, if the game detects that a player has plugged in a guitar controller, the game may allow a player to choose between playing guitar or bass parts. For local players, slots in a band may also reflect the order the controllers are plugged into a game system, and/or the arrangement in which the controllers are plugged into given physical slots on the game system. Or for example, slots in a band may reflect the order avatars appear on stage during performances.

After the game has detected a local player using a simulated instrument, the game may allow the player to select or create a character to represent the player in the game. A character may comprise any information to the player, and may be customized by the player in any way. Character attributes which may be set by a player and/or set automatically include a character name, screen name, hometown, motto, favorite music, skill level, amount of in-game money, bands the character is a member of, and amount of in-game fame. In some embodiments, a player may be able to customize an avatar representing the character. A player may alter any attribute of an avatar including without limitation gender, appearance, clothing, style, gestures, size, height, color, in-game instrument, gear, demeanor, tattoos, face paint, and makeup. In some embodiments, a player may modify their avatar's clothing or instrument with virtual stickers. In some embodiments, a player may save a character so that it can be accessed later. In other embodiments, the character may be erased after a use. In some embodiments, character data may be uploaded and/or saved on a server so that other players may view the character. In some embodiments, a server may provide a leaderboard or similar feature which allows users to browse through a listing of characters and view their past performance. In some embodiments, a single player may be able to create and/or maintain multiple characters.

After a player has created a character or selected an already created character, the player may be taken to a screen which allows the player to assemble or join a band. Referring ahead to FIGS. 22A and 22B, example screenshots of a band selection screen are shown. This example screen may be used in conjunction with the band matching methods illustrated in FIGS. 21A and 21B. In brief overview, in FIG. 22A the player "rocker hmx" is currently joined to play as a band sing the avatar "Jillian". Three open slots labeled "searching" are shown signifying that searching for these members is taking place online.

A band may have a leader who is designated as the decision maker for certain matters involving the band. In some embodiments, the band leader may have the sole authority to find new players for a band, which may entail either asking specific players to join or using an online player matching service. In some embodiments, the band leader may have the sole authority to remove band members.

As shown in FIG. 21A, after arriving at the band formation screen, a player may be able to invite one or more local or remote players to join the band. In some embodiments, the player may be able to select from a list of friends, or a list of players the player has previously played with to invite. In other embodiments, the player may be able to search through a listing of players to invite. In these embodiments, the listing may be sorted by skill level, latency, instrument, physical location, experience, or username in order to aid the player's search. In some embodiments, after a player has joined a band, the player may be able to select the character they want to play as. For example, in FIG. 21, the player "rocker hmx" may select among a number of characters that player has created using a "select rocker" option (shown in FIG. 22A), or may have the option to create a new character. In some embodiments, certain characters may not be available to a player if the characters correspond to a different instrument than the user is playing.

A band formation screen may also have the option to search for additional remote players in the cases where there is not a specific player the player would like to invite into the band. Referring ahead to FIGS. 22A and 22B this may take the form of a "Search" and/or "Cancel Search" menu option displayed. This option (which may also be included in the screen of FIG. 22B) may employ an algorithm which finds players of similar skill to play against. After a player has selected to search for players, the player may also be able to cancel the search, such as if the search is taking too long, or another local player arrives. In some embodiments, after a player selects to search for more players, the one or more players found by the search algorithm will appear in the slots as members of the band. In other embodiments, a player may be prompted "do you want to allow player _____ to join?" and allowed to select yes or no. In any of these embodiments, the band leader may be able to kick out a player after they have joined. In some cases, after a player selects to search for players, a search algorithm may determine that the player matches with another, larger, partially formed band looking for players. In these cases, the player may be prompted as to whether they want to join the matching band instead of finding players for their own band.

A search algorithm used to match players may match players based on any criteria including, without limitation, skill, latency, experience, instrument, physical location, language, and hardware. For example, in one embodiment, a search algorithm may first search for players of the required instruments of a comparable skill level. In some embodiments, skill level may be measured using a history of past online performance. After identifying a pool of comparably skilled players of the required instruments, the search algorithm may select the player with the lowest latency to the forming band. In this embodiment, the latency measure may be either the latency between the potential players and the searching player or between the potential players and a given server.

After a transient band is formed, the band may then be given the opportunity to play one or more songs as a band. In some embodiments, one or more members of the band may be replaced after a song. In some embodiments, a transient band may be given the option to change into a persistent band.

Referring back to FIG. 21A, after connecting a controller and selecting a character, a player may also have the option of starting a session with a persistent band of which they are a member. This is shown in FIG. 21A as the "assemble a band" flow. In that flow a player selects a band they are a member of, and then invitations are sent to the other players to join a session as that band. Invitations to other players can be sent via any means, and appear on the other players' screens' in any manner. Invitations may be sent using the "Invite Friend" menu option as shown in FIGS. 22A and 22B. In one embodiment, each invited player may receive a pop-up message saying "Player _____ has invited you to play with the _____ band." If a player accepts an invitation to join a band, they may be displayed on a screen such as FIG. 22B, with the indication "[player who invited them]'s Guest"

A game may also provide a screen for creating and editing properties of a band. These properties may be stored locally or on a server. Properties of a band may include the names of the band members, the date the band was created, the name of the band leader, the number of songs the band has performed, the amount of fame the band has accumulated, the current amount of "buzz" surrounding the band, the number and type of venues the band has played at, the band's "hometown," a band logo, band possessions such as vehicles, equipment, and money, and band employees, such as roadies, set designers, managers, and agents. In some embodiments, some or all of these properties may be set by a member of the band or by the band leader. In other embodiments, some or all of these properties may be determined by a central server tracking the band's progress. In some embodiments, an external web site may be provided which allows a band's attributes and/or progress through a tour to be viewed over the internet In one of these embodiments, the web site may give bands an option to make their attributes and statistics public.

Figure 21B:
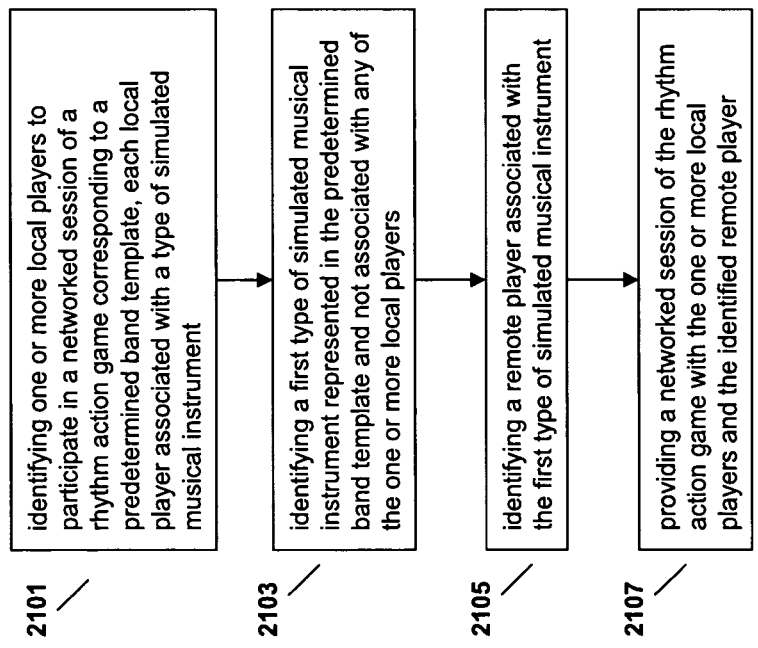
Figure 22A:
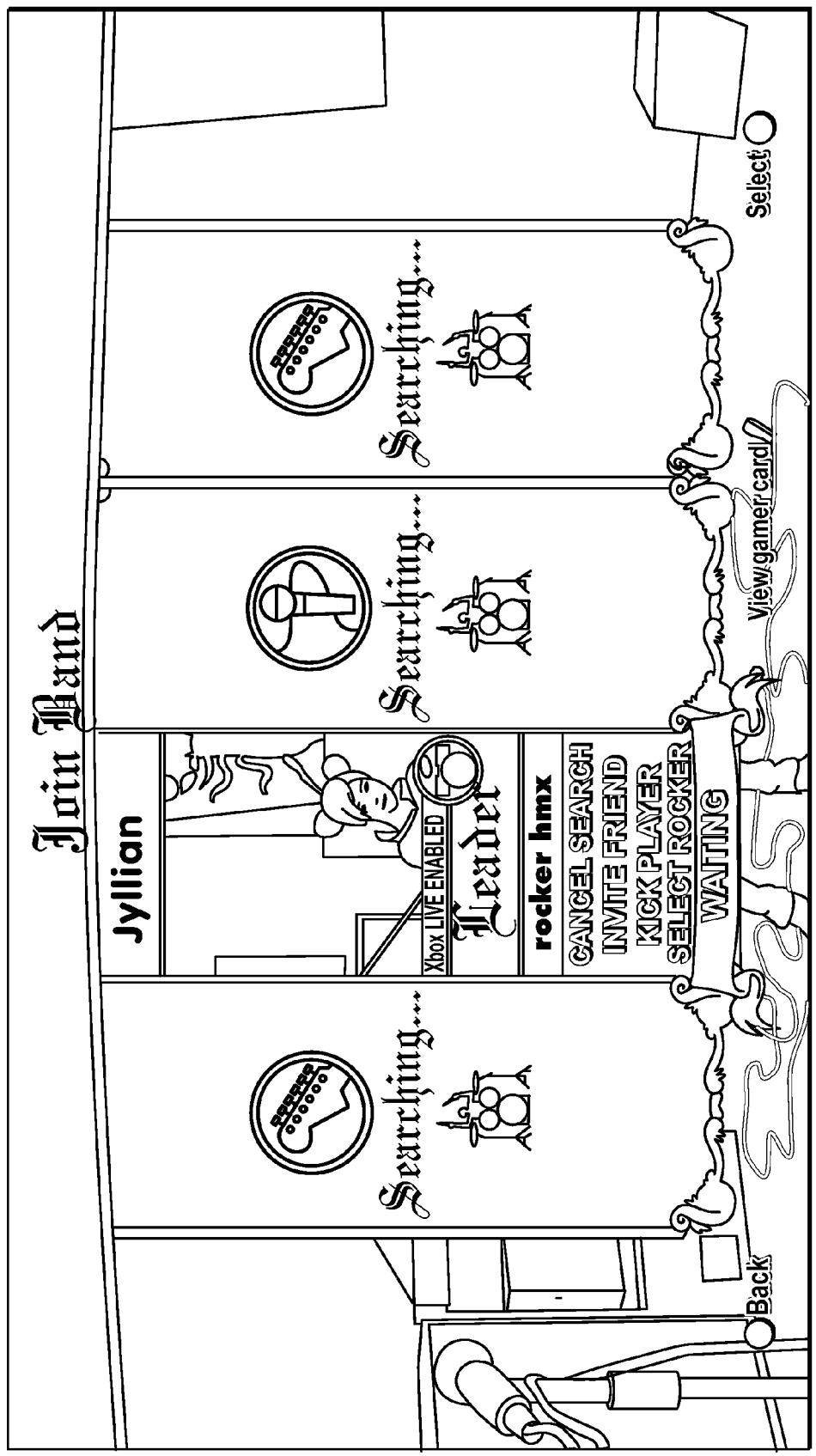
FIGS. 22A and 22B are example screenshots of a game which permits players to form bands with remote players.
Figure 22B:
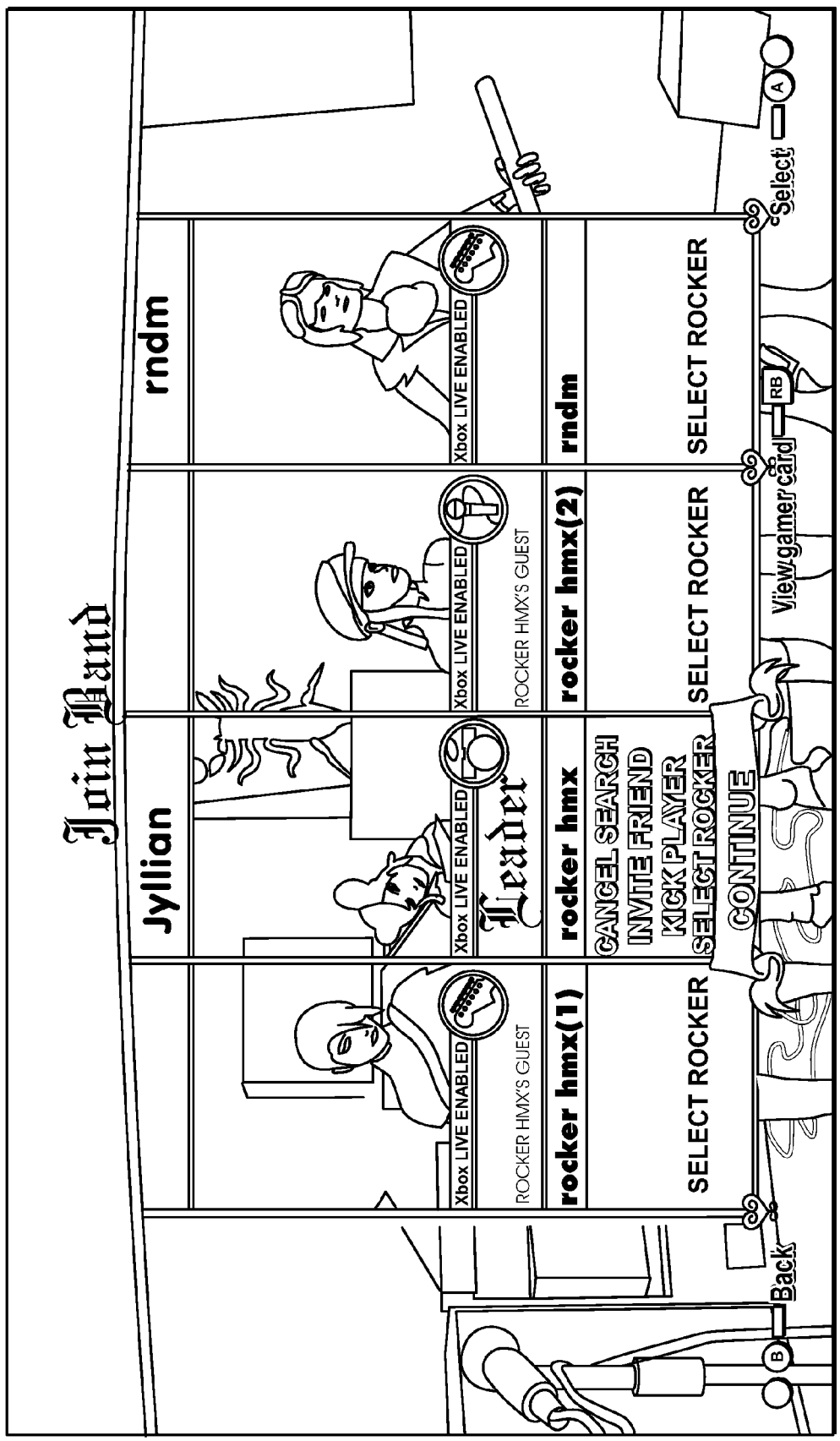

Referring now to FIG. 21B, a flow chart illustrating an embodiment of a method for matching suitable remote players to one or more local players of a rhythm-action game is shown. In brief overview, the method comprises: identifying one or more local players to participate in a networked session of a rhythm action game corresponding to a predetermined band template, each local player associated with a type of simulated musical instrument (step 2101); identifying a first type of simulated musical instrument represented in the predetermined band template and not associated with any of the one or more local players (step 2103); identifying a remote player associated with the first type of simulated musical instrument (step 2105); and providing a networked session of the rhythm action game with the one or more local players and the identified remote player (step 2107). Any of the steps shown may be performed by a game console, a centralized server, or a plurality of game consoles.

Still referring to FIG. 21B, now in greater detail, one or more local players may be identified to participate in a networked session of a rhythm action game corresponding to a predetermined band template, each local player associated with a type of simulated musical instrument. The local players may be identified by any means and at any time. For example, the local players may be identified by one or more simulated instruments connected to the local game console. The local players may be identified at different times. For example, a local player may begin searching for remote players, and another local player may join midway through the remote search process or after the remote search process has been completed.

A band template may comprise any specification of allowable instrument types and numbers of those types for a rhythm-action game. A band template may specify minimum and/or maximum numbers for each instrument type. For example, a band template may specify that a band may have up to two guitarists, one drummer, and one vocalist. Or for example, a band template may specify that a band must have at least one guitarist, at least one vocalist, and no more than one drummer. Or for example, a band template may specify that a band may have a guitarist, a bassist, a drummer, and a vocalist.

The method may then comprise identifying a first type of simulated musical instrument represented in the predetermined band template and not associated with any of the one or more local players (step 2103). For example, if a guitarist and a drummer are the local players, and the band template specifies that a band includes a guitarist, a bassist, a drummer, and a vocalist, the method may identify that a vocalist and bassist are the types not represented locally. This identification may be performed either by the local console, a central server, or a remote console. The method may then comprise identifying a remote player associated with the first type of simulated musical instrument (step 2105). The remote player may be further identified by any criteria, including without limitation the remote player's presence in a group having one or more other needed instrument types.

After the players have been identified, a networked session of the rhythm action game may be provided with the one or more local players and the identified remote player (step 2107). The session may be hosted on any of the local console, the remote console, or a central server. The session may comprise any of the gameplay described herein, and may comprise a persistent band or a quickplay session.

Quickplay Example

The following paragraphs provide a detailed example of how online matchmaking may be implemented in a game that allows up to four players to play together, including 2 guitarists, 1 vocalist, and 1 drummer. In the quickplay mode, players are able to form a cooperative band to play songs without any persistent data stored about their team. A full band consists of 1 drummer, 1 vocalist, and 2 guitarists. When the user first enters our matchmaking screen, he is allowed to join the band and become its leader. Any other players in the same room can also connect instruments to the console and join up as members of the band.

At this point in the process, the player has created a session on a matchmaking server. However, the session is marked as "private", meaning that no one else can see that it exists yet.

If the player only wants to play online with friends, he then selects an "Invite Friend" button. This will bring up a list of the player's friends, and upon selecting a friend, an invite message is sent to the matchmaking server, which then relays the message to the friend if he is currently playing the game. If the friend accepts the invite, he is given the appropriate information that will allow him to connect to the session, even though it may still be private on the matchmaking server. An invite system may be structured such that the friend can receive an invite while in any game mode (e.g. mid-song, in single-player modes . . . ). In this way, it does not require him to be sitting in a lobby to see that his friend would like to play with him.

A user may also decide that he would like to play with strangers. To do this, he selects a "Find Players" option on the matchmaking screen. At this point, the screen goes into a "searching" state. A matchmaking algorithm optimized to form complete bands as quickly as possible may then be started:

1) The player's console identifies the instruments that are present locally and then sends a search request to the matchmaking server along with a list of the instruments that the local band contains. The matchmaking server will search its database for every session that has marked itself as "public," and returns a list of the sessions that have the correct empty instrument slots. For example, if the searching session has a guitarist and drummer, the matchmaking server will filter out every session that already has a drummer, or two guitarists. Note that having one or no guitarists is acceptable since bands can have two guitarists, but only one drummer.

2) The console receives the list of viable sessions and sorts them, giving higher priority to sessions that have fewer available slots. This may enable full bands to fill up quickly and can proceed to playing the game. It may also reduce load on the server to have sessions removed from the public pool as quickly as possible.

3) The console attempts to join the first session in the list, where the hosting console performs a full handshake and verification that the instrument configuration is legal. The hosting console will reject the remote console if the slots have already been taken, if the remote console is currently attempting to join a different session, or if the remote console has already moved on past the matchmaking screen.

4) If the join is successful, the algorithm stops and the console is now a member of another's session. Otherwise, the game looks at the next session in the list and repeats step 3 as many times as there are results in the list.

5) If the game has gone through the entire search list and has still been unable to join another session, he then tells the server to mark his own session as "public". At this point, another console may join his session. If this ever happens, the game will stay in this "public" state until the band fills up or the host decides to move on with an incomplete band. Also, once a remote user has joined, the game will never move on to the next step. Note also that the host must update its current instrument configuration on the matchmaking server every time a new console joins the session.

6) The game waits a random amount of time between 10 and 20 seconds. If no remote console joins the session in this time, he sends another search ping to the matchmaking server and repeats 2-5. The session will stay "public" on the server, but will reject any join requests if he is currently waiting for a join request from another host.

7) Once a full complement has joined the session and/or the user of the host console designates that he is satisfied with the band composition (which may include the user deciding to play with one or more open slots) a game starts with the joined consoles.

Head To Head Example

In some embodiments, the matchmaking algorithms described herein may be applied to head-to-head competitive modes, such as one-on-one remote competitions and remote "battle of the bands" competitions. Matchmaking with strangers in head to head modes uses a modified version of the above algorithm, in which players are grouped with opponents that are using the same instrument type.

In some modes, players with a guitar controller are required to choose whether they want to play a song's guitar part or bass part before they enter the matchmaking screen. In those cases, guitarists are only matched up with other guitarists who chose the same part that they did. In other modes, users are required to choose a difficulty level before they are match. In those cases, only players that have chosen the same difficulty will be grouped together.

Head-to-head modes may fall into two general categories: "Player Match" and "Ranked". Player Matches are casual encounters in which no stats are recorded. In Player Matches, the user may invite his friends to play with a mechanic that is similar to Band Quickplay. In Ranked matches, details about the winner and loser are tracked so that users may be ranked on a leaderboard. Players are not allowed to invite friends to play them in a Ranked match, as that would allow players to rig matches in order to abuse the ranking system.

Persistent Band Example

In some embodiments, the matching methods described herein may be applied to persistent band modes. For example, a game may provide a "World Tour" option which allows persistent bands to make progress as a group together through a set of venues, events, and songs, and resume their progress later if they desire.

After choosing the persistent mode, a player chooses one of four options:
1) Start a new band
2) Substitute for an existing band
3) Select an existing band that the user owns
4) Select an existing band that the user is a member of but does not own When a player chooses to start a new band, he will own the band. The user is taken to a matchmaking screen that may look similar to the matchmaking screens for Quickplay (e.g. FIGS. 22A and 22B). Just as in the other modes, the user can keep his session private and invite his friends directly into the session. He can also select "Find Players," which will mark his session as public. At this point, random strangers may join his session, provided they have the correct instruments. Unlike Band Quickplay, however, this mode may not prompt the player's console to start looking for sessions to join. In persistent mode, the creator of the band may be guaranteed to be the host. After the user has proceeded past the matchmaking screen, he will have the option to make any users currently in the session permanent members of the band if desired.

When a player chooses to substitute for a band, he will be taken to a searching screen, where he will wait while the game asks the server for a list of bands that have a slot available for his instrument. This search will only find sessions that have marked themselves as public. Once the server has returned the list, the game will sort the list, giving highest priority to larger bands. The game then starts at the top of the list, and attempts to join each session in order. As soon as a join request is accepted, the console joins the session and the user joins the host on the matchmaking screen. At that moment, he is a "substitute" or a temporary member of the band, though the host may decide to promote him to a permanent member.

If the player chooses a band that he has already created, he will be taken again to the matchmaking screen. As before, he will have the option to invite his friends or allow strangers to join the band if he wishes. However, any other remote player that he has already added to the band's permanent roster will also be able to join into the band, even without him explicitly inviting the player or making the session public.

If a player chooses a band that he is a member of, but is not the owner, he is taken to a searching screen. He sends a special request to the matchmaking server which contains the unique ID of the band. The matchmaking server looks through all its existing sessions to see if the owner is currently playing Band World Tour for that band. Even if the session is marked as private, the matchmaking server will return the connection info for the session so that the user can join up. This structure ensures that the band owner doesn't have to send out invites to each friend to join the session.

Aspects of the present invention may be provided as one or more computer-readable programs embodied on or in one or more articles of manufacture comprising computer readable media. The article of manufacture may be a floppy disk, a hard disk, a CD-ROM, DVD, other optical disk, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as executable instructions. In some embodiments, portions of the software programs may be stored on or in one or more articles of manufacture, and other portions may be made available for download to a hard drive or other media connected to a game platform. For example, a game may be sold on an optical disk, but patches and/or downloadable content may be made available online containing additional features or functionality.

Having described certain embodiments of the invention, it will now become apparent to one of skill in the art that other embodiments incorporating the concepts of the invention may be used. Although the described embodiments relate to the field of rhythm-action games, the principles of the invention can extend to other areas that involve musical collaboration or competition by two or more users connected to a network.

The invention claimed is:

1. A method for instructing a display, coupled to a game console, to display a performance meter indicative of one or more performance levels associated with a plurality of players in a rhythm action game, the method comprising:
calculating, by the game console, a player score for each of the plurality of players playing the rhythm action game within a band, each player score representing a performance level of a particular player;
calculating, by the game console, a composite score for the band playing a rhythm action game, the composite score based in part on the performance level associated with each of the plurality of players within the band;
instructing the display, by the game console, to display the composite score on a performance meter as a performance level; and
instructing the display, by the game console, to display separately from the composite score each player score on the performance meter as a graphical indication positioned on the meter at a position corresponding to the calculated player score.

2. The method of claim 1, wherein calculating the player score for each player within the band further comprises calculating a weighted rolling average of the performance level for each player.

3. The method of claim 1, wherein calculating the player score for each player further comprises calculating a percentage of notes correctly played by each player.

4. The method of claim 3, wherein calculating the percentage of notes further comprises weighting recently played notes more heavily than previously played notes.

5. The method of claim 1, wherein calculating the player score for each player further comprises calculating a weighted average of the performance levels for each player as measured during a particular phrase.

6. The method of claim 1, further comprising updating the player score each time a new note is performed.

7. The method of claim 1, wherein calculating the composite score for the band further comprises calculating a composite score by averaging together the player scores for each player within the band.

8. The method of claim 1, wherein each graphical indication corresponds to an instrument type of each player.

9. The method of claim 1, further comprising displaying the performance meter as a meter having at least one subdivision, the at least one subdivision labeled according to a performance characteristic associated with a particular performance level.

10. A non-transitory computer program product comprising code executable by a processor to display on a display a performance meter indicative of one or more performance levels associated with a plurality of players in a rhythm action game, the computer program product comprising non-transitory computer readable media having:
  executable code for calculating a player score for each of the plurality of players playing the rhythm action game within a band, each player score representing the performance level of a particular player;
  executable code for calculating a composite score for the band playing the rhythm action game, the composite score based in part on a performance level associated with each of the plurality of players within the band;
  executable code for instructing the display to display the composite score on a performance meter as a performance level; and
  executable code instructing the display to display separately from the composite score each player score on the performance meter as a graphical indication positioned on the meter at a position corresponding to the calculated player score.

11. The computer program product of claim 10, wherein executable code for calculating the player score for each player within the band further comprises executable code for calculating a weighted rolling average of the performance level for each player.

12. The computer program product of claim 10, wherein executable code for calculating the player score for each player further comprises executable code for calculating a percentage of notes correctly played by each player.

13. The computer program product of claim 12, wherein executable code for calculating the percentage of notes further comprises executable code for weighting recently played notes more heavily than previously played notes.

14. The computer program product of claim 10, further comprising executable code for updating the player score each time a new note is performed.

15. The computer program product of claim 10, wherein executable code for calculating the composite score for the band further comprises executable code for calculating a composite score by averaging together the player scores for each player within the band.

16. The computer program product of claim 10, wherein each graphical indication corresponds to an instrument associated with each player.

17. The computer program product of claim 10, further comprising executable code for displaying the performance meter as a meter having at least one subdivision, the at least one subdivision labeled according to a performance characteristic associated with a particular performance level.

18. The method of claim 1, wherein each player score and the composite score for the band use a single scale in the performance meter to represent a current level of performance.

19. The method of claim 1, wherein calculating a composite score for the band includes applying a scalar factor to at least one player score.

20. The method of claim 1, further comprising indicating on the performance meter when a player fails a song.

21. A game console comprising:
  a controller interface to receive musical performance information from a plurality of controllers participating in a multiplayer rhythm action game;
  a display interface to send graphical information to an audio/video device for display; and
  a processor coupled to the controller interface and the display interface, the processor being configured to calculate an individual score for each of the plurality of controllers participating in the multiplayer rhythm action game through the controller interface where the individual score represents the performance level for the controller and is configured to calculate a composite score for at least a subset of the plurality of controllers in the multiplayer rhythm action game where the composite score is based in part on a performance level associated with each of the plurality of controllers in the subset, and wherein the processor is configured to prepare each individual controller score and the composite score for display separately on a performance meter as performance levels using graphical indications positioned on the meter at a position corresponding to the calculated score, wherein the processor is configured to cause the display of the performance meter on the audio/video device.

* * * * *